United States Patent
Potter et al.

[15] 3,659,085
[45] Apr. 25, 1972

[54] COMPUTER DETERMINING THE LOCATION OF OBJECTS IN A COORDINATE SYSTEM

[72] Inventors: Basil E. Potter, Williamsville; Theodore K. Bosworth, Kenmore, both of N.Y.; John P. Chisholm, Olympic Valley, Calif.; James A. Cadzow, Tonawanda, N.Y.

[73] Assignee: Sierra Research Corporation

[22] Filed: Apr. 30, 1970

[21] Appl. No.: 33,205

[52] U.S. Cl. ............... 235/150.2, 235/150.1, 235/150.21, 343/112 TC, 444/001
[51] Int. Cl. ........................... G06f 15/48, G01s 5/14
[58] Field of Search ............... 343/112, 112 TC; 340/172.5; 235/150.1, 150.2, 150.22, 150.23, 150.26

[56] References Cited

UNITED STATES PATENTS

| | | | |
|---|---|---|---|
| 3,286,263 | 11/1966 | Hammack | 343/112 |
| 3,242,487 | 3/1966 | Hammack | 343/112 X |
| 3,159,831 | 12/1964 | Muth | 343/112 X |
| 3,226,719 | 12/1965 | Chown | 343/112 |
| 3,242,494 | 3/1966 | Gicca | 343/112 |
| 3,434,140 | 3/1969 | Chisholm | 343/112 TC |
| 3,518,674 | 6/1970 | Moorhead et al | 343/112 |
| 3,531,801 | 9/1970 | Huebscher | 343/112 X |

OTHER PUBLICATIONS

Weaver; Adaptive Communication Filtering IRE Transact. Int. Symposium in Inpru. Theory Sep. 1962 p.169/178
Sorenson; Kalman Filtering Techniques p. 219– 229 & 289– 292 from Leondes; Advances in Control Systems, Academic press Vol. 3– 1966

*Primary Examiner*—Felix D. Gruber
*Attorney*—Alexander & Dowell

[57] ABSTRACT

A disclosure in which one or more objects, such as aircraft or other vehicles, moving in a system of coordinates transmit pulse signals to a large number of fixed position receiving stations all linked to common computer means, and the computer means uses one of several well known techniques such as multilateration, time-of-arrival, differential time-of-arrival, etc., of the pulse signals to solve for position of the transmitting object, and in which weighting is used to minimize errors. Such weighting includes selective of optimum receiving stations from a larger number of available stations according to geometric criteria, weighting the value of the data delivered by the various stations in order to weight most heavily the best data chosen according to predetermined criteria, and minimizing the errors by one of several different techniques including the use of iterative computations converging upon a location which continuously grows more accurate, or by other error minimizing techniques such as the technique of least squares fitting.

40 Claims, 12 Drawing Figures

PATENTED APR 25 1972  3,659,085

INVENTORS
BASIL E. POTTER
THEODORE K. BOSWORTH
JOHN P. CHISHOLM
JAMES A. CADZOW

BY Alexander E. Dowell
ATTORNEYS

INVENTORS
BASIL E. POTTER
THEODORE K. BOSWORTH
JOHN P. CHISHOLM
JAMES A CADZOW
BY Alexander & Dowell
ATTORNEYS

COMPUTER DETERMINING THE LOCATION OF OBJECTS IN A COORDINATE SYSTEM

This invention relates to improvements in systems which operate continuously to determine successive positions of one or more moving objects which periodically transmit pulse signals, the system employing a large number of fixed-position relay stations for receiving the pulse signals and relaying information which they contain to a central data processing station, the information including interalia the relative times of arrival of the signals at the various relay stations and their signal strengths, and the system evaluating the reliability and probable accuracy of the information made available from the various relay stations and weighting their data accordingly during processing whatever data it accepts to determine the coordinate location of each such moving object.

The general concept of determining position by pulse TIME-OF-ARRIVAL, referred to hereinafter as TOA, has been set forth in numerous prior art disclosures, many of which use three or more ground stations to receive a signal transmitted from an object, such as an aircraft, and then solve simultaneous equations relating the signal's relative times of arrival at the ground stations to define the position of the aircraft, often in only two coordinates $x$ and $y$ where it is assumed that the altitude of the aircraft (referred to hereinafter as the $z$-coordinate) is small as compared with the range to the various ground stations. More particularly the prior art includes a group of patents in which a mobile unit is located by trilateration, using measured range from three or more fixed stations to locate the mobile unit as taught for instance in U.S. Pat. No. 3,150,372 to Groth. A more sophisticated type of system is also well known in the prior art in which the mobile unit transmits a pulse signal which is picked up at three or more ground stations, and the differences in times of arrival thereat are used to determine the position of the mobile unit on the basis of an hyperbolic grid system, which can be done graphically, but which is usually done by computer-solving simultaneous hyperbolic relationships. Examples of these systems are shown in U.S. Pat. Nos. 2,681,764 to Gale; 2,972,742 to Ross; 3,068,473 to Muth; 3,197,738 to Raser; and 3,419,865 to Chisholm, to mention only a few. There are, of course, many other types of time-of-arrival systems discussed in the prior art.

It is the principal object of this invention to provide a computer determined solution having greatly improved accuracy. When one uses one of the various computational principles established in the prior art to locate mobile units, especially aircraft in which the position geometry is three dimensional, he finds that the errors in measured positions are large, and that because of these errors the systems are of only marginal utility for such important purposes as high-density traffic control, or aircraft collision avoidance. Nevertheless, this general TOA type of system has certain advantages that make it desirable if its accuracy can be improved. Not the least of these advantages is the fact that the preponderance of necessary equipment can be located at the ground stations, while the aircraft themselves need be burdened only with omni-directional periodic pulse initiating equipment which is minimal both from the point of view of the weight and complexity of the airborne equipment, and from the point of view of its cost. The system is, therefore, well adapted for the control of minimally equipped craft as well as large commercial and military craft. This disclosure seeks to identify and obviate the various system errors.

These system errors include, among others, various equipment delays occurring during transit of the signals from the several receiving relay stations to the central processing station, and these delays can be delt with by calibrating them out of the system in one of a number of different ways, some of which are discussed in U.S. Pat. No. 3,047,861 to Arnold. Another type of error is introduced by multipath signal propagation phenomena, which can be effectively minimized by using pulse signals which have short rise-times and by employing leading-edge detection at the ground stations so that multipath signals which are delayed in their arrival by more than one-half the pulse rise time will have little significance. Pulses which are delayed by larger amounts are eliminated by employing guardband receiver disabling after each pulse reception. The uncertainty as to the moment of detection of a pulse caused by additive thermal noise in the receivers can be minimized by using outputs from only those receivers which are operating at a high signal-to-noise ratio. Equipment such as that employed in the relay stations imparts delays in time of arrival to pulses which are transmitted through them. This delay consists of a well defined mean value which can be compensated for, and a random component about this mean value. A major factor in the variation in delay about this mean value arises from variations in the magnitude of the signal applied at the input of the device. It is an object of this invention to provide AGC responsive means for compensating for this variation in delay arising from variations in the level of the input signal at the relay stations. Digital quantization errors can be held to acceptable minima by the use of high digital clock rates.

However, there are sources of error which cause inaccuracies which are not only serious in magnitude, but are more difficult to eliminate. In the case of a system tracking an aircraft from plural ground stations, many of the prior art disclosures have assumed that the altitude of the aircraft can be ignored as being small in comparison with the range of the aircraft. In certain controlled circumstances this may be an acceptable assumption, but not in general air traffic control situation in a high density region. For instance, Ross, U.S. Pat. No. 2,972,742 suggests that the ground stations in a given area be mutually separated by 75 to 150 miles, and therefore, altitude can be ignored since such a system is capable of determining only very coarse location. The patent to Raser, U.S. Pat. No. 3,197,738 is similar in this regard. Ross and Raser both select four ground receiving stations from a larger total of available stations to locate an aircraft flying in their general environs. However, since the present invention seeks to locate the aircraft very accurately, it becomes necessary to use stations some of which, at least, are located very much closer together, i.e. mutually spaced by distances which are not significantly greater than the maximum altitude at which participating aircraft may be flying, and preferably less. Thus, in the present system, altitude becomes very important. The present invention describes as an illustrative embodiment a 40-mile-square deployment of relay stations including a rectangular grid having columns and rows of five stations each, and perhaps further including a highly accurate test zone where the stations may be mutually separated by only about 2.5 miles. These close spacings raise new problems not considered by the prior art disclosures involving only very coarse ground station distributions. Foremost among these problems is the fact that the quantity of data available for use by the central computer can be so overwhelming that prohibitively large computation times would be required to arrive at a solution. When the stations are disposed close to each other in an effort to obtain great accuracy, different stations yield the most accurate $x,y$ component information than those which yield the most accurate $z$-component information, assuming that data could be had from most of the stations at any particular moment. For best $x, y$ determinations, stations should be selected which are remote from the position of the aircraft as projected onto the $x, y$ plane and this selection is a compromise between two extremes. The stations should be far enough from this projected point that the altitude of the aircraft is small as compared with the slant range, but no so far away that the measurements become inaccurate because of atmospheric delays and refractions. Conversely, when determining the $z$-component the most accurate data comes from the stations located most nearly beneath the aircraft.

It is therefore a major object of this invention to select for processing data from stations having the best locations for the intended determinations according to the above discussed criteria. A prime reason for selecting certain stations from among the large number of stations available is to avoid the magnification of measurement errors which results from poor geometry if a poor selection of stations is made in arriving at a position solution. Accordingly, in addition to selecting multiple stations meeting the criteria of the above paragraph, further geometric criteria are necessary, namely, that the selected stations be located such that their mutual relationships relative to the aircraft be as nearly orthogonal as possible. The ground stations will, in a practical embodiment, probably not be coplanar, and in fact it is preferable that they be located at different elevations so as to improve the $z$-axis measurement capability of the system. Still other criteria of choice include the selection of stations presenting signals whose signal-to-noise ratios meet prescribed minimal levels and whose signals are not confusingly close in real time to other incoming signal pulses at the particular moment in question.

It is another object of this invention to provide in the system means sensitive to the levels of pulse signals arriving at the respective relay stations to eliminate from consideration by the computer data whose arrival signal-to-noise ratio is below a prescribed level, so that weak pulses which do not rise substantially instantaneously and thus whose moments of detection jitter will not introduce inaccuracies as to TOA.

A further object of the invention is to provide in the system means for determining whether the TOA of pulse signals at two or more of the stations from which the computer is taking data are substantially coincident, and in the latter event for eliminating the data from one of those stations, for instance, by substituting for it an alternative station.

As far as the system operation is concerned, the obtaining of optimum data can be accomplished on the one hand by having the computer turn "on" and "off" the various relay stations available to receive the aircraft pulses, or on the other hand by having the computer accept all input data from the receiving relay stations and then weight the inputs from the various stations according to the computer's evaluation of its worth in fixing the location of a particular aircraft. Although physical embodiments of these alternative selection systems might differ, in the final analysis the non-selection of data from a particular station is for practical purposes equivalent to weighting that station's output zero. The present disclosure intends to cover both.

The physical layout of a grid of receiving stations may take many forms. Among those investigated during the refinement of the present invention were a rectangular grid of about 40 miles on a side and including stations regularly spaced at 5 miles. Another was an 11 station layout including four corner stations mutually spaced by 5 miles and a station in the center surrounded by a hexagonal group of stations spaced at 2.4 miles from the center station. This latter grid is combined in the former for purposes of present illustration to provide an overall configuration having a zone of greater accuracy within its corners, such zone comprising for instance a test range, or even a geographic area including an airport. With this geometry, horizontal position of the aircraft can be very accurately determined. RMS errors in the computed $x$ and $y$ directions are generally 8 feet or less when the aircraft is at 0.5-nautical-mile attitude, 15 feet when the aircraft is at 4-nautical-miles altitude, and 22 feet when the aircraft is at 8-nautical-miles altitude. These horizontal errors increase slowly with altitude. Vertical errors tend to minimize to about 20 feet rms for 2-nautical-miles altitude, and start increasing significantly below ½-nautical mile and above about 6-nautical miles where rms errors of approximately 50 feet result. The largest errors occur at the edges of the grid of relay stations comprising the test range, while significantly better results are achieved at most points inside the range, especially near the seven inner stations. In the case of solutions based on differences in times of arrival, at the lower altitudes the errors are inherently due to the various hyperboloids being nearly vertical, while at the higher altitudes the hyperboloids start to separate, thereby magnifying the measurement inaccuracies.

If ultra-high altitude coverage is necessary, it may be desirable to use reference stations which are further apart in order to reduce the curvature of the hyperboloids. Of course, the exact station placement selected will depend upon the purpose to be accomplished by a particular practical system. Naturally, the computer program will take into account any differences in fixed station elevation which may exist.

In order to make an optimum selection of stations it is necessary to know the approximate present location of the aircraft. As the system tracks the aircraft, the knowledge of its position is continuously updated and available, but such knowledge is not initially available when tracking is about to commence. It is, therefore, an object of the invention to provide a system initially operative to make an approximate determination of aircraft position, and to then select a more nearly optimum group of stations for its next determination based upon that initial acquisition. Since, after the initial acquisition, each new determination of a position follows an immediately preceding one, the next prior determination is used as a criterion for station selection for the purpose of making the next determination.

In most air traffic control systems redundancy is considered highly desirable since it serves to check the accuracy of incoming information. On the other hand, it can be detrimental in computing position by TOA techniques. In any group of relay stations certain ones will give the best $x$, $y$ and $z$ data, although the same station does not give the best data relative to each axis. Now, if more data is collected from other stations, which are even less-optimum selections, this data can tend to reduce the general accuracy unless some means is provided for taking into account the fact that this additional data, though cumulative, may not be as accurate. The present invention proposes that the data be weighted when it is used in positional computations, and especially when computing the altitude component $z$. Since the best $z$-data should come from the stations most nearly beneath the aircraft, the integrity of the $z$-data is very nearly proportional to the sine of the elevation angle from that station to the aircraft. This is one of the ways to accomplish weighting which is employed in this disclosure. As pointed out above, another approach is by weighting certain stations zero based on considerations such as the geometry of the problem being solved, signal-to-noise ratio, coincident arrival of pulses at two stations, etc. The latter types of weighting by selection are effective with respect to all three coordinate axes. Where weighting coefficients are used as multipliers, for instance, based on received signal strength or on geometric considerations, non-linear weighting is helpful since it can be made to effectively ignore data collected from the least desirable sources.

The accuracy of the computations, and their relative difficulty is affected by a selection of one particular station as the reference station for computing differences in TOA. Since the present illustrative calculations are based on differences in times of arrival, it makes a difference which station is chosen as the reference station with respect to which all other times of arrival are compared. For example, two possible selections include using as the reference the operative station which is furthest from the aircraft, or alternatively, the station which is closest to (most nearly under) the aircraft. Other choices of course exist, and selection among the various possibilities have been demonstrated to affect both the complexity of the equipment and programming, as well as the ultimately computed position accuracy. A further possibility regarding selection of the master reference station exists. In the case where the basic data accumulated by the system consists of time differences of arrival, it is not necessary for this data to be referenced to the time of arrival data from only one relay station. Instead, it is entirely possible to employ several reference stations in processing any single set of time difference of arrival data. In fact the inherent accuracy of the system is enhanced by making positional computations based upon hyperboloids using several different reference stations instead of making one relay station a focus for all hyperboloids, as is the case when a single reference station is employed. In particular, let $l_i$ be the $x, y$ projection of the line defined by the coordinates of the $i^{th}$ pair of stations. If the acute angles formed by the intersection of several such lines are as nearly equal as the grid of ground stations permit, and if the distance from these intersections to the projection of the aircraft's position to the $x, y$ plane is much less than the aircraft altitude, an increase in the accuracy of the resultant $x, y$ solution for aircraft position may be anticipated. As before, the accuracy of the estimate of the $z$-coordinate position is enhanced with the selection of several stations as close to the aircraft position as possible.

Another important object of the invention is to provide means for remembering and transferring to the central processing system the TOA data available at the various receiving relay stations, such means including data links, either by wire or microwave link through which the data can flow to the computer and through which the computer can control the receiving stations, either to turn them "on" or "off" or to send periodic clock rate synchronizing signals, or both.

A further object of the invention is to provide a system in which the computer can periodically exchange calibrating signals with the various receiving stations for the purpose of checking the delays which are inherent in the system itself in an effort to be certain that the magnitudes of these delays are known and that the equipment itself is not introducing errors into the data which it is collecting and using to compute aircraft location.

It is still a further object of the invention to computer process redundant computer-determined aircraft coordinates to minimize the errors found to exist therein, which errors prevent all of the computed coordinate positions from consistently closing on the same point in space, this processing including statistical data processing techniques, such as least squares fitting.

Another object of the invention is to provide a system capable of determining from the TOA data the velocity and acceleration of the aircraft being tracked, for instance by fitting a polynomial expression to the sequence of aircraft positions, and then differentiating the polynomial once or twice to obtain velocity or acceleration as approximations.

A further object is to provide a system capable of multiple-aircraft participation using any one of several well known prior art expedients such as different frequencies or pulse codings for the various aircraft, or by time sharing techniques wherein the aircraft transmit their pulses at different mutually exclusive moments in a repeating time cycle. Another approach, which however, relies more heavily upon the central processing unit, is to have the aircraft transmit their pulses with great regularity as to repetition rate but in such a way that the repetition rates of the various aircraft are unsynchronized, one with respect to another. The computer then provides guardbands synchronized to the various repetition rates and recognizes the various aircraft pulses by anticipating when the next pulse should arrive. The identification of these pulses can be further enhanced by recognizing their relative signal levels, for instance by AGC memory techniques. In typical applications, any "dead times" resulting from the simultaneous reception of pulses from relay stations (or at relay stations) can be minimized by selecting stations that neither pulses from the various aircraft simultaneously, nor relay pulses to the central processing unit at times which would result in their simultaneous reception thereat.

The present invention is especially useful not only in air-traffic control and landing situations, but also in connection with a large variety of testing ranges for other types of equipment such as missile tracking systems; ground, sea or airborne radar systems; inertial guidance systems; antenna pattern systems; bombing systems; instrument landing systems; etc.

Other objects and advantages will become apparent during the following discussion of the drawings, wherein.

Figure 10:
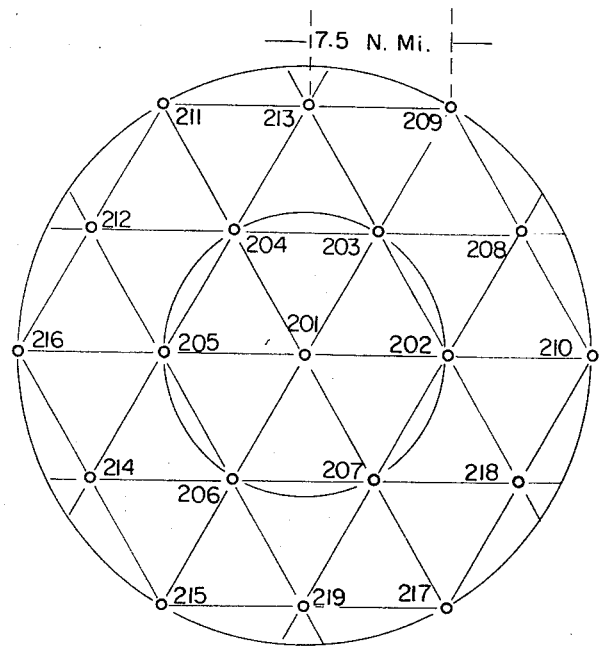
Figure 9A:
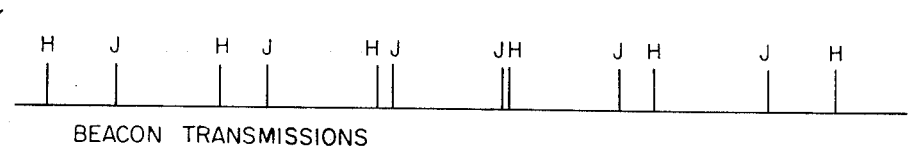
Figure 9B:
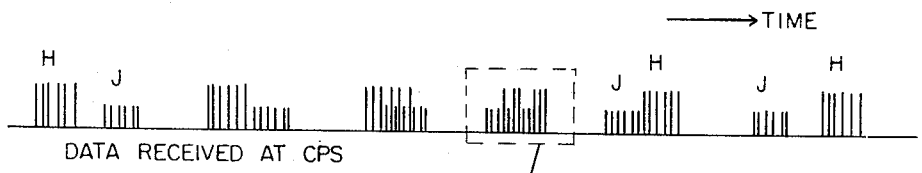
Figure 9C:
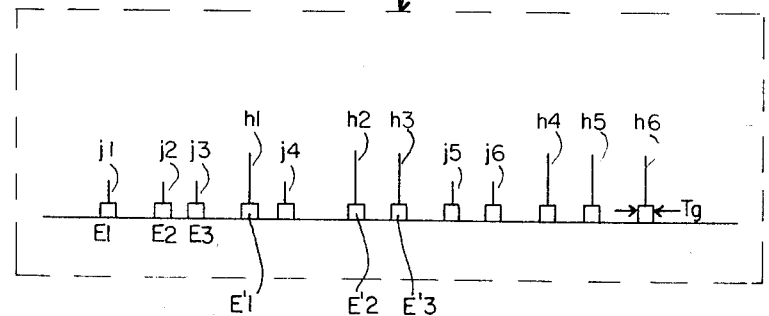

FIG. 9, comprised of FIGS. 9a, 9b, and 9c, is a set of related pulse diagrams used in illustrating the handling of pulses from several pulse-signal emitting objects; and FIG. 10 is a plan view diagram showing a grid of 19 ground stations illustrating the layout of stations referred to in a working embodiment related to the computer program discussed near the end of this specification.

Figure 1:
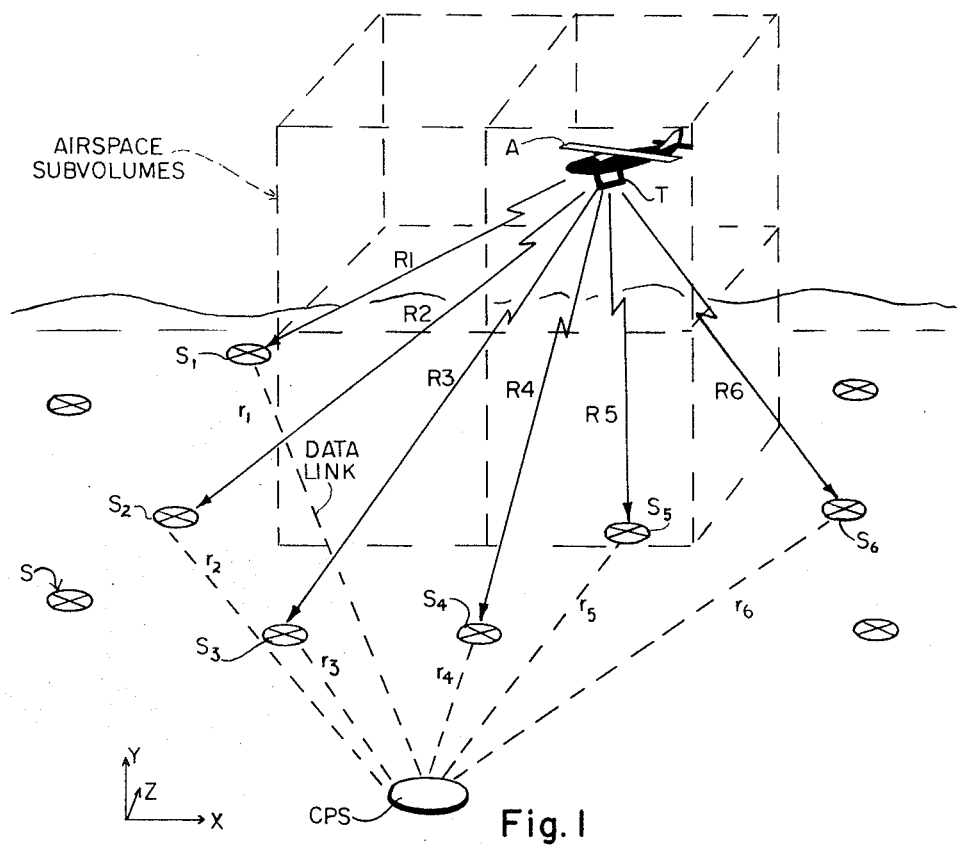
FIG. 1 is a pictorial view of an overall system showing an aircraft flying over a grid of ground relay stations and emitting signals thereto to be relayed by suitable data links to a central processor station.

Referring now to the drawing, FIG. 1 shows a pictorial view of an RF pulse-signal emitting object, which in the following illustrative embodiments will be treated as an aircraft, flying above a plurality of relay stations S distributed over a ground pattern grid covering a large geographic area. These stations lie in the $x, y$ plane which is assumed to be essentially flat. The $z$-coordinate represents altitude, and a centrally located computer is programmed to include these assumptions, together with corrections for the curvature of the earth beneath the $x, y$ plane and for actual differences in elevation of the various stations. The aircraft A is flying over the stations of the grid, which are connected to a central processor station CPS which includes the said computer and other equipment to be discussed hereinafter. The processor station is assumed for illustrative purposes to be receiving from the various relay stations time of arrival (TOA) RF pulse signals initiated by the aircraft A, these signals, for instance travelling a path R1 through the air to relay station S1 which then relays TOA data based on the received RF pulse signals to the central processor station CPS by way of a suitable data link r1. R1 plus r1 amounts to a delay equal to the total signal propagation time delay of the system, omitting for the time being the electronic delays within the circuitry itself which will be discussed hereinafter. The ground data links between the various stations S and the central processor station CPS may assume any suitable form, including electric cables, microwave links, etc. As will be seen hereinafter, the data links $r_1, r_2, r_3, \ldots r_6$ comprise two-way links so that the remote stations can communicate TOA data to the central station, but also so that the central station can communicate with the remote stations for various purposes, including selectively turning the relay stations off and on to select those stations expected to supply optimum data. The aircraft A contains transmitting means T of any suitable form which is triggered by a free running but stable oscillator which drives a transmitter through a encoder so that the transmitter periodically sends out a pulse group which is coded, in a manner well known in the prior art, for the sake of identifying the signal as one coming from an airborne transmitter to which the various relay stations are receptive, as distinguished from a spurious pulse from some other source. The components of the system described so far are substantially what is shown in the prior art, some of which has been listed near the beginning of this specification. Also as mentioned above, a number of these systems describe means for keeping track of a plurality of aircraft rather than just one aircraft, these means including for instance the assignment of time slots to the various aircraft so as to separate their pulse signals and prevent confusion as to which signals come from which aircraft. In a practical traffic control system, it would be necessary to consider some means for keeping the identities of plural aircraft separated, and this disclosure will discuss several useful approaches later on. However, at this stage of the discussion the disclosure will proceed on the basis of a single aircraft flying over the grid of ground stations S.

Figure 2:
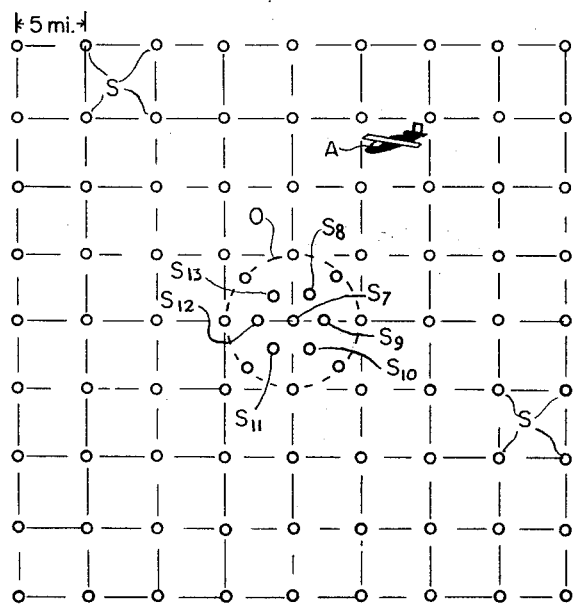
FIG. 2 is a plan view diagram showing a grid of ground stations having a greater station concentration near its center.

FIG. 2 shows a composite of two types of grids which have been extensively studied and computer-calculated. The first is a regular geometric layout of stations S in a 40-mile square region where the stations are spaced five miles apart and are all coupled to a central processor station by suitable data links (not shown in FIG. 2). The second is a concentrated layout of stations near the center of the grid including a center station $S_7$, a hexagonal ring of stations $S_8$, $S_9$, $S_{10}$, $S_{11}$, $S_{12}$, and $S_{13}$ therearound and spaced from $S_7$ by 2½ miles, and an outer ring of stations spaced from $S_7$ by 5 miles and lying on the circle 0. In a practical system, the tighter cluster of stations in the center of FIG. 2 would surround a high traffic area such as an airport in order to give greater accuracy of aircraft location than could be obtained from the portions of the grid having greater spacings. As will be seen hereinafter, the system will select certain stations in the overall grid on the basis of computer determined criteria to provide optimum $x$, $y$ and $z$ information, and in one embodiment will select all of the central cluster of stations thereafter weighting all their input data in such a way as to minimize vector errors. Other grid layout configurations suitable for a particular geographic area and traffic flow are of course intended to be within the scope of this disclosure.

Figure 3:
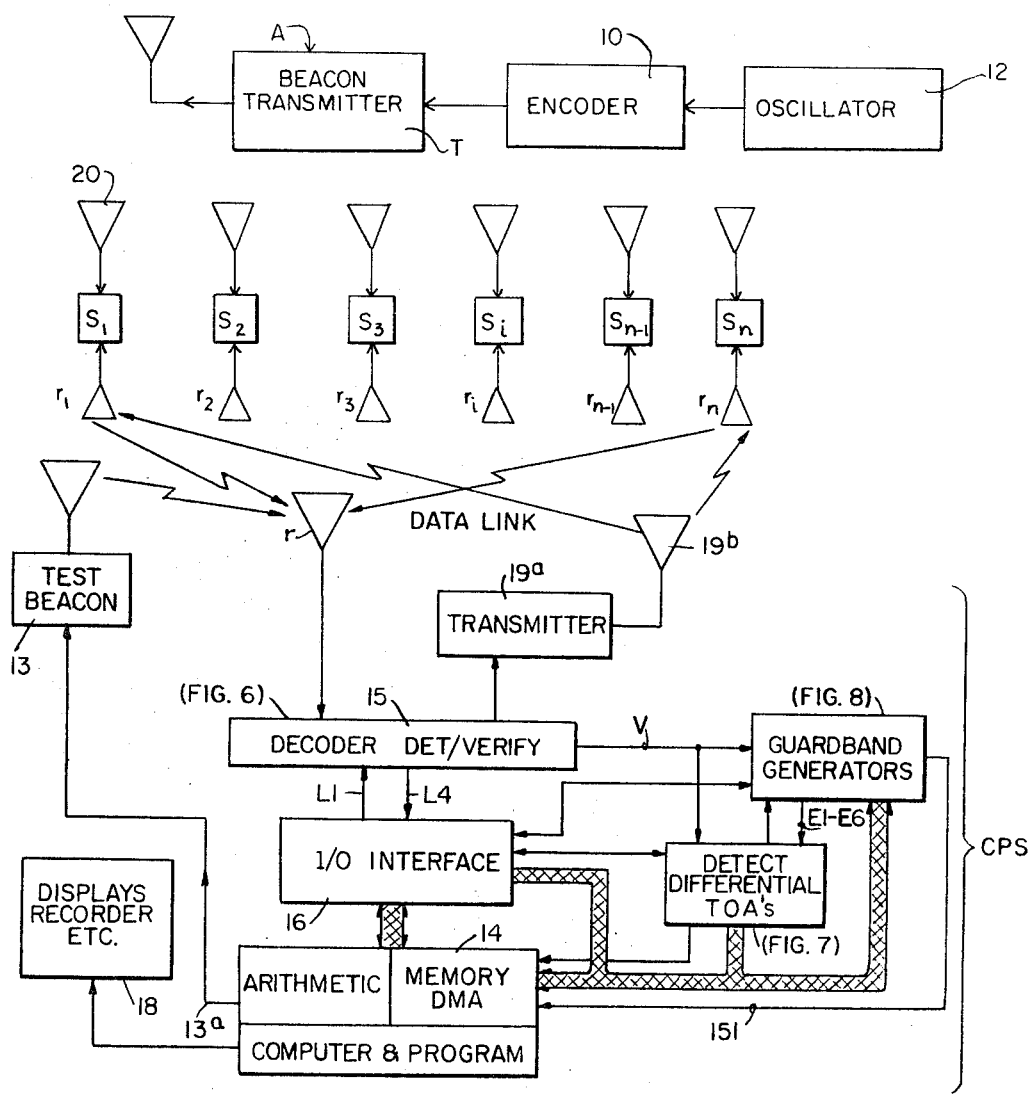
FIG. 3 is a block diagram of the system showing radio data links, and subdividing the parts of the central processor system.

FIGS. 1, 2, and 3 show a system in which an object is being tracked, for instance the aircraft A, which is equipped with a beacon transmitter T transmitting at regular intervals an RF pulse group encoded by an encoder 10 driven by a free running stable oscillator 12, for instance triggering the aircraft pulse group transmissions at the rate of one every millisecond. These transmissions are emitted by the aircraft and are receivable at all of the ground stations S which are within radio range of the aircraft. These ground stations in FIG. 3 are labelled $S_1$, $S_2$, $S_3$, . . . Si, $S_{n-1}$, and Sn, where there are a total of N ground stations in the grid, a typical one being shown in more detail in FIG. 5. Assume for the moment that the computer is already storing some information as to the approximate location over the grid of the aircraft A, the reason for this assumption appearing later in the present discussion. The computer will use this knowledge in a manner to be hereinafter explained as a criterion to help it select and enable certain of the ground stations, assumed herein to be stations $S_1$, $S_2$, $S_3$, $S_4$, $S_5$, and $S_6$ of FIG. 1.

The central processing station CPS as shown in FIG. 3 includes a computer 14, suitable input-output interface equipment 16, displays and recorders 18, the computer being programmed for weighting and computing the position of the aircraft and for determining which relay stations shall be selected from the total number of stations shown on the grid to deliver TOA data to the computer. The computer contains a table of possible aircraft locations versus specific receiving stations S which would be optimum for the purpose of computing the position of any aircraft lying within that air space as specified in the table. The table also contains alternative receiving stations which are also nearly optimum and which can be selected by the computer in the event that, for reasons to be hereinafter stated, one of more of the selected ground stations must be eliminated. At any rate, when this selection has been made, the computer operating through the interface 16 delivers suitable output signals for transmission by the data link transmitter 19a to all of the relay stations S through the data link, and such transmission enables certain of those stations whose addresses are included in this message.

As pointed out above, the data links may comprise microwave links, and in fact in the present example comprise two-way microwave systems operating on frequencies which are not only different from each other, but also differ from the frequency on which the aircraft transmitter T is transmitting. In this way, it will be assumed that stations $S_1$, $S_2$, . . . $S_6$ have been enabled, and that these six stations are transmitting via the data links $r_1$, $r_2$, . . . $r_6$ time of arrival data pulses to the decoder antenna $r$ via the interface 16 which translates this information into parallel binary form suitable for feeding into the computer 14, this data being used for position solution by the computer 14 to determine the position of the aircraft.

Figure 4:
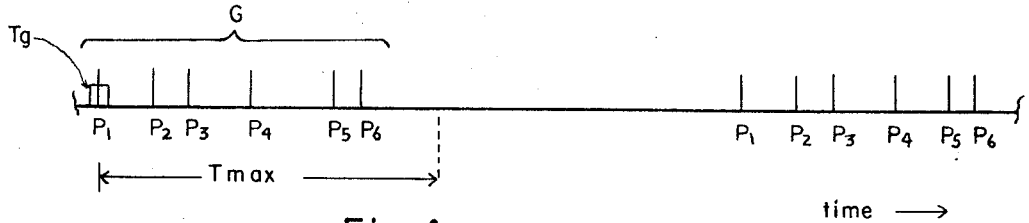
FIG. 4 is a diagram showing two sequential groups of TOA data pulses transmitted from the six selected relay stations as they are received at the central processor system.

FIG. 4 shows two typical sequences of data link pulses $P_1$, $P_2$, $P_3$, $P_4$, $P_5$, and $P_6$ being transmitted to the CPS from the six selected ground stations $S_1$ through $S_6$, these pulses naturally being grouped together since the time differences between the moments of reception of an aircraft pulse signal at the six selected stations is very small as compared with the selected period of the free running oscillator 12 which is used to drive the transmitter T in the aircraft A to transmit its pulse signals, for instance once every millisecond to mark the position of the aircraft A. The maximum pulse repetition frequency of the aircraft transmitter T can be determined by the maximum range over which the system is intended to be operative. Moreover, it may be desirable to reduce the pulse repetition frequency in the event that a larger number of aircraft are all participating in the system simultaneously.

Although four beacon stations delivering time of arrival data link pulse signals are sufficient to specify the position of the aircraft, it is desirable to use at least six stations in order to have a degree of redundancy in the system, and also in view of the fact that the system calls for weighting of the receiver inputs in certain ways which in some embodiments assume that more than the minimum number of stations required for a solution will transmit data. The criterion for selecting which stations S will participate in any particular positional determination should include the geometric position of the aircraft with respect to the grid of stations, a consideration of its altitude, and/or a determination of which stations have adequate signal strength to provide accurate TOA data, and/or considerations as to whether or not several of the selected stations have identical travel times from the aircraft to the CPS such that their signals tend to merge and be indistinguishable from each other at the computer.

In the absence of such problems as insufficient signal strength, or simultaneous arrival times of two relay station signals, the computer selects the relay stations according to a pre-prepared table for the purpose of selecting the most accurate $x$, $y$ and $z$ data. The requirement for accurate $x$ and $y$ data makes it necessary to use stations which are located at some distance from the point of projection onto the $x$, $y$ plane of the aircraft position, these stations being preselected to form geometry which is a non-colinear as possible. Conversely, for the purpose of obtaining the most accurate $z$-data, stations should be used which are as close as possible to directly underneath the aircraft. These two classes of computations are actually differently performed and require different weighting of the data as will be discussed hereinafter.

The system also includes in the several embodiments means by which its overall performance can be checked periodically. For instance, a subsequently described embodiment includes means at the CPS for determining and keeping track of the pulse repetition rate of the beacon and for opening the receivers to receive pulse signals from the aircraft only for brief intervals of time when the signals are actually expected, this being referred to hereinafter as the "guardband" feature, FIG. 8. Using this knowledge, the CPS can also trigger via wire 13a a fixed beacon 13, shown in FIG. 3, occupying a known test position with respect to the receiver relay stations S. By triggering this beacon at a non-interfering time, it can compare the times of arrival from the relay stations which are actually in use with times of arrival which are known to be correct since they are transmitted from the fixed position test beacon 13. This technique yields accurate knowledge of the current overall delays introduced by the various relay stations, and thereby provides means for both checking and calibrating their operation to be sure that it is satisfactory.

Figure 5:
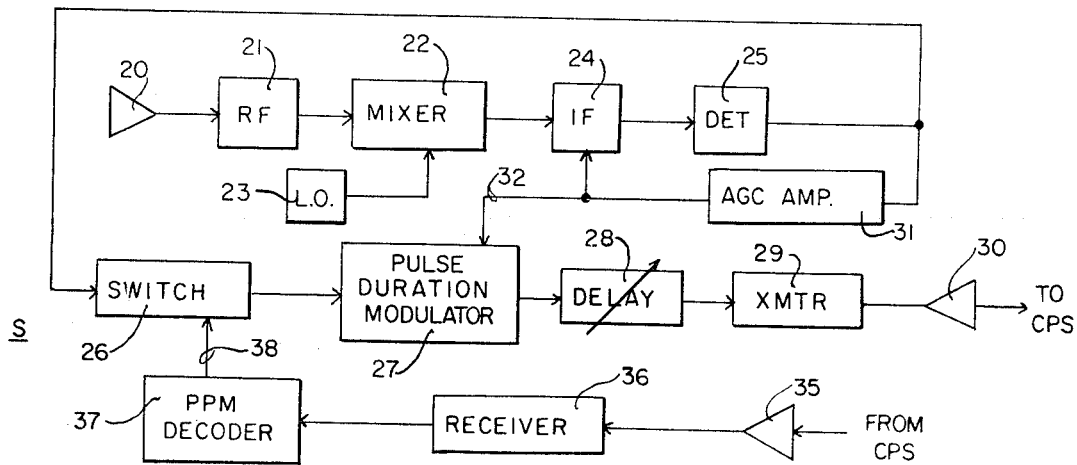
FIG. 5 is a block diagram showing interconnected major components which comprise a typical fixed position relay station.
Figure 6:
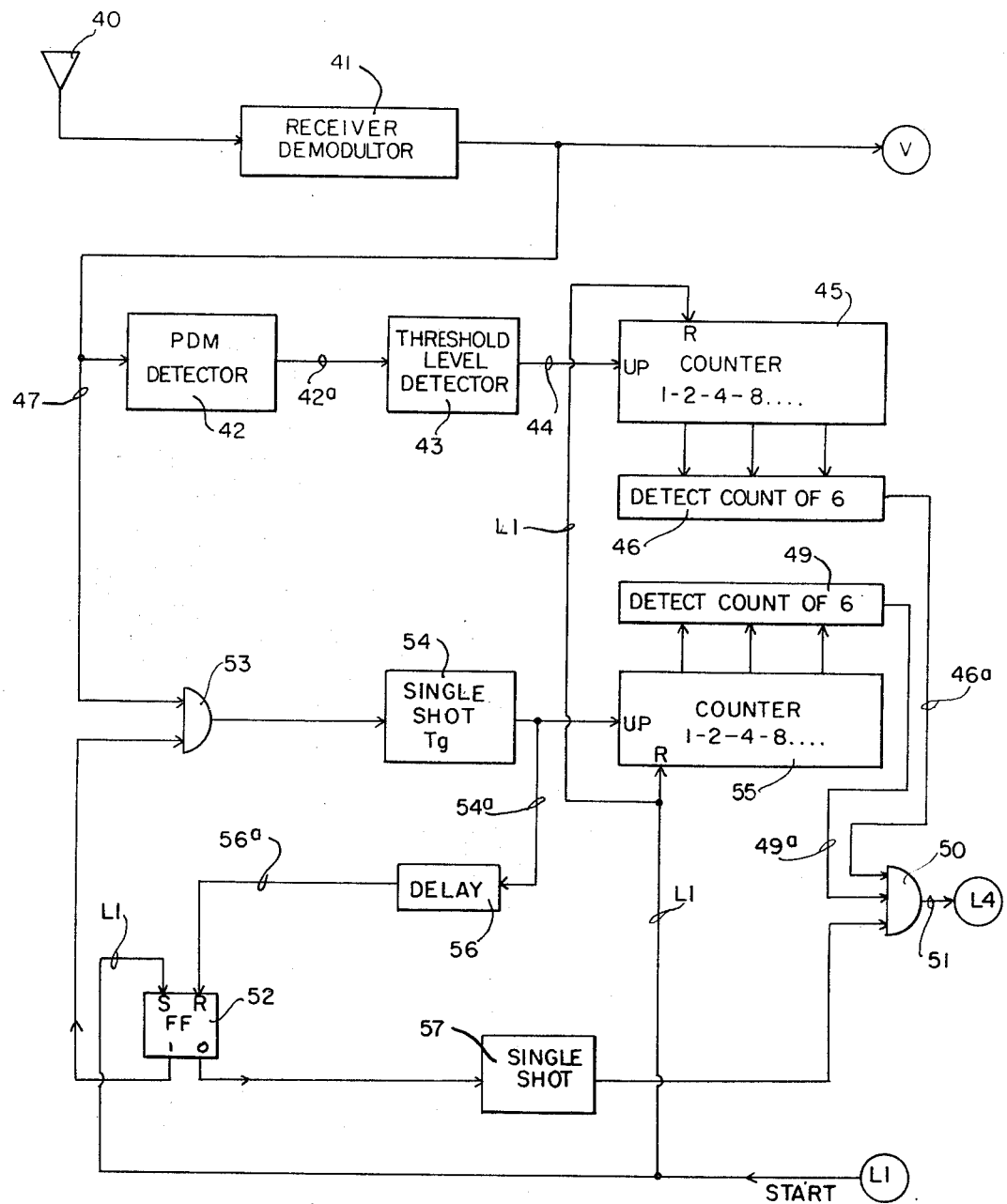
FIG. 6 is a block diagram of a subsystem for testing received aircraft pulse signals to determine whether they represent satisfactory information in the light of certain test criteria.

FIG. 5 shows a typical relay station S having an input antenna 20 designed to omnidirectionally receive pulse signals from the aircraft transmitter T, FIG. 1. These RF pulse signals pass through a typical receiver including an r-f section 21, a mixer 22, and a local oscillator 23 to produce an intermediate frequency which is amplified in the $i-f$ amplifier 24. The signal is detected at 25 and delivered to a switch 26, which is capable of either blocking passage of the demodulated video pulse signal or conducting it through the remainder of the circuit to the output data link antenna 30. When the switch 26 is conductive, the demodulated pulse signal is delivered to a pulse duration modulator 27, which produces a data pulse whose leading edge corresponds with the leading edge of the received RF pulse signal, or coded group, and whose trailing edge position is determined by the AGC level of the receiver at the time of reception of the pulse from the aircraft. The AGC amplifier 31 amplifies the detected video pulses and integrates them to form an AGC level on wire 32 which is proportional to the signal strength, and this level on wire 32 in turn determines the duration of the output data pulse from the pulse duration modulator 27. This output data pulse travels through a delay circuit 28 whose delay is adjustable and can be set in a manner described hereinafter for the purpose of calibrating the system. The output from the delay 28 passes into a transmitter 29 delivering output signals at a frequency which is different from the aircraft transmitter frequency, and which forms a data link together with the antenna 30 at the relay station S and an antenna 40 at the CPS end of the data link as shown in FIG. 6. The transmitter 29 normally has no output except when triggered by a duration modulated data pulse from the modulator 27 through the delay circuit 28, and when this occurs the output is an $r-f$ burst whose duration is equal to the duration of the data pulse from the modulator 27. The transmitters 29 at each of the relay stations S can all be tuned to the same frequency and can all be received by the same antenna 40 located at the central processing station to comprise the data links for delivering information coming from the relay stations to the CPS. In turn, the processing station as shown in FIG. 3 transmits via transmitter 19a at a different frequency through antenna 19b address signals to the various relay stations S, which signals are also pulse position modulated. The pulse position modulated signals from the central processing station are received at each relay station by the antenna 35 and the receiver 36 and are delivered to a pulse position modulation decoder 37 which is capable of recognizing the address of its own particular relay station when a group of pulses having the proper positional code are detected. In this event, a relay station activating signal appears on wire 38 to render the switch 26 conductive and permit that relay station S to transmit its data via the data link antennas 30 and 40 into the central processing station.

Figure 7:
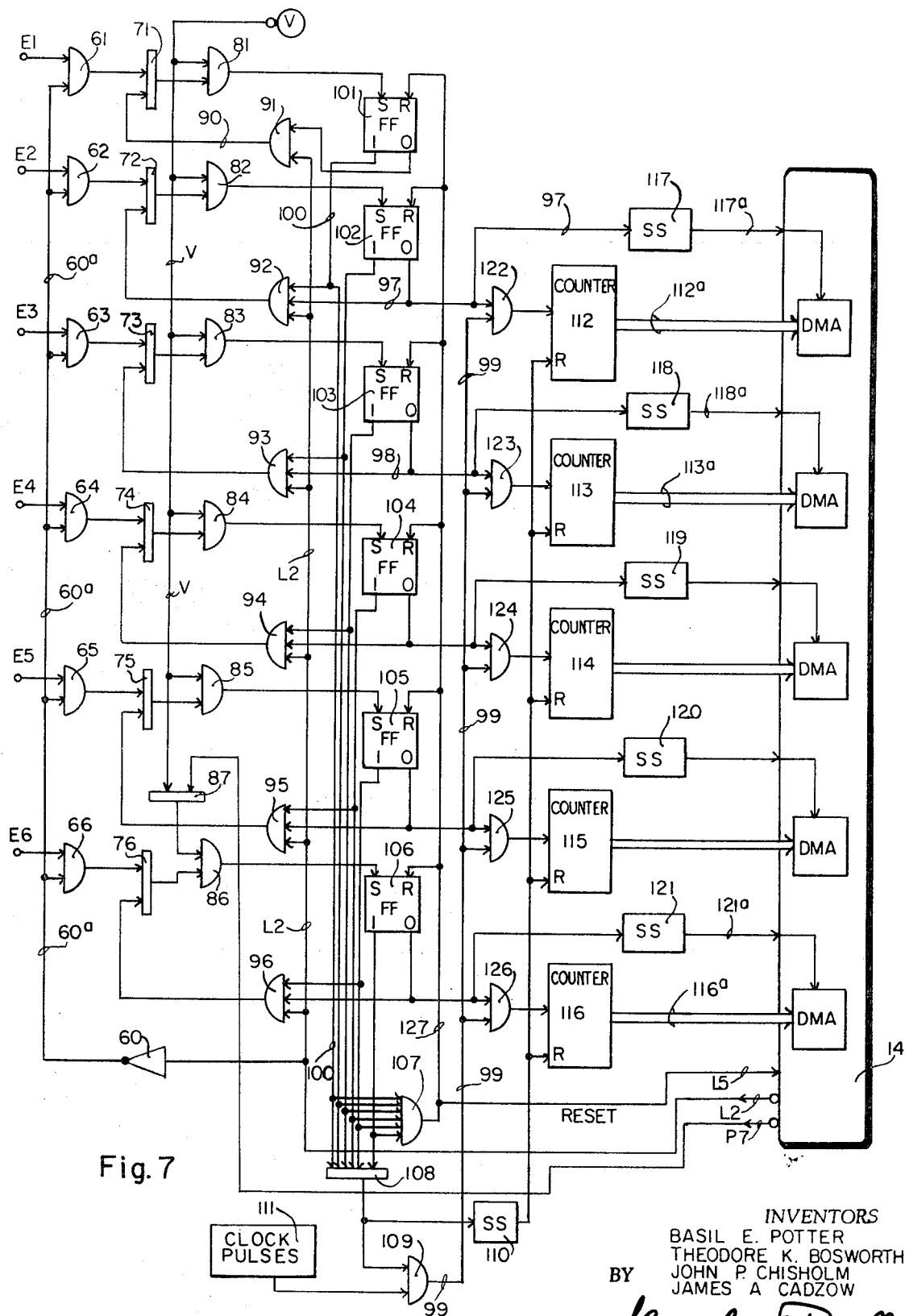
FIG. 7 is a block diagram of a subsystem for determining differential times of arrival of aircraft pulse signals at different ground stations.
Figure 8:
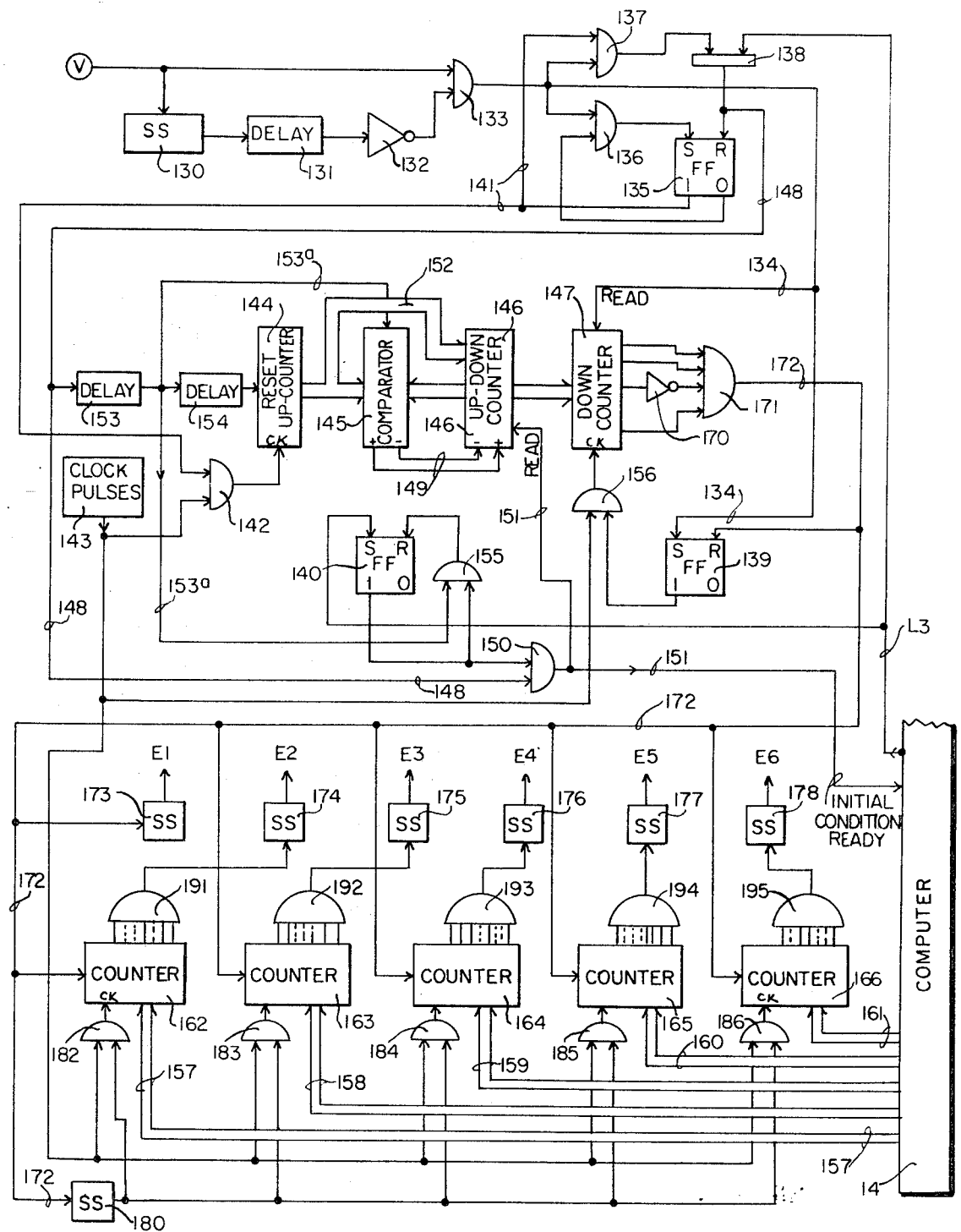
FIG. 8 is a block diagram of a signal guardband generator for enabling relay stations only at times when aircraft pulses are expected to be received.

The decoder 15 at the central processing station in FIG. 3 is shown in greater detail in FIG. 6 wherein the data link antenna 40 is connected to a receiver demodulator 41 which delivers received pulse signals in the form of detected video V on wire 47 which is then connected to various points within the central processing station, as illustrated for instance near the upper left-hand corners of FIGS. 7 and 8. The detected data link signal V on wire 47 in FIG. 6 is connected to a pulse duration modulation detector 42 which is coupled to a threshold level detector 43. The width of each received pulse is measured to determine its duration, and an output analog signal representing the measured width appears on wire 42a and is delivered to a threshold level detector 43. Each output on wire 42a represents a different data pulse signal from a different relay station. Thus, when the first of the enabled relay stations delivers its signal P₁, as shown in FIG. 4, its analog (AGC) level will appear on wire 42a, and if its level exceeds the minimum threshold level pre-set within the detector 43, the output on wire 44 will increment the counter 45 upwardly.

When the next pulse, P₂ in FIG. 4, arrives it will count the counter 45 upwardly again providing its level also exceeds the threshold set by the detector 43. In this way, if all six inputs are of satisfactory level, after the group G of pulses shown to the left in FIG. 4 has been received, the counter 45 will contain a count of six, and this count will be detected by the detector 46 to enable one input wire 46a to the gate 50. However, if six pulses of amplitude exceeding the threshold level are not received, there will be no output from the detector 46 to enable the input 46a to the gate 50.

The output L4 on wire 51, in FIG. 6 from the gate 50, when present, is used to inform the computer via the interface 16 that the six stations have provided satisfactory input TOA data. However, this cannot occur unless six distinct inputs are received, and unless they all have satisfactory signal levels. In the lower part of FIG. 6 there is a circuit whose purpose is to verify that there have in fact been six separate input pulses from the relay stations enabled or selected by the computer, this verification showing that no two of the stations have coincident signals resulting for instance from equal path lengths to the CPU which would provide mutually indistinguishable inputs to the computer. As a matter of fact, each pulse should be received distinctly from any other pulse to the extent of a guardband width which is selected as $T_g$ microseconds in duration, see FIG. 4. When the computer has made a selection of six stations, it issues via the interface 16 a "start" pulse on line L1 which sets the flip-flop 52 and thereby enables one side of an AND gate 53 which controls the admission of pulses from the receiver demodulator 41 via wire 47 into the six-pulse verification circuit comprising the lower half of FIG. 6. The arrival of the first pulse on wire 47 fires a single shot 54 which emits a pulse whose total width is equal to a predetermined guardband whose width $T_g$ is a little wider than the widest pulse duration modulated signal that can be transmitted via the data link from a pulse duration modulator 27 in a relay station, this pulse appearing on wire 54a. Each such pulse counts the counter 55 upwardly from its reset count of zero so that the counter 55 now contains a count equal to the number of pulses received so far in a group G. The output from the single shot 54 as a result of the first pulse in the group G passes through a delay circuit 56 which delays the pulse by an amount equal to the maximum time $T_{max}$ between reception of a first pulse and a last pulse appearing in a group G of pulses as shown in FIG. 4, which group G results from a single transmission by an airborne beacon. In other words, the delay 56 is equal to the maximum separation between pulses resulting from the selection of any two widely separated stations in the grid of receiving stations S. This first input pulse $P_1$ passing through the one-shot 54 during the guardband $T_g$ has counted the counter 55 upwardly, but if an additional pulse P2 is received from another station it will not again trigger the single-shot 54 unless it is separated from the first pulse P1 by spacing at least equal to the guardband width $T_g$, FIG. 4. If the separation between pulses is greater than the time $T_g$ the counter will be counted upwardly again by each succeeding pulse. Thus, if six pulses occur in sequence and are all separated by a time greater than $T_g$, the counter 55 will attain the count of six before the time $T_{max}$ ends and the pulse delay circuit 56 passes the first pulse P1 to reset the flip-flop 52. If any adjacent two pulses are closer together than the time $T_g$ of the guardband, the counter 55 will contain less than the count of 6 when the flip-flop 52 is reset by having the first pulse arrive on the wire 56a. The resetting of the flip-flop 52 fires a brief pulse through the single-shot 57 so that all three inputs to the gate 50 are momentarily enabled. The gate thus puts out a pulse on wire 51 indicating that six distinct pulses have been received and that all six of them have adequate amplitude, and the L4 output on wire 51 then enables the computer to proceed by using those selected stations $S_1$ through $S_6$ to compute the position of the aircraft, their output data having met the initial criteria demanded by any selected stations. If either of the above criteria fails, the computer receives no enabling pulse on wire 51, and is thereby informed that it must select alternate stations from those available to cover the particular area in which the aircraft is presently located. The process then begins again with the newly assigned stations to determine whether all of these newly selected stations meet these same criteria of adequate amplitude and adequate signal pulse separation. By utilizing knowledge of the anticipated time-of-arrival of any pulse made available by the guardband circuit of FIG. 8, discussed hereinafter, it is possible to ascertain which, if any, of the selected stations fails to meet the criteria. This facilitates the selection of a new set of stations, when necessary, since in general most of the original set can be retained. Thus far it has been assumed that the approximate aircraft position is somehow known to the computer so that it can use this information to determine which set of stations to select as a next choice. This is of course true only if the aircraft has been under surveillance during previous computation cycles. If not, the computer must first approximate the aircraft position by a process referred to hereinafter as initial acquisition. If the aircraft has just appeared in the grid of stations, or the system has just been turned on and does not contain information as to the approximate location of the aircraft, the computer will first select from its table a group of stations which will give a rough initial fix as to the aircraft position, such stations for instance including stations at the four corners of the grid, and perhaps several stations located nearer the center of the grid. This initial selection of stations is not optimum by any means, but is intended to determine the rough position of the aircraft closely enough so that the next selection of stations made by the computer can be more nearly optimized. Thus, for present purposes it will be assumed that the system is in an initial-acquisition mode when the "start" pulse on wire L1 was emitted by the central processing system. The "start" pulse will reset the counters 45 and 55, set the flip-flop 52 so as to permit the circuitry in FIG. 6 to perform the tests on the initial data emitted from the initially selected six stations. Then when an output from decoder and verification circuit 15 appears at L4 on wire 51 indicating that a satisfactory set of six stations has been selected from the point of view of received-signal amplitude and separation in real time, the computer can then proceed, using the circuitry shown in FIG. 7, to compute an initial rough approximation of the position of the aircraft using this initial wide dispersion of receiver stations.

The digital computer 14 shown in FIG. 3 is also included as part of FIG. 7 and has two kinds of input-output registers available. First, there are certain direct-memory access (DMA) locations within the computer which are permanently tied to certain registers of the differential ranging system shown in FIG. 7, and serve only to remember their respective data. Aside from these DMA locations, the computer also has the usual parallel input-output bus system accessing various registers and accumulators within the computer which are used when the computer is actually making computations. The immediate discussion is concerned with the various direct-memory access storage locations within the central processing unit which cooperate with certain registers within the differential ranging system of FIG. 7 which will now be discussed.

DIFFERENTIAL TO A CIRCUITRY

FIG. 7 shows a circuit for determining and temporarily storing differences in times of arrival of the aircraft emitted signal at six stations which are being activated by the computer at any particular time. The particular identities of the stations will vary from time to time, but since for purposes of this illustrative embodiment there are always six stations being considered there will always be five differences in times of arrival. FIG. 7, therefore, shows five digital registers 112, 113, 114, 115, and 116 for accumulating and temporarily storing the differential times of arrival. In general, the circuit operates by turning on all five registers to begin counting clock pulses, and then turning the clock which counts pulses to the registers off one at a time as the signal pulses arriving at the various relay stations S are delivered through the data link system to the central processing unit, these pulses all appearing in the order in which they are received on the wire V at the top of FIG. 7. When the clock pulses to all the registers are turned off, each register then contains a count proportional to the difference in time of arrival of a pulse signal at the first station to receive a signal from the aircraft as compared with the station whose pulse was just used to turn off that particular counter. Since the counter when turned off then contains the desired information, an associated single-shot 117, 118, 119, 120 or 121 then puts out an output informing the computer 14 that the data is stored there and causing the data to be strobed into the computer.

The differential TOA circuitry shown in FIG. 7 is capable of operating in two different modes. Normally, it operates in a mode in which the circuitry is enabled by inputs occurring sequentially on wires E1, E2, E3, E4, E5 and E6 which comprise guardband enable signals. Moreover, as will be shown in connection with FIG. 8, because of the fact that the repetition rate of the aircraft oscillator 12 is very stable the system knows when a pulse should occur from the first remote station S, which is assumed to be the one closest to the aircraft, and it puts out an E1 guardband enable signal just before the pulse should occur and for a brief time afterwards. This signal then disappears, and the E2 signal appears at the moment when the second remote station to receive the aircraft pulse should be heard from, and so on.

However, this normal mode of operation requires a knowledge of the location of the aircraft and of its pulse repetition frequency, neither of which is known during initial acquisition of the aircraft by the system for tracking purposes. Therefore, the system also is provided with the capability of operating in an initial acquisition mode which requires no prior knowledge concerning the position of the aircraft. This initial acquisition mode is commenced when the computer delivers a signal on wire L2, near the bottom of FIG. 7, which signal is programmed into the computer and remains present during subsequent operation of the differential TOA circuitry. During such initial acquisition, the signal on wire L2 passes through an inverting amplifier 60 and places a disabling signal on wire 60a, thereby disabling the row of gates including gates 61, 62, 63, 64, 65, and 66, which are enabled during the normal mode of operation based upon the guardband signals E1 through E6.

When the computer is delivering the initial acquisition signal on wire L2, this signal enables the lowermost input to each of the gates 91, 92, 93, 94, 95, and 96, these gates being used only during the initial acquisition mode. Initially, the flip-flops 101 through 106 are all in reset condition, and this means that a center input to each of the gates 91 through 96 is energized. However, the gates 92 through 96 are blocked because their uppermost inputs are not energized at the present moment by the flip-flop located above and to the right of that particular gate. Only the two-input gate 92 is fully energized because flip-flop 101 is in reset condition thereby energizing its upper input. Thus, gate 91 has an output on wire 90, and this output passes through the OR gate 71 and enables the gate 81. When the first pulse arrives on the wire V, from FIG. 6, the pulse coming from whichever receiving station is closest to the aircraft, it passes through the gate 81 and sets the flip-flop 101, thereby blocking the gate 91 but enabling the gate 92 through wire 100. The setting of the flip-flop 101 disables the gates 91 and 81, thereby leaving the flip-flop 101 in set condition, but the signal on wire 100 also enables the gate 92 which passes a signal through OR gate 72 and enables the gate 82 so that during the next reception of a pulse from a remote station on wire V, a signal can be passed through the gate 82 to set the flip-flop 102. However, before this happens and as an immediate result of setting the flip-flop 101 the signal on wire 100 passes downwardly through the OR gate 108 and enables the AND gate 109 so that clock pulses from the source 111 can pass through the gate 109 to the wire 99. Moreover, the signal on wire 100 which passes through the OR gate 108, initiates a reset pulse through the single-shot 110 and resets all of the register counters 112, 113, 114, 115, and 116. The duration of this signal from the single-shot 110 is long with respect to the time required to determine the TOA differential for all six of the stations, and only its leading edge resets the register counters 112 through 116. Thus, when the flip-flop 101 is set, clock pulses are applied to the line 99 and hence to all of the gates 122 through 126. Since the other flip-flops 102 through 106 are all in reset condition at this moment, the first received aircraft pulse signal enables all of the gates 122 through 126, and therefore all five of the counters 112 through 116 begin counting pulses from the clock, commencing at the moment of admission of the first aircraft signal through the gate 81.

Upon arrival of the same aircraft signal through a second receiving station, this signal is demodulated and passes through the gate 82, which has been enabled via the gates 92 and 72, and proceeds to set the flip-flop 102. The immediate result of setting the flip-flop 102 is to remove the enabling signal on wire 97 from the gate 122 and thereby block clock pulse line 99 and prevent further counting up of the register counter 112. This register then retains its count but adds nothing thereto, whereby its content is proportional to the difference of time of reception between the first and second received pulses in a group being received by the system. However, the trailing edge of the enabling signal which is being removed from the wire 97 by the setting of the flip-flop 102 triggers a single-shot 117 and delivers a signal on wire 117a informing the computer that the register counter 112 now contains and is ready to deliver a count representing the first TOA differential, this count appearing on the parallel binary wires 112a and being set into the computer's direct memory access register DMA by the signal on wire 117a. Moreover, the setting of the flip-flop 102 enables the gate 93 and therefore enables the gates 73 and 83, so that when the next relay receiver delivers the aircraft pulse signal on wire V, it will be used to set the flip-flop 103. The setting of the flip-flop 103 will then block the clock pulse gate 123 and leave stored in the register counter 113 a count proportional to the time difference between reception of the first aircraft pulse by the system and reception of the third pulse thereby. This disappearance of the signal on wire 98 by the setting of flip-flop 103 also triggers the single-shot 118 and sends a signal to the computer on wire 118a signalling that the register counter 113 now contains and is applying to the binary parallel wires 113a and to the computer's DMA a count proportional to the difference in time of reception of the aircraft signal at the first and third relay stations. The system progresses in this manner sequentially activating gates 94, 95, and 96, and permitting the sequential setting of flip-flops 104, 105, and 106 by the fourth, fifth, and sixth received pulses on wire V so that the register counters 114, 115 and 116 will contain on their output buses binary counts proportional to the difference in time of arrival of the aircraft signal respectively at the fourth, fifth, and sixth relay stations as compared with the time of arrival of the signal first received from the aircraft. Thus, eventually the computer will have available to it in these registers and entered in its own DMA registers five differences in times of arrival from which it can make a first computation to approximate the position of the aircraft above the receiving station grid. When all six flip-flops 101 through 106 are in set condition, the AND gate 107 will deliver an output on wire 127 to reset all six of the flip-flops and at the same time deliver a signal to the computer on wire L5 indicating that the five TOA signals are all in its direct memory access registers and ready for the computer's program to take over the function of computing the position of the aircraft.

At this point, the computer has been informed as to the differences in times of arrival of the first pulse as compared with each of the other subsequent five pulses received from the aircraft, but no information is available relating to which ground station relayed which of the received pulses to the system. In order to obtain this information, the computer selects and turns off one of the six active relay stations and waits for a new set of times of arrival to develop in the register counters 112 through 115. The last pulse will of course be absent and therefore the register counter 116 would not be turned off by setting of the flip-flop 106. In order to make up for this deficiency, the computer sends a pulse on line P7 and passes this pulse through the gates 86 and 87 to set the last flip-flop 106 and thereby completes the picture. From this newly acquired set of times of arrival the computer can determine which of the stations was turned off. For instance, assuming that it was not the first station that was turned off, the first register of the group 112 through 116 to contain a substantially different time of arrival will correspond with the receiver whose pulse has been turned off by the computer and will therefore identify whether it was the second, third, fourth, fifth or sixth station which was turned off. In this way the pulses of the second, third, fourth, fifth and sixth stations can be matched up with the station which is turned off each time. On the other hand, if the first station is the one which the computer has just turned off, then all of the registers 112 through 116 will be different. The computer performs this determination of which pulse matches which relay station sequentially until it has matched all of the pulses with all of the stations. From then on, however, it will be able to keep track of the pulses without performing this sequence again, unless a loss of track should occur, at which time the initial acquisition cycle described herein would again commence.

Thereafter, having completed the initial acquisition mode, the signal from the computer on wire L2 disappears, thus blocking the gates 91 through 95 inclusive but once again enabling the lower inputs 60a to the gates 61 through 66 by way of the inverting amplifier 60.

As indicated above in detail, during the initial acquisition mode of operation the gates 91 through 96 inclusive enable the gates 81 through 86 sequentially to cause the six pulses as received through the six remote receiving stations to set the flip-flops 101 through 106. Conversely, during the normal mode of operation of the system, meaning during the cycles of operation which follow the initial acquisition cycle, it is the gates 61 through 66 instead of the gates 91 through 96, which sequentially enable the gates 81 through 86 to admit the six pulses received by the remote stations for the purpose of sequentially setting the flip-flops 101 through 106 as previously described. When the initial acquisition signal on wire L2 is absent, the wire 60a has a signal on it which enables the lower inputs to the gates 61 through 66 simultaneously, but their upper inputs are enabled sequentially by signals appearing on the wires E1 through E6 in sequence. These six signals are the guardband enable signals which are created in a separate guardband generator which is described in the next section of the specification herebelow. The guardband generator anticipates the moments when the six relay station pulse signals are to be expected and then opens the gates 61 through 66 sequentially at the correct times to admit each pulse, with a small guardband space on each side of the exact moment of anticipated arrival. As will be described below, this is accomplished by noting the pulse repetition frequency of each aircraft transmitter and noting the moments when the pulses were received the last time by the various stations involved, or ones located near thereto.

In the manner described below, just before the first pulse is expected, an enabling guardband signal is delivered from the circuit in FIG. 8 to the wire E1 in FIG. 7, and it enables the gate 61 which then delivers an enabling signal through the OR gate 71 to enable the AND gate 81 at its lower input. When the first demodulated aircraft signal pulse is actually received from a relay station on the wire V coming from the receiver 41 in FIG. 6, the pulse sets flip-flop 101 and thereby starts all of the register counters counting as described in detail above. Thereafter, when the second aircraft pulse is anticipated from the receiver 41 on wire V, a guardband enable signal appears on wire E2 and enables the gate 62 which then passes an enabling signal through the OR gate 72 to enable the lower input of the AND gate 82. When the next pulse is received from the aircraft by way of the data link receiver 41, this pulse passes from the wire V through the gate 82 and sets the flip-flop 102, thereby stopping the count of the register counter 112 to retain therein the time difference between the arrival of the first received aircraft pulse and the second received pulse. In like manner, the remainder of the six guardband enable signals appear on wires E1 through E6 and when the received aircraft pulses have set all the flip-flops 101 through 106 a reset pulse is delivered by the gate 107, thereby signalling to the computer on line L5 that all five differences in TOA are now in the direct-memory access registers DMA and ready for use, the signal from gate 107 on wire 127 also resetting the flip-flops 101 through 106 as has previously been described.

The embodiment of the invention just discussed assumes that there will be more relay stations available in the grid than are used by the computer in making a determination of the location of the pulse signal emitting object, namely an aircraft as discussed in the present embodiment. However, it is perfectly possible to have a smaller number of stations, for instance than those shown in FIG. 2, and to use all of the stations for all position determinations, weighting their various contributions according to some criteria, including for instance the position of the aircraft with respect to the stations. There is shown in the center of FIG. 2 a cluster of stations including those located upon and within the dotted line circle 0, and these may for present illustrative purposes be considered as the only stations in the grid. Such a situation is highly practical for a test range where the accuracy and calibrations of radar systems, missile guidance systems, bombing sight systems, etc., can be tested. For this purpose a range which is of only small geographic extent would be entirely adequate, and the stations outside of the dashed line circle in FIG. 2 could be omitted altogether. When using only a relatively few relay stations it would merely be necessary to increase the number of counters shown in FIG. 7 from the five counters 112 through 116 shown therein to a larger number of counters including one less counter than the number of relay stations. If the stations on and within the dotted line circle 0 in FIG. 2 were used, 14 counters would be necessary in FIG. 7 to register the differences in times of arrival since there are 15 stations shown in this grouping. In this event, it might be desirable for the computer to sequentially read their outputs at fixed intervals after reception of the first signal from the aircraft in view of the fact that the array of ground stations would remain constant for all position determinations. This would represent a slight saving in equipment complexity as a result of a somewhat simpler situation not requiring relay station selection by the computing system. In view of the fact that from time to time certain of the relay stations might fail to report, for instance, when the attitude of the aircraft was such as to mask its antenna with respect to that particular ground station, it would be desirable to incorporate in the computer program means for detecting which one of the various ground stations failed to deliver data to the computer in response to the transmission of pulse signals by the aircraft. This could readily be accomplished by using the information available in the guardband generator whose function it is to anticipate the exact moment when that station should be reporting data, as will now be discussed.

GUARDBAND GENERATOR

The preceding portion of this specification described the manner in which the differential TOA circuitry obtained, identified, and stored in the computer the differences in times of arrival for the six ground stations selected by the computer. Assuming that this information is now in the DMA registers, the present section of the specification will describe a guardband generator which will generate six different enabling pulses, E1, E2, E3, E4, E5, and E6. A single pulse is generated at a time which will overlap in real time the instant when one of the six pulse signals from a remote station is anticipated. Thus, the guardband generator generates six pulses every time a group G of aircraft pulses as shown in FIG. 4 is expected, with one guardband pulse overlapping in time one of the received pulses. The circuitry in the upper left-hand corner of FIG. 8 serves the purpose of accepting the first pulse in each group of six pulses and eliminating the subsequent five pulses. The incoming six pulses will arrive from the data link receiver 41 on wire V and will be fed into a single-shot 130 which puts out a pulse whose duration is as long as the longest possible group G (FIG. 4) of six pulses, meaning the maximum separation between any two pulses of which the system is capable for a particular grid layout of stations. This pulse is triggered by the first of the aircraft pulses to arrive on line V but it is delayed in the delay circuit 131 by one pulse width before it is applied to the inverter circuit 132. In the absence of an input to the inverter 132 the gate 133 is enabled, and since the single-shot pulse has been delayed by one pulse width the first pulse in each group on wire V will pass through the gate 133 whereas the subsequent five pulses will be blocked from passage therethrough. During subsequent groups of pulses the same thing will happen so that only the first pulse in each group of pulses corresponding with a single transmitted aircraft pulse will be passed through the gate 133. Assuming that the flip-flop 135 is in reset condition, the gate 136 will be enabled but the gate 137 will be blocked. When the computer is ready to have the guardband generator operate, it will send out a pulse on line L3 and this pulse will reset the flip-flop 135 and will set the flip-flop 140. With the flip-flop 135 in reset condition, the first pulse received in the first group of signals from an aircraft will pass through the gate 133, through the gate 136, and set the flip-flop 135. The setting of flip-flop 135 blocks the gate 136 and enables the gate 137 so that during the next later group of pulses received from the aircraft the first pulse will pass through the AND gate 137 and the OR gate 138 and reset the flip-flop 135. However, during the interval between the first and second group of pulses, since the flip-flop 135 is in set condition, its output on wire 141 will enable the AND gate 142 and permit it to pass clock pulses from the clock pulse source 143 to the up-counter 144. Thus, the up-counter will continue to count clock pulses until the first pulse in the second group of aircraft pulses is received, at which time the flip-flop 135 will be reset, thereby blocking that gate 142 and the gate 137 and enabling the gate 136 again. Thus, at this moment the up-counter 144 contains a total number of pulses proportional to the spacing between the earliest pulse received respectively in the first and second groups G of aircraft pulses, i.e., proportional to the period of the aircraft oscillator 12. These pulses are the first to arrive at the system after the guardband generator was placed into operation by pulsing of the line L3 from the computer 14. The same pulse which reset the flip-flop 135 appears on the wire 148 to enable the gate 150, and since the flip-flop 140 is set, an output appears on wire 151 to pulse the read terminal of up-down counter 146. The read terminal pulse at counter 146 causes the contents of counter 144 to be forced into the up-down counter 146 through the bus wires 152 so that these counters both contain the same count at the present time. The signal on wire 148 also passes through two brief delay circuits 153 and 154, and resets the up-counter 144 to zero. Thus, the count representing the repetition rate of this particular aircraft signal transmissions has been transferred to the counter 146 where it now remains. The signal from delay circuit 153 passes downwardly through wire 153a, passes through the enabled gate 155 and resets the flip-flop 140, thereby disabling gates 155 and 150.

Note that the output of gate 150 on wire 151 which pulsed the read terminal of counter 146 was also sent to the computer to indicate to it that the present system is now ready, and has established an initial estimate of the aircraft's pulse repetition rate currently contained in the up-down counter 146. The ready signal on wire 151 causes the computer to transfer into the counters 162, 163, 164, 165, and 166, the five differential TOA counts stored in DMA locations shown in FIG. 7, via the cables 157, 158, 159, 160, and 161, for the purpose hereinafter stated. Recapitulating, at this point the initial estimate of the aircraft pulse repetition rate is contained in the up-down counter 146. Two groups of aircraft-initiated pulses have passed through the system shown in FIG. 8, and the system has used the first pulse in each group to establish the repetition frequency. The flip-flop 135 is now reset, the flip-flop 140 is also reset, and the counter 144 has been reset to zero.

When the third group of pulses arrives in the system, its first pulse will be routed through the gate 133 to set the flip-flop 135 and thereby enable the gate 142 to commence counting pulses from the clock source 143 into the up-counter 144, which count will continue until the first pulse arrives in the fourth group to be received from the aircraft, at which time the flip-flop 135 will again be reset. This reset is accompanied by a pulse on wire 148 which passes through the delay line 153 and through the delay line 154 to reset the up-counter 144, but not before the comparator 145 has been enabled by the wire 153a and has had an opportunity to compare the contents of the up-counter 144 with the contents of the up-down counter 146. As a result of the comparison of the contents of the registers 144 and 146, if the content of the counter 146 is greater than the content of counter 144, the comparator will decrement the counter 146 by one bit, but if the content of the counter 146 is less than the content of the counter 144, the comparator will increment the count in the counter 146 by one bit. This decrement or increment will be made through the lines 149 each time a comparison is made as of a result of pulsing the comparator 145 via the wire 154. Immediately thereafter, the up-counter 144 is reset, and the up-down counter 146 has had its count corrected somewhat toward a reading more accurately estimating the repetition rate of the aircraft signal pulses. The circuit proceeds to operate in this manner, periodically correcting the count in the up-down counter 146.

The output on wire 134 representing the first pulse in each group also pulses the read terminal of the down-counter 147 each time a new group of pulses is received. This pulse forces the content of the up-down counter 146 as it currently exists into the down-counter 147, while at the same time the pulse on wire 134 sets the flip-flop 139. The duration of the guardband which the present system seeks to establish around each incoming pulse will be a certain number of microseconds on each side of the pulse, and it is one purpose of the circuit shown in FIG. 8 to establish when the next pulse is anticipated and then cause the guardband overlapping that pulse to be generated one-half of the width of the guardband prior to the actual anticipated pulse arrival time. Therefore, since the present estimated repetition period has just been transferred into the down-counter 147, the count in that down-counter can be counted towards zero in order to estimate when the first pulse in the next group will arrive, the pulse being expected at the time when the down-counter 147 would actually reach zero if counted all the way down. Therefore, the present circuit counts it toward zero, but stops short of zero count when the down-counter 147 reaches a residual count equal to one-half of the guard space. If the system then issues the guardband enable pulse on wire E1 at the moment when the down-counter 147 is within half a guardband of the next anticipated pulse, the pulse should arrive substantially in the center of the enabling guardband pulse E1 whose use has already been described in connection with the differential TOA circuitry discussed in connection with FIG. 7.

The flip-flop 139 having been set by the same aircraft pulse that caused the transfer of the contents of the up-down counter 146 into the down-counter 147, clock pulses begin flowing through the gate 156, counting the counter 147 downwardly. The logic shown to the right of the down-counter 147, and including as an illustrative example an inverter 170 and the AND gate 171, is wired to the down-counter 147 to recognize the moment when its count corresponds with one-half of a guardband width. At this point, an output appears on wire 172 to reset the flip-flop 139 and to pulse the single-shot 173 and cause it to deliver a guardband pulse E1 whose width is such that the anticipated aircraft pulse should arrive in the middle of it. The guardband pulse E1 is applied to the gate 61 in FIG. 7 to enable passage of the first aircraft pulse for the purpose of beginning the process of determining the differences in times of arrival. Of course, if the aircraft pulse does not arrive within this guardband the pulse will be rejected when it does arrive and the computer will not receive the differential times of arrival which it expects from FIG. 7, thereby indicating error in the system. The computer is programmed to begin all over again with a new acquisition mode cycle by pulsing the wire L2 in FIG. 7 in this event.

As pointed out earlier in the discussion, the differential times of arrival have been inserted into the down-counters 162, 163, 164, 165 and 166 from the computer, and it should, therefore, be apparent that the next pulse, the second one in the same group of pulses, should arrive when the down-counter 162 has been counted to zero since its count represents the real-time delay between the arrival of the first and second pulses. Therefore, the wire 172 is used to pulse the single-shot 180 to place enabling signals on the gates 182, 183, 184, 185, and 186. Clock pulses from the source 143 then count the down-counters 162 through 166 downwardly. Note that the count stored in each of the counters 163 through 166 is progressively greater than the count in the one located just to the left of it. Hence, the down-counter 162 will be the first to reach zero and will fire the single-shot 174 thereby issuing a guardband pulse E2. A few moments later, the down-counter 163 will reach zero and fire the guardband single-shot 175 to produce the pulse E3, and so on through the guardband single-shots 176, 177, and 178 until all six of the guardband enable pulses E1 through E6 have been generated and applied along the left-hand margin of the circuit in FIG. 7, to enable the passage of aircraft pulses which are expected at those times. The single-shots 173 through 178 all have an output of duration equal to one guardband width, and the single-shot 180 has an output of duration equal to the maximum separation between any two pulses within a group, so that after an entire group has had an opportunity to pass, the clock pulse gates 182 through 186 will be disabled again.

MULTIPLE AIRCRAFT

The present system can be operated to locate multiple signal-emitting objects simultaneously within the grid of stations, such as aircraft using one of a number of different techniques, some of which are quite well known in the prior art. For instance, separate frequencies can be used for each pulse-emitting object so that the computer can distinguish them one from the other by frequency. Another similar approach uses unique coding for each pulse signal transmission from a particular aircraft so that suitable decoding systems at the ground stations or at the central processing system can provide unique identification of the signal source. A third technique, which is widely used in aircraft collision avoidance system, is to synchronize the various pulse emitting aircraft with a common time base comprising a repeating cycle, and to have each of the aircraft transmitters occupy a definite uniquely assigned portion of the repeating time base.

The present disclosure provides a fourth technique which requires no unique frequencies, codings, or synchronization of the various transmitting aircraft. This technique involves an extension of the guardband scheme which has just been discussed in connection with FIG. 8. FIGS. 9a, 9b, and 9c provide an illustration of a simple example. FIG. 9a shows a base line which represents real time, and shows pulse signals asynchronously transmitted from two aircraft to be located, one of them being labelled H and the other one being labelled J. Accordingly, as time progresses the two objects approach the same instant of transmission and then cross each other. In the first three transmitted pulse groups, the pulse transmitted by the aircraft H occurs first and the aircraft J transmits afterwards, but in the third grouping of transmissions it will be noted that the H and J transmissions are rapidly approaching coincidence, and that in the fourth, fifth, and sixth groupings, their time of transmission have reversed so that the aircraft J transmits first and the aircraft H transmits afterwards. FIG. 9b shows data received from the enabled relay stations at the central processing system as a result of these transmissions. The data received in the first grouping as a result of the H and J transmissions is fairly well separated, but by the time the third and fourth groupings appear the data is interspersed. Finally, in the fifth and sixth groups the J data leads the H data and no longer interlaces therewith. FIG. 9c is an enlargement of the fourth grouping of data in FIG. 9b wherein the various pulses are interspersed so that it would be difficult to determine which pulses result from the H aircraft and which pulses result from the J aircraft. For the sake of easy illustration the H pulses have been made of greater amplitude than the J pulses, but this is only a pictorial expedient which does not represent a probable practical situation in which the pulses received at the various selected relay stations would be randomly sized as to amplitude, depending upon a number of different factors including the attitude of the aircraft transmitting antennas as well as their distances with respect to the various reporting relay stations, etc.

By selecting relay stations such that the lengths of the paths linking the transmitting aircraft to the central processing station through the selected relay stations differ by amounts greater than the anticipated measurement inaccuracies, the probability that any two pulses will be received within one guardband time interval corresponding with the size of this expected inaccuracy is relatively low. In the event that it does occur, the computer will simply disregard the data for that particular pulse signal transmission from the aircraft involved. The diagrams of FIG. 9 are of course compressed and therefore deceptive in view of the fact that they show the pulses as being rather close together with only small separations between pulse groupings, whereas in a practical situation the pulse groupings will be very much more widely separated. Using circuitry similar to that shown in FIG. 8, the system can then determine the moments when data based on the pulse signal from one aircraft is expected to arrive at the central processing station. For instance, in FIG. 9c the first pulse will occur at $j1$, the second pulse will occur at $j2$, and the third pulse at $j3$ . . . and so on until all six of the pulses have occurred. Having received the first pulse j1, the system then expects the second pulse $j2$ at a known time followed by the third pulse $j3$ at another known time, and the system generates the appropriate guardband signals E1, E2, and E3. However, before the pulse $j4$ occurs the pulse $h1$ occurs and will be ignored by the circuitry of FIG. 8 which is following the j pulses. Therefore, separate figure eight-type circuitry will have to be provided for use in anticipating the H pulses, and in opening the gates in FIG. 7 to the pulses $h1, h2$ . . . $h6$ at appropriate times. For this reason a different guardband enabling signal E will be delivered by a different circuit of the type shown in FIG. 8 to enable the passage of the pulse $h1$. Subsequent enabling signals E will occur for the pulses $h2$ and $h3$, and so on to $h6$. Thus, the two groups of pulses can pass each other with satisfactory lack of confusion in most instances, and the computer will be programmed to simply ignore occasional groupings occurring during moments of actual coincidence, for instance, or to select different relay stations so as to eliminate the coincidence. It is of course desirable that the oscillators 12 in the various aircraft beacon transmitters are not mutually synchronized but have somewhat different repetition rates so that if they should drift into coincidence, such coincidence will remain for only a brief interval of time before giving way to a clarification of the situation by having the pulse groups emerge separately as shown in the last two groupings of FIG. 9b. The circuit of FIG. 8 predicts when the signal from each relay station relating to a particular transmitting object will occur and ignores all other signals occurring in the vicinity thereof. In the above manner the computer, when equipped with multiple separate circuits of the type shown in FIGS. 7 and 8, is able to keep track of a large number of aircraft or other pulse signal transmitting objects located within the region of its ground station grid without significant confusion, any confusion lasting for only a brief moment when it does occur.

WEIGHTED SOLUTIONS

Up to this point in the specification, the weighting techniques to be used have not been discussed in detail. Three different approaches will now be discussed, although there are many others. These solutions rely on the straightforward application of general-purpose digital computer techniques, and are intended to illustrate rather than to limit the invention. The most accurate solutions of course involve the most complex computer techniques, and the present system seeks a compromise between accuracy and system complexity.

For purposes of illustration assume that the system has m fixed-position stations, any $n$ of which can be selected by the computer to be operative for purposes of obtaining aircraft position data, and that when the computer has activated certain stations for this purpose, it will thereafter be storing differences $d$ in times of arrival of the aircraft signal. As in the circuitry embodiment described above, the difference data will be referenced to the time of arrival at one of the n stations, i.e. the first of these stations to deliver a signal to the CPU. This first station can then be thought of as the master reference station, although any other of the stations could, if desired, be selected for this purpose, or several references could be employed in obtaining any single set of time difference of arrival data. For the sake of clarity, a single reference station is assumed in the present solution technique discussion. The master reference station will be referred to hereinafter as the $n=0$ station among $i$ stations where $i=0, 1, 2, \ldots, n-1$. The $n$ stations are laid out in a system of $x, y, z$ coordinates which include an arbitrarily selected reference or origin point P to which the coordinates of the $i^{th}$ station are related by the vector.

$$X_i = \begin{bmatrix} x_i \\ y_i \\ z_i \end{bmatrix} i = 0, 1, 2, \ldots, n-1$$

$X_o$ is of course the location of the assumed master reference station, and $X$ is the vector denoting the location of the aircraft in the coordinate system with respect to an arbitrary origin point P. The range from the $i^{th}$ station to the aircraft is represented by $R_i$, and as mentioned above the system is already storing TOA differences $d$ referred to the $n=0$ station, and of the form $$d_i = \frac{R_i - R_o}{2} i = 1, 2, \ldots, n-1. \quad (1)$$

Where the aircraft is located at $x, y, z$ in the coordinate system, the range from the $i^{th}$ station to the aircraft can be expressed as a sphere of radius $R_i$ defined as follows $$R_i^2 = (x-x_i)^2 + (y-y_i)^2 + (z-z_i)^2, i=0,1,2,\ldots,n-1 \quad (2)$$

However, in the present example the system is not storing ranges $R_i$ to the aircraft, but is storing time of arrival differences $d_i$ and therefore the actual ranges are unknown although range differences are available. Therefore, equations involving range differences must be developed. Subtracting the equation corresponding to $i=0$ in (2) from the equation corresponding to $i=k$, representing another station $k$, there results on the left of the equals sign the expression $$R_k^2 - R_o^2 = (R_k + R_o)(R_k - R_o) = (R_k - R_o + 2R_o)(R_k - R_o)$$
$$= 4d_k(d_k + R_o) \; k=0, 1, 2, \ldots, n-1$$

Incorporating the results on the right-hand side of the equals sign in the difference, there results $$2(x_o - x_k)x + 2(y_o - y_k)y + 2(z_o - z_k)z$$
$$= 4d_k(d_k + R_o) + P_o^2 - P_k^2 \quad (3)$$

where $$P_k^2 = x_k^2 + y_k^2 + z_k^2, k=1,2,\ldots,n-1.$$

Equations (3) are a set of linear equations in the parameter $R_o$ each comprising the equation for a sphere of radius $R_o$ centered at the zero$^{th}$ relay station minus the equation for another sphere of radius $R_k$ centered at another relay station, namely, the $k^{th}$ relay station, and each such linear equation (3) represents a plane perpendicular to a straight line passing through the coordinates of the two stations $x_o, y_o, z_o$ and $x_k, y_k, z_k$. This plane contains the locus of the intersection of the two spheres, which locus includes the position $x, y, z$ of the aircraft. The simultaneous solution of a set of these equations (3) by the computer will provide the position of the aircraft.

It is more convenient to express the set of equations (3) in matrix form, after defining certain constants as follows:

$$A = 2 \begin{bmatrix} x_0-x_1 & y_0-y_1 & z_0-z_1 \\ x_0-x_2 & y_0-y_2 & z_0-z_2 \\ \vdots & \vdots & \vdots \\ x_0-x_{n-1} & y_0-y_{n-1} & z_0-z_{n-1} \end{bmatrix}$$

which is a $(n-1)$ by 3 matrix, and $$U = \begin{bmatrix} 4d_1 \\ 4d_2 \\ \vdots \\ 4d_{n-1} \end{bmatrix}, \quad W = \begin{bmatrix} 4d_1^2 + P_0^2 - P_1^2 \\ 4d_2^2 + P_0^2 - P_2^2 \\ \vdots \\ 4d_{n-1}^2 + P_0^2 - P_{n-1}^2 \end{bmatrix}$$

which are $(n-1)$ by 1 vectors. Using these constants it is possible to express a set of $(n-1)$ equations (3) in the form, $$AX = UR_o + W \quad (4)$$

The vector $X$ represents the aircraft position, and in order to solve equation (4) for this position, it is necessary to eliminate the unknown $R_o$. The equation (2) can be used for this purpose and can be expressed, where $i=0$, in the vector form as, $$R_o^2 = (X-X_o)^T(X-X_o) \quad (5)$$

The superscript $T$ denotes the matrix transpose operation.

Now, if the measure TOA differences $d_i$ actually contained no error, the latter expression (5) for $R_o$ could be substituted in equation (4) and the precise position of the aircraft computed from the resulting set of $(n-1)$ equations. However, because the values of $d_i$ are not without error even though optimum stations have presumably been selected, the set of equations will not in general yield a consistent solution when a redundancy of data is available, and a dimensional error vector $E$ will be present which cannot be made zero for any selection of an aircraft position vector $X$. This error vector can be expressed as, $$E = AX - UR_o - W \quad (6)$$

It is, therefore, necessary to arrive at those aircraft position coordinates which will result in minimizing the error vector $E$. The solution is a weighted sum of error squares in the form $$I = \sum_{i=1}^{n-1} q_i e_i^2 \quad (7)$$

wherein $e_i$ is the $i^{th}$ component of the error $E$ which is arrived at by subtracting the right-hand side of equation (3) from the left-hand side thereof to yield for $i=1, 2, \ldots, n-1$ $$e_i = 2(x_0-x_i)x + 2(y_0-y_i)y + 2(z_0-z_i)z - 4d_i(d_i+R_o) - P_0^2 + P_i^2,$$

and wherein the weight $q_i$ is greater than 0. Moreover, it is desirable to incorporate a weighted sum so that in effect, $x, y$ and $z$ errors may be differently dealt with by properly selecting the weights $q_i$ in view of the fact that the $z$-errors are apt to be great as compared with $x$ and $y$ errors. The expression (7) may be rewritten in the form $$I = E^T Q E \quad (8)$$

where $Q$ is an $(n-1)$ by $(n-1)$ positive definite diagonal matrix with diagonal elements $q_i$. The vector $X$ which will give the least error in expression (8) is then expressed as, $$X = A^* U R_o + A^* W \quad (9)$$

where:

$$A^* = (A^T Q A)^{-1} A^T Q$$

The inverse of $(A^T Q A)$ is guaranteed if, and only if, the $n$ stations are not coplanar. Coplanar stations are to be avoided, since altitude measurements of the aircraft $z$ will be totally inaccurate. Only the non-coplanar geometry will therefore be considered.

Employing the quadratic constraint $$R_0 = \frac{U^T A^*[A^*W - X_0]}{1 - U^T A^{*T} A^* U}$$
$$\pm \sqrt{\left[\frac{U^T A^*(A^*W - X_0)}{1 - U^T A^{*T} A^* U}\right]^2 + \frac{(A^*W - X_0)^T(A^*W - X_0)}{1 - U^T A^* A^* U}} \quad (10)$$

which can be used to eliminate $R_0$ from Expression (9), the latter becomes $$X = A^* U \left[\frac{U^T A^{*T}(A^*W - X_0)}{1 - U^T A^{*T} A^* U}\right.$$
$$\left.\pm \sqrt{\left[\frac{U^T A^{*T}(A^*W - X_0)}{1 - U^T A^{*T} A^* U}\right]^2 + \frac{(A^*W - X_0)^T(A^*W - X_0)}{1 - U^T A^{*T} A^* U}}\right]$$
$$+ A^*W \quad (11)$$

Expression (11) provides a weighted solution yielding the vector $x$ for the $x, y, z$ coordinate position of the aircraft having the smallest error vector, but it is not the only weighting technique for utilizing the TOA difference data gathered by the enabled relay stations to optimize the accuracy of the determined aircraft position.

The ability to incorporate the weighting matrix, Q, in the solution given by (11) permits a large degree of freedom in trading accuracy for computational complexity. At once extreme, one can select the identity matrix for $Q$, which corresponds to weighting the residues, or the $e_i$, equally. The matrix $A^*$ now becomes a constant for all aircraft positions and may be computed once and used in all solutions thereafter. Here, the advantage of simplification is achieved at the expense of altitude accuracy, however, whose error may be several times as great as the error estimates of the $x$-$y$ coordinates when the aircraft's altitude is small as compared to the separation of the relay stations. As a case of intermediate complexity, the airspace above the grid over which the aircraft is located can be divided into multiple subvolumes as shown in FIG. 1, with an appropriate weighting matrix $Q$ being employed for each subvolume. This permits the use of $A^*$ matrices computed specifically for each subvolume, eliminating the requirement to compute a new $A^*$ for each solution. For suitable $Q$ matrices, this results in a considerable increase in the accuracy of the $z$-component estimate but increases the CPU memory requirement somewhat, and, more seriously, introduces step-like discontinuities in the solution for the aircraft position as a function of time, which seriously affects ones ability to estimate aircraft velocity or acceleration. Finally, with greater system complexity a suitable weighting matrix can be computed for each aircraft position, wherein the last estimate of aircraft position is used to obtain a weighting matrix for the succeeding solution. The results obtained in this fashion are by far the most desirable from an accuracy standpoint, but are costly in terms of computational time. Regarding selection of a weighting matrix, again numerous approaches present themselves. Since in most deployments of systems of the type under discussion, the largest inaccuracy occurs while estimating the value of the altitude z coordinate, it is necessary to select a $Q$ matrix that weighs altitude errors heavily. One approach for obtaining $q_i$ which will heavily weight altitude errors involves equating $q_i$ to the square of the rate of change of $e_i$ with changes in $z$, or to the partial derivative of $e_i$ with respect to $z$. Another alternative which is easier to implement, is to equate $q_i$ to the square of the sine of the aircraft's elevation angle as measured at the $i^{th}$ relay station. Both of these approaches have been employed with satisfactory results.

A second basic approach to the problem of processing the time difference of arrival data to obtain aircraft position, requires what might be termed a two-pass solution, and is applicable only when an estimate of aircraft position is available, after an initial acquisition has been accomplished. In this approach the last estimate of aircraft altitude $z$ is employed in equations of the form (11), where the $Q$ matrix is set equal to the identity matrix. This yields an accurate estimate of the present $x-y$ coordinate position if the last solution were performed a short time ago. Further, this current $x-y$ information is available at a modest expenditure in computational time, not only because the $Q$ matrix is set equal to the identify matrix, but also because the dimensionality of the problem is reduced. This current $x-y$ information is next used to obtain an accurate current estimate of the $z$ coordinate position as follows. For relay stations whose range R from the aircraft is much greater than the altitude, the ranges $R_i$ are relatively insensitive to changes in altitude. Thus with accurate knowledge of the $x-y$ coordinate position and inaccurate $z$-coordinate position, it is possible to obtain a relatively accurate estimate of range $R_i$ with respect to a distant station. This can be combined with the time difference of arrival data to get the aircraft to relay station range for relay stations very close to the aircraft, or those most nearly underneath the aircraft. This is then used to obtain a new and accurate estimate of the $z$-coordinate position. An estimate of the aircraft-to-relay station range for relay stations distant from the aircraft can be written as:

$$\hat{R}_i = \sqrt{(\hat{x}-x_i)^2+(\hat{y}-y_i)^2+(\hat{z}-z_i)^2} \quad (12)$$

The station is selected such that it is located far from the projection of the aircraft position onto the $x,y$, plane, and therefore, the $\hat{z}$-errors involved in estimating $\hat{R}_i$ have only a small effect, since by virtue of this assumed station selection the value of $\hat{R}_i$ depends mostly on $\hat{x}$ and $\hat{y}$. Moreover the difference in TOA between the distant $i^{th}$ station and the zero$^{th}$ master or reference station is already stored in the system as the data $d_i$. Therefore, an accurate approximation of range $\hat{R}_o$ to the aircraft from the zero$^{th}$ station is given by the expression $\hat{R}_o = \hat{R}_i - 2d_i$. Furthermore, the difference in range from another $p^{th}$ station to the aircraft, referenced to the zero$^{th}$ station, is expressed by the relationship $\hat{R}_p = 2d_p + \hat{R}_o = 2(d_p - d_i) + \hat{R}_i$. Hence, combining these expressions with equation (3) the aircraft range to any other relay station $p$, which may actually be neither the selected furthest station $i$ from the aircraft nor the zero$^{th}$ reference station can be estimated using a set of relatively simple relationships of the form, $$\hat{R}_p = 2(d_p - d_i) + \sqrt{(\hat{x}-x_i)^2+(\hat{y}-y_i)^2+(\hat{z}-z_i)^2} \quad (13)$$

where $\hat{x}, \hat{y}$ are the very accurate present values and $z$ is the last altitude estimate used as a new approximate value. Now the relationship, $$R_p^2 = (x-x_p)^2+(y-y_p)^2+(z-z_p)^2$$

can be used to obtain the $p^{th}$ station's estimate of aircraft altitude since an estimate of $R_p$ is known. The following expression provides the altitude estimate $$\tilde{z} = z_p + \sqrt{\hat{R}_p^2 - (\hat{x}-x_p)^2 - (\hat{y}-y_p)^2} \quad (14)$$

Since the errors in estimating $R_p$ are relative insensitive to errors in estimating $z$ using equation (11), the accuracy of the altitude estimate $\tilde{z}$ is sensitive mainly to the accuracy in measuring $d_p$ and $d_i$ and to the accuracy in estimating $x$ and $y$. The selection of optimum stations for measuring $x$ and $y$ with accuracy and with little dependence upon $z$-values is, of course, a form of weighting.

In the second step of this technique, using equation (14), the present system determines $\tilde{z}$ for several relay stations located near to the aircraft, and then combines these $\tilde{z}$ estimates to obtain a more accurate estimate of the coordinate position of the aircraft.

A third basic approach to processing the differential TOA data to determine aircraft position differs significantly from the aforementioned two basic approaches. It involves the use of several master or reference stations and employs an iterative solution technique. The equations for the iterative solutions are obtained by expanding the basic equation for the ranges $R_i$ in a Taylor series about a present estimate of aircraft position. A tractable error expression can be obtained from the resultant series by neglecting terms of higher order than second. This expression is squared and differentiated with respect to perturbation in aircraft position and the result is set equal to 0, thereby requiring the perturbations to minimize the square error. By taking the linear terms in the resulting equations, a set of linear equations for the perturbation result which are then solved to obtain the perturbations. These perturbations when added to the old estimate of aircraft position, result in a better new estimate. The repeated application of these steps gives rise to a converging iterative process, and is directly applicable to the multi-reference station case. This approach is described under the heading "Non-linear Hyperbolic Solution" set forth below in greater detail.

RELAY STATION SELECTION

As indicated earlier, in deployments of systems of the type under discussion, it is necessary to employ a large number of relay stations sufficiently close together to obtain very accurate locations, but where so many stations are available to solve for the aircraft's coordinate position the computational facility required to efficiently employ their data would be prohibitively complex. Moreover, since the relative significance and value of their data varies widely from station to station as a function of various parameters, a satisfactory solution which employs only the most significant data, and completely ignores the remaining data, can be determined using a significantly reduced computational facility and with little loss in accuracy. This portion of the specification deals with the selection of the more desirable of the available relay stations when making a determination of aircraft position.

It was stated near the beginning of this specification that the prior art teaches the selection of certain stations, from a larger number of stations in a grid, to use for locating an aircraft. For example, the patents to Ross and Raser suggest that the ground stations should be grouped into subareas, and that the stations of a particular group should be selected to determine the location of aircraft flying in that subarea, and that such selection should be made on the basis of a prior determination of the aircraft's position. However, these prior art patents use ground stations spaced apart very widely, i.e. 75 to 150 miles in Ross, and the aircraft telemeter their altitudes so that a $z$-coordinate measurement (which is the most difficult measurement) is not necessary. Hence, the prior art is really only teaching the concept of selecting three or more stations which are within radio range, as distinguished from the present invention which teaches the selection of only a few optimum stations from a very large number of stations most, or all, of which are within radio range. In the present illustrative embodiment of FIG. 2, the stations are mutually separated by distances which are less than, or at most not much more than the maximum altitude at which the aircraft fly, for example no more than twice the maximum altitude, whereas in the prior art systems the station separations are 15 or more times the maximum altitude, so that only a few of them are available to participate in any particular aircraft location determination.

In general, when the number of relay stations deployed is sufficiently large to require selection of a few of the available relay stations when making a position determination, it really is not feasible to make, for each new computation, a real-time selection of the most desirable set of relay stations by performing a new set of calculations based upon all of the criteria which might be considered. Since the ultimate capability of the system is so greatly affected by the selection of optimum relay stations, the desirability of making a real-time selection is only mentioned here, but a more economical implementation of the concepts will now be discussed. The non-real-time, or pre-calculated-table approach to station selection outlined below, is only one possible approach to the problem of relay station selection. This approach essentially involves subdividing the volume of airspace as schematically illustrated in FIG.

1, both as to $x$, $y$ area and as to subvolumes at different altitudes, and then determining the most desirable set of relay stations for use in determining aircraft position for aircraft estimated to be flying within each of the subvolumes. First, and perhaps second and third, alternate sets of relay stations are also preselected for each subvolume.

Pursuant to the system under discussion in which the solution for position is based not upon range, but instead certain stations serve as master reference stations while others measure differences in times of arrival with respect thereto, this system therefore provides differences in range among the various selected ground stations. With $R_i$ representing the range from the $i^{th}$ ground station to the aircraft, and $R_o$ representing the range from the master station to the aircraft, the differences d can be expressed as follows:

$$2d_i = R_i - R_o, \quad i=1, 2, \ldots, n-1$$

As a result relevant statistics of errors in ranges can be related to these differences $d_i$.

Let $\Delta R_i$ be the error in $R_i$. Define
$$\eta_R = E\{\Delta R_i\},$$
where $E\{\ \}$ denote the expected value operation, and
$$\sigma_R = E\{(\Delta R_i - \eta_R)^2\}$$

Let $\Delta d_i$ be the error in the measurement of $d_i$. Then, assuming range errors are uncorrelated, $$\eta^2_i = E[\Delta d_i] = \frac{1}{2}(\eta_{R_i} - \eta_{R_o})$$

$$\sigma^2_i = E[(\Delta d_i - \eta_i)^2]$$

$$= \frac{1}{4}(\sigma_{R_i}^2 + \sigma_{R_o}^2)$$

$$\sigma^2_{ij} = E[(\Delta d_i - \eta_i)(\Delta d_j - \eta_j)]$$

$$= \sigma_{R_o}^2$$

These expressions relate the mean, variance, and covariance of the errors in the measured $d_i$, to the mean and variance of the range errors; or equivalently, in measuring the time of arrival of a pulse.

It remains only to relate the measurement errors to errors in the computed $x$, $y$ and $z$ coordinates of the aircraft. Let
$$x = f_x(d_1, d_2, \ldots, d_{n-1}),$$
$$y = f_y(d_1, d_2, \ldots, d_{n-1}),$$
$$z = f_z(d_1, d_2, \ldots, d_{n-1}),$$
where the functions $f_x$, $f_y$, and $f_z$ represent the particular solution technique selected for use, relating the aircraft coordinates $x$, $y$, $z$ to the data $d_i$, $i=1, 2, \ldots, n-1$. Let $\delta_x$, $\delta_y$, $\delta_z$ be the changes in $x$, $y$, and $z$ imparted by a change of $\delta d_1$, $\delta d_2$, ..., $\delta d_{n-1}$ in the measurements. They are related by:

$$\delta_x = \sum_{i=1}^{n-1} \frac{\partial f_x}{\partial d_i} \delta d_i + \frac{1}{2} \sum_{i,j=1}^{n-1} \frac{\partial^2 f_x}{\partial d_i \partial d_j} \delta d_i \delta d_j + \ldots,$$

$$\delta_y = \sum_{i=1}^{n-1} \frac{\partial f_y}{\partial d_i} \delta d_i + \frac{1}{2} \sum_{i,j=1}^{n-1} \frac{\partial^2 f_y}{\partial d_i \partial d_j} \delta d_i \delta d_j + \ldots,$$

$$\delta_z = \sum_{i=1}^{n-1} \frac{\partial f_z}{\partial d_i} \delta d_i + \frac{1}{2} \sum_{i,j=1}^{n-1} \frac{\partial^2 f_z}{\partial d_i \partial d_j} \delta d_i \delta d_j + \ldots,$$

Since the $\delta d_i$ are small, the nonlinear terms involving the summations of cross products of the form $\delta d_i \, \delta d_j$ can be neglected with respect to the more significant linear terms. Conversion to matrix notation yields:

$$\begin{bmatrix} \delta_x \\ \delta_y \\ \delta_z \end{bmatrix} = \begin{bmatrix} \frac{\partial f_x}{\partial d_1} & \frac{\partial f_x}{\partial d_2} & \cdots & \frac{\partial f_x}{\partial d_{n-1}} \\ \frac{\partial f_y}{\partial d_1} & \frac{\partial f_y}{\partial d_2} & \cdots & \frac{\partial f_y}{\partial d_{n-1}} \\ \frac{\partial f_z}{\partial d_1} & \frac{\partial f_z}{\partial d_2} & \cdots & \frac{\partial f_z}{\partial d_{n-1}} \end{bmatrix} \begin{bmatrix} \delta d_1 \\ \delta d_2 \\ \vdots \\ \delta d_{n-1} \end{bmatrix}$$

Written symbolically, this is:
$$\delta X = H(\delta D)$$

To get the mean of $\delta X$, the error in the estimate of $X$, one takes the expected value:
$$\eta_X = E\{\delta X\} = E\{H(\delta D)\} \quad (15)$$
Since the $H$ matrix, once determined, consists of constant terms it can be brought outside the expected value operation to give:
$$\eta_X = H\eta_{\delta D}, \text{ where } \eta_{\delta D} = E\{\delta D\}$$

Also of interest is the covariance matrix, $\psi_X$, of the location calculations as a function of the $\psi_{\delta D}$ covariance matrix of the measurements. By definition:

$$\psi_X = E\{(\delta X - \eta_X)(\delta X - \eta_X)^T\}$$
$$\psi_X = E\{[H(\delta D - \eta_{\delta D})][H(\delta D - \eta_{\delta D})]^T\}$$
$$\psi_X = E\{[H(\delta D - \eta_{\delta D})][(\delta D - \eta_{\delta D})^T H^T]\}$$
$$\psi_X = H E\{(\delta D - \eta_{\delta D})(\delta D - \eta_{\delta D})^T\} H^T$$
$$\psi_X = H \psi_{\delta D} H^T \quad (16)$$

The statistics of the range errors, $\eta_D$ and $\psi_{\delta D}$, can be obtained by the kind of error analysis used in basic ranging systems involving well-known techniques discussed in the literature. In particular see the discussions of fundamental statistical techniques found in "Estimation Theory" by Ralph Deutsch, Prentice-Hall (1965), or in "Probability Random Variables and Stochastic Processes" by Athanasios Papoulis, McGraw-Hill (1965). A good discussion of the application of these techniques to radar tracking is found in "Radar System Analysis" by David K. Barton, Prentice-Hall (1964) chapters 10 and 11.

It is the present purpose to use the above relationships to prepare a table of optimum relay stations and alternative stations for each airspace subvolume, which table can then be stored in the computer for future reference. In preparing such a table, the matrix $H$ is readily evaluated numerically by perturbing the $d_i$ and noting the change in the solution $X + \Delta X$. The elements of the $H$ matrix are then given by $\Delta X/\Delta d_i$. By evaluating the matrix $H$ numerically for positions in the various subvolumes of the airspace, for a particular solution technique, system performance is directly available in terms of error statistics from equations (15) and (16) as a function of geometry, measurement system accuracy, and station selection. Thus, by pre-computing all possible stations suitable for use in locating an aircraft in a single subvolume, particularly those stations which are not beforehand eliminated on the basis of common sense considerations before such an iterative procedure is begun, information sufficient for selection the optimum relay stations and alternatives as a function of system performance is directly obtained. Carrying this procedure further, the optimum set of relay stations for each subvolume, as well as possible alternates, may be selected by tabulating those which result in the most desirable system performance. The best system performance may be defined, for example, as that which results in the minimum variance of any single coordinate position, or of the sum of the diagonal elements of the covariance matrix $\psi_X$. In this fashion the table of desirable relay stations for the various subvolumes can be constructed for use in the system, so that while solving for position in real-time the computer need only go to this table using the last determined position of the aircraft to select the subvolume of interest, and activate that subset of relay stations given in the table for use for this particular solution.

TYPICAL COMPUTER SOLUTION

In earlier portions of this specification two main steps have been discussed in arriving at a final solution for the location of a transmitting object. The first step, which is practiced by itself in the prior art in this very environment, involves a general solution for the coordinates locating the object, herein considered to be an aircraft. In obtaining this general solution, there are multiple useful approaches any one of which can be used in this disclosure, including for instance trilateration, slant-range determining, time-of-arrival determination, differential TOA solution, etc. The second step involves techniques for weighting, incident to data obtaining and/or processing, i.e. by selection of receiving stations on the basis of geometry of signal strength, or by some other predetermined criterion, or else by using the data gathered by all the stations and weighting it in each case according to suitable criteria. Another weighting technique designed to reduce errors is the least-squares technique, either as described above or a non-linear least-squares technique as described hereinafter. The following portion of the specification describes a practical example together with a suitable program for a general-purpose digital computer.

The grid of stations used in the example is shown in FIG. 10 wherein nineteen stations labelled 201 through 219 are shown on a hexagonal pattern with 7.5 nautical-mile spacings. These stations are coupled to a central processing system including a CDC 6400 computer which is programmed by the main line computer program shown herebelow and written in FORTRAN IV. The program contains several subroutines utilized in selecting a preferred station pattern from the grid for use in performing time-of-arrival (TOA) or differential TOA multi-station position location. These computer subroutines represent exemplary techniques for station selection. The station selection subroutine forms only a part of a much larger program which constitutes the overall effort to precisely determine location of the transmitting object. The program included herewith also includes a "calling" subroutine which is an additional feature having the capability of simulating a situation wherein: it defines the locations of plural stations; it simulates the contour of the terrain on which they are located; and it introduces assumed reasonable measurement errors. This subroutine is of course not employed when determining actual aircraft locations.

In subroutine "CLOSEST", the program accepts the approximate aircraft coordinates brought in from the calling program as XA, YA, ZA. The coordinates of the various ground stations are available as the vectors X(I), Y(I), Z(I). The calling routine also indicates the total number of stations NT, the true range to the various stations (stored in the vector "RESULT"), and a set of vectors XS, YS, ZS corresponding to the positions of the selected stations. The number of such stations to be selected is given by NS and the index or subscript of the reference station to be employed in determining time difference of arrival is located in "MASTER".

This subroutine has several empirically predetermined different modes of station selection which may be chosen by varying the variable "MS". If MS is one, the program selects up to NS=eight closest stations with the closest station as the master. If MS=five, the program selects up to four corner stations and up to NS=four closest stations of those that remain, the master or reference station being selected as the closest available. If MS=seven, the program again selects up to four corner stations and up to NS=four closest stations from those that remain, but the selected master is a corner station of the quadrant that the aircraft is in. If no corner station is available in the aircraft's quadrant then the closest station is selected as the master by default.

The program first defines the quadrant in which the aircraft is located with respect to the center station (201 in FIG. 10) and then calculates the squared range between the aircraft position and each of the ground stations. Moreover, subroutine "SHADOW" is called in which there is stored a contour of the local terrain in order to determine whether each of the ground stations is in line-of-sight relationship with respect to the aircraft. In a non-simulated operation of the system, non-reception of a signal from the aircraft at any given ground station indicates that the aircraft is indeed shadowed. Similarly, poor signal quality, i.e. low AGC level, is utilized to inhibit use of data from any given ground station.

The stations have been sequentially listed in such a way that it is possible to select stations that essentially lie on the corners, which is the reason for the seemingly random station numbering in the outer ring of the 19-station geometry in FIG. 10. For example, the program first looks at stations 208, 209, and 210 and selects one of these, if it is within line of sight, preferring station 208 to station 209 to station 210. Similarly, one station from the set 211, 212, 213 is selected in that order, followed by one station from 214, 215, 216, and one station from 217, 218, and 219. Thus, when four corner stations are in line of sight, they are all selected, if the first choice "corner" station in any given quadrant is not within line of sight, the second and third choices are checked. Finally, if all stations in the outer regions of a quadrant are shaded, then a station that is as close as possible to the aircraft is selected as an alternate. In a typical example, the program utilizes some eight out of the 19 available stations selecting four corner stations as just discussed plus four of the closest related stations from those that have not been selected earlier and that are not shadowed. A selection of six stations may also be adequate, involving up to four corners and at least two of the remaining closest stations.

The program now proceeds with the computation. It transfers the coordinates of the selected stations into the vectors XS, YS, and ZS, extracts the range to each of these stations for use in the simulation, stores the answer in "RESULT", and writes out the coordinates of the aircraft and the vectors to selected stations.

A typical printout is also attached indicating how the station selection was preformed. Once these data have been assimilated, control is returned to the main line where a subroutine "NONLI" is employed to perform the weighted non-linear least-squares solution to determine the location of the aircraft. The procedure employed is defined in the following discussion captioned "Non-linear Hyperbolic Solution". This approach employs perturbations of true range in order to determine the effect of measurement inaccuracies.

The main line program permits selection of several alternative weightings for the selected ground stations. Thus, the time delay data between the selected NS stations and the master station are weighted, either equally or by a sine factor which corresponds to the ratio of the altitude difference between the aircraft and the ground station divided by the range separation therebetween, or the second, third, or fourth power of these ratios. The resulting weighted least-squares solution produces a unique answer for the aircraft coordinates at any point that is reasonably close to the region covered by the 19 stations in the grid shown in FIG. 10.

In each case an approximate solution, typically the previously determined aircraft location, is employed to start the iterative search. Many alternative positioning methods can also be employed with subroutine "NONLI" to provide the starting approximation, or the aircraft may fly through a specified appropriate window in order to yield an initial position for the iterative search. Similarly, a more deterministic means for estimating aircraft position (involving direct solution of three hyperbolic equations from only four stations) can be employed as a starting estimate for this non-linear solution, an initial acquisition mode having been described hereinbefore.

Near the end of the following computer program there appear two tables of data. The longer table includes the topographical data describing a test range site near Yuma, Arizona, which was divided into ½-mile squares. The briefer table at the very end of the program contains data locating the various relay stations within that site.

The illustrative FORTRAN program being discussed in this example is as follows:

```
(998023,SIERRA RESEARCH) R=I,F=61000,T=110,P= 55,C=120.5/12L HYP T-OPT 3K U.0055
RUN(S,,,,DUBB)
LGO.
REWIND(DUM)
COPYCF(DUM,PUNCH)

PROGRAM Q(INPUT,OUTPUT,DUM,TAPE5=INPUT,TAPE6=OUTPUT,TAPE7=DUM)
C     SIERRA RESEARCH R=T,F=50000,T=200,P=99,C=700,19LSTATION,ACMR6,RHO,
     1NONLR
      DIMENSION X(30),Y(30),Z(30),XM(30),YM(30),ZM(30),RAN(30)
      DIMENSION T1(3,30),Q(3,30),QT(30,3),QPQ(3,3),PSI(30,30),ERR(3,1)
      DIMENSION XG(30),YG(30),ZG(30)
      DIMENSION XSTORE(19,19),YSTORE(19,19),ZSTORE(19,19),IDENT(2)
      DIMENSION ISHVEC(30),ISHPD(19,19),ISHPT(19)
      DIMENSION  MSHADE(30),XMM(30),YMM(30),ZMM(30)
      DIMENSION PSQ(30),D(30)
      DIMENSION WT(30)
      COMMON PSQ,N,X,Y,Z
      COMMON/NONL/ KTOT,KMAX,INDEX,WT
      COMMON /CLOSE/ MSHADE
      COMMON/NO 2/ ICOMMON,DET
      COMMON/SHAD/XMM,YMM,ZMM
 2000 FORMAT(A4,4X,I2,3F10.2,2I10)
 2001 FORMAT(1X,A4,4X,I2,3F10.2,2I10)
 2002 FORMAT(*     N,     N1,     N2,     =        *,3I10)
 2233 FORMAT(8F10.5)
 3333 FORMAT(1X,*HYP DATA.NE.ORIG DATA-ORIG AND HYP*,/,6E15.6)
 3338 FORMAT(1X,*ESTIMATED AIRCRAFT POSITIONS AND PERTURBATIONS,X,Y,Z*,
     15X,3(F8.1,4X,F8.3,4X))
 3339 FORMAT(1X,*RAN MATRIX*)
 4444 FORMAT(1X,*PERTURBATION TOO LARGE-DRATIO AND A/C POS*,/,4E15.6)
 5001 FORMAT(1X,*STATION LOCATIONS   X,Y,Z*)
 5002 FORMAT(1X,3(1X,F15.4,1X))
 5251 FORMAT(2A10)
 5252 FORMAT(2A10,F6.0,      1HX, I2,1X,10F5.1)
 5253 FORMAT(2A10,F6.0,      1HY, I2,1X,10F5.1)
 5254 FORMAT(2A10,F6.0,      1HZ, I2,1X,10F5.1)
 5255 FORMAT(2A10,F6.0,      1HX, I2,1X,10F5.2)
 5256 FORMAT(2A10,F6.0,      1HY, I2,1X,10F5.2)
 5257 FORMAT(2A10,F6.0,      1HZ, I2,1X,10F5.2)
 5258 FORMAT(2A10,F6.0,      1HX, I2,1X,10F5.3)
 5259 FORMAT(2A10,F6.0,      1HY, I2,1X,10F5.3)
 5260 FORMAT(2A10,F6.0,      1HZ, I2,1X,10F5.3)
 5261 FORMAT(2A10,F6.0,      1HX, I2,1X,10F5.0)
 5262 FORMAT(2A10,F6.0,      1HY, I2,1X,10F5.0)
 5263 FORMAT(2A10,F6.0,      1HZ, I2,1X,10F5.0)
 6000 FORMAT(1X,*KTOT=*,I10,5X,*KMAX=*,I10)
 6001 FORMAT(1X,* MINIMUM DRATIO = *,F12.6,*    MAXIMUM DRATIO =*,F12.6)
 6050 FORMAT(1H1,10X,*SHADING PATTERN FOR STATION NUMBER*,I7,
     1 3X,*IN*,F5.1,*N.MILE STEPS.   AIRCRAFT ALT.=*,F7.0,*FEET*,/)
 6051 FORMAT(8X,19I5)
 6052 FORMAT(1H0,I4,5X,19R5,I7,/)
 7006 FORMAT(1X,*Q-MATRIX*)
 7008 FORMAT(1X,*QPQ-MATRIX*)
 7012 FORMAT(1X,*D-MATRIX*)
 7014 FORMAT(1X,*PSI-MATRIX*)
 7043 FORMAT(1X,*QT-MATRIX*)
 7044 FORMAT(3X,*DET VALUE =*,E15.6,///)
 7046 FORMAT(1X,*MEAN-MATRIX* )
 8000 FORMAT(1X ,//)
 8001 FORMAT(*XA,YA,ZA,XAC,YAC,ZAC*,6F14.5)
 9000 FORMAT(1H0,10X,*XAM*,15X,*YAM*,15X,*ZAM*,15X,*SIGR*,15X,*SIGX*,15X
     1,*SIGY*,15X,*SIGZ*)
 9001 FORMAT(3(6X,F10.4),4X,4(1X,E15.6))
 9002 FORMAT(4X,*ZALT*,10X,*AVR*,12X,*AVX*,12X,*AVY*,12X,*AVZ*,
     1  9X,*SIGMAX R*,7X,*SIGMAX X*,7X,*SIGMAX Y*,7X,*SIGMAX Z*)
 9003 FORMAT(1X,F10.1,1X,8F15.6)
 9983 FORMAT(1H4,50X,34HY-POSITION ERROR .VS. X,Y POSITION    )
 9984 FORMAT(1H4,50X,34HX-POSITION ERROR .VS. X,Y POSITION    )
 9985 FORMAT(1X,*(*,F5.1,*,*,F5.1,*)*,50X,3H(0,,F5.1,*)*,50X,*(*,F4.1,
     1 *,*,F5.1,*)*,//)
 9986 FORMAT(2H0(,F5.1,*,*F4.1,*)*,51X,3H(0,,F4.1,*)*,51X,1H(,F4.1,*,*,
     1 F4.1,*)*)
```

```
 9987 FORMAT(1H0,52X,19HAIRCRAFT ALTITUDE =,F6.0,4HFEET   )
 9988 FORMAT(1H4,51X,32HALTITUDE ERROR .VS. X,Y POSITION    )
 9989 FORMAT(1X,19F7.1,///)
 9990 FORMAT(1X,*MASTER STATION =*,I2)
 9991 FORMAT(1X,19I7,///)
 9992 FORMAT(1H4,50X,*MASTER STATION VS. X,Y POSITION * )
C     INITIALIZATION OF VARIABLES AND CONSTANTS
      MM=1
      IVMAX=30
      ICOMMON=1
C        THIS IS THE GEOMETRY USED FOR THE STATION LOCATION
      ISHVEC(1)=1
      DO 817 J=2,30
  817 ISHVEC(J)=2*ISHVEC(J-1)
C     INDEX USED FOR WEIGHTING PURPOSES
C     IF INDEX=1,WT=ZI.
C     IF INDEX=2,WT=ZI**2.
C     IF INDEX=3,WT=ZI**3.
C     IF INDEX=4,WT=ZI**4.
C     IF INDEX=5,WT=1.
      INDEX=2
      INDEX=3
      INDEX=4
      INDEX=5
      INDEX=1
      I0=0
      I1=1
      I3=3
C     NS=NUMBER OF STATIONS TO BE USED FOR EACH SOLUTION
      NS=8
      N=NS
      N1=N
      RED=2.*3443.96*6080.
      NSAVE=R
      CALL SHADE(RED,RED,RED,NS,NS)
C     READ IDENTIFICATION NOMENCLATURE FOR RUN
      READ(5,5251) IDENT(1),IDENT(2)
C     GENERATES SIZE OF THE RANGE
      STEPM=10./3.
      STEPM=5./3.
      STEPW=STEPM*9.
      WRITE(7,2233)STEPM
      STEPWM=-STEPW
      STEP=STEPM*6080.
      ZSLEVEL=0.
      SCALEFT=2500./.3048
      DATA ISTOP/4HSTOP/
      DO 10 LET=1,30
      MSHADE(LET)=1
      WT(LET)=1
C     READ IN STATION LOCATIONS(19)
      READ(5,2000)LDENT,L,XG(L),YG(L),ZG(L)
      ZG(L)=0.
C     TYPE  STOP  IN THE FIRST FIELD ON THE LAST STATION LOCATION CARD.
      NT=LET
      WRITE(6,2001)LDENT,LET,XG(L),YG(L),ZG(L),L,NT
      XG(L)=XG(L)*SCALEFT
      YG(L)=YG(L)*SCALEFT
      RANGE2=XG(L)*XG(L)+YG(L)*YG(L)
C     CORRECTION FOR CURVATURE OF THE EARTH
      ZG(L)=ZG(L)-RANGE2/RED
      XMM(L)=XG(L)/6080.
      YMM(L)=YG(L)/6080.
      ZMM(L)=ZG(L)/6080.
      IF(LDENT.EQ.ISTOP)GO TO 12
   10 CONTINUE
   12 CONTINUE
      WRITE(6,5001)
      WRITE(6,5002) (XMM(K),YMM(K),ZMM(K),K=1,NT)
C     ERROR MATRIX
      DO 718 ICK=1,N
      DO 717 JCK=1,
  717 PSI(ICK,JCK)=25.
  718 PSI(ICK,JCK)=50.
```

```
      DO 200 IK=8,8
C     INITIALIZATION TO COMPUTE LINEARITY (DRATIO).
      DRAMAX = -1000.
      DRAMIN=1000.
      KTOT=0
      KMAX=0
      DO 620 I=1,19
      DO 620 J=1,19
      XSTORE(I,J)=9.99
      YSTORE(I,J)=9.99
      ZSTORE(I,J)=999.9
      ISHPO(I,J)=0
  620 CONTINUE
      GO TO (51,52,53,54,55,56,57,58),IK
C     DETERMINATION OF A/C ALTITUDE(ZA) TO BE USED
   51 ZA=1000.
      GO TO 59
   52 ZA=2000.
      GO TO 59
   53 ZA=4000.
      GO TO 59
   54 ZA=5000.
      GO TO 59
   55 ZA=8000.
      GO TO 59
   56 ZA=10000.
      GO TO 59
   57 ZA=15000.
      GO TO 59
   58 ZA=20000.
   59 CONTINUE
      ZASAVE=ZA
      ZALT=ZA
C     STORAGE INITIALIZATION
      SIGMAX=0.
      SIGMAXX=0.
      SIGMAXY=0.
      SIGMAXZ=0.
      SUMR=0.
      SUMX=0.
      SUMY=0.
      SUMZ=0.
C     --*--*--*--*--*--*--*--*--*--*--*--*--
C     START OF GENERATION OF XA,YA COORDINATES OF THE A/C POSITION
C
      DO 300 IJ=1,J1,19
      DO 310 JI=1,J1,19
      IJZ=IJ
      XIJ=10-IJ
      YA=XIJ*STEP
      YAM=YA/6080.
      Y2=YA**2
      JIZ=JI
      IF(JI.EQ.2) ICOMMON=0
      XJI=JI-10
      XA=XJI*STEP
      XAM=XA/6080.
      JA=1
      X2=XA**2
      RXY=X2+Y2
C     ADJUSTING A/C ALT. TO BE ZA ABOVE THE EARTH SURFACE(ADJUSTMENT FOR
C     EARTH RADIUS).
      H=RXY/RED
      ZA=ZASAVE-H
      ZAM=ZA/6080.
      Z2=ZA*ZA
      RSQ=X2+Y2+Z2
      NS=NSAVE
      CALL CLOSEST(XA,YA,ZA,XG,YG,ZG,NT,RAN,X,Y,Z,NS,MASTER)
C     COMPUTES THE 8 OUT OF 19 STATIONS TO BE USED IN THE DETERMINATION
C     OF THE A/C POSITION.
      N=NS
      DO 811 KP=1,NT
```

```
C       USED ONLY WHEN THE TERRAIN IS NOT LEVEL(MOUNTAINOUS)
        ISHPO(IJZ,JIZ)=ISHPO(IJZ,JIZ)+ISHVEC(KP)*MSHADE(KP)
  811 CONTINUE
        IF(NS.LT.4)GO TO 410
        DO 21 I=1,N
        PSQ(I)=X(I)**2&Y(I)**2&Z(I)**2
   21 CONTINUE
        DO 333 LKJ=1,N
        XM(LKJ)=X(LKJ)/6080.
        YM(LKJ)=Y(LKJ)/6080.
        ZM(LKJ)=Z(LKJ)/6080.
  333 CONTINUE
        MSR=MASTER
        RANM=RAN(MSR)
        D(MSR)=0.
        DO 20 I=1,N
        IF (I.EQ.MASTER) GO TO 20
C       CALCULATION OF RANGE DIFFERENCES TO BE USED IN THE TIME DIFFERENCE
C       OF ARRIVAL SOLUTION TECHNIQUE
        D(I)=.5*(RAN(I)-RANM)
   20 CONTINUE
        XAC=XA-37.
        YAC=YA&57.
        ZAC=ZA&75.
        CALL NONLI (D,XAC,YAC,ZAC,MASTER)
C       SOLVES THE SYSTEM OF HYPERBOLIC EQUATIONS TO OBTAIN A/C POSITION
        IF(ABS(XAC-XA)-0.1)35,35,36
   35 IF(ABS(YAC-YA)-0.1)37,37,36
   37 IF(ABS(ZAC-ZA)-0.1)38,38,36
   36 WRITE(6,3333)XA,YA,ZA,XAC,YAC,ZAC
   38 CONTINUE
C       CHECK TO ASCERTAIN IF ORIGINAL ANSWER IS OBTAINED WHEN NO ERRORS
C       ARE INTRODUCED
   27 DEL=10.
C
C
C       GENERATION OF THE PARTIALS OF THE A/C COORDS WITH RESPECT TO ERRORS
C       IN THE TIME MEASUREMENTS
C
        DO 25 I=1,N
        IF(I.EQ.MASTER) GO TO 25
        TUMP=D(I)
C       EACH DELAY PERTURBED SEPARATELY TO FIND ITS AFFECT ON THE POSITION
C       COORDS.
        D(I)=D(I)&DEL
C       EQUATIONS SOLVED FOR NEW(APPARENT) A/C COORDS.
        CALL NONLI (D,XAC,YAC,ZAC,MASTER)
        IF(ICOMMON.NE.1) GO TO 715
        WRITE(6,8001) XA,YA,ZA,XAC,YAC,ZAC
  715 CONTINUE
        XDIF=XAC-XA
        YDIF=YAC-YA
        ZDIF=ZAC-ZA
C       GENERATION OF APPROXIMATIONS TO THE PARTIALS
        Q(1,I  )=XDIF/DEL
        Q(2,I  )=YDIF/DEL
        Q(3,I  )=ZDIF/DEL
        IF(ICOMMON.NE.1) GO TO 443
        WRITE (6,3339)
        CALL MATWR(D,N,I1,INMAX)
  443 CONTINUE
        D(I)=TUMP
   25 CONTINUE
        DO 259 KK=1,3
  259 Q(KK,MASTER)=0.
        IF(ICOMMON-1) 42,43,43
   43 WRITE(6,7006)
        CALL MATWR(Q,I3,N,I3)
   42 CONTINUE
        DELH=DEL*0.5
C       GENERATION OF THE MEAN ERRORS IN X,Y,Z
        DO 201 JG=1,3
        ERR(JG,1)=0.
        DO 202 JC=1,N
        ERR(JG,1)=ERR(JG,1)+Q(JG,JC)
```

```
      202 CONTINUE
          ERR(JG,1)=DELH*ERR(JG,1)
      201 CONTINUE
          XC=XA+ERR(1,1)
          YC=YA+ERR(2,1)
          ZC=ZA+ERR(3,1)
          DO 321 KKJ=1,N
C         PERTURB ALL DELAYS SIMULTANEOUSLY
          D(KKJ)=D(KKJ)&DELH
      321 CONTINUE
C         SOLVED FOR A/C COORDINATES USING PERTURBED DELAYS
          CALL NONLI (D,XAC,YAC,ZAC,MASTER)
          XL=XAC
          YL=YAC
          ZL=ZAC
C         LINEARITY CHECK
          D1=SQRT(ERR(1,1)**2+ERR(2,1)**2+ERR(3,1)**2)
          D2=SQRT((XC-XL)**2+(YC-YL)**2+(ZC-ZL)**2)
          DRATIO=D2/D1
          DRAMIN=AMIN1(DRATIO ,DRAMIN  )
          DRAMAX=AMAX1(DRATIO,DRAMAX)
          IF(DRATIO-0.1) 111,112,112
      112 WRITE(6,4444) DRATIO,XA,YA,ZA
      111 CONTINUE
C         GENERATION OF THE QPQ MATRIX, THE MATRIX OF SIGMAS
          CALL TRPOSE(Q,I3,N,I3,INMAX,QT)
          CALL MULT(Q,PST,I3,N,N,N,I3,INMAX,I3,T1)
          CALL MULT(T1,QT,I3,N,N,I3,I3,INMAX,I3,QPQ)
          IF(ICOMMON-1)46,47,47
       47 WRITE(6,7043)
          CALL MATWR(QT,N,I3,INMAX)
          WRITE(6,7014)
          CALL MATRW(PSI,N,N,INMAX)
          WRITE(6,7008)
          CALL MATWR(QPQ,I3,I3,I3)
          WRITE(6,7046)
          CALL MATWR(ERR,I3,I1,I3)
       46 CONTNUE
C         GENERATION AND STORAGE OF MAX,MIN,AND AVERAGE SIGMAS
          S1=QPQ(1,1)
          S2=QPQ(1,2)
          S3=QPQ(1,3)
          S4=QPQ(2,2)
          S5=QPQ(2,3)
          S6=QPQ(3,3)
          SIGRSQ=S1&S4&S6
          SIGR=SQRT(SIGRSQ)
          SIGX=SQRT(S1)
          SIGY=SQRT(S4)
          SIGZ=SQRT(S6)
      410 CONTINUE
          SUMR=SUMR+SIGR
          SUMX=SUMX+SIGX
          SUMY=SUMY+SIGY
          SUMZ=SUMZ+SIGZ
          SIGMAX=AMAX1(SIGMAX,SIGR)
          SIGMAXX=AMAX1(SIGMAXX,SIGX)
          SIGMAXY=AMAX1(SIGMAXY,SIGY)
          SIGMAXZ=AMAX1(SIGMAXZ,SIGZ)
          IF(SIGX.GT.99999.) SIGX=99999.
          IF(SIGY.GT.99999.) SIGY=99999.
          IF(SIGZ.GT.99999.) SIGZ=99999.
          XSTORE(IJZ,JIZ)=SIGX
          YSTORE(IJZ,JIZ)=SIGY
          ZSTORE(IJZ,JIZ)=SIGZ
          IF(ICOMMON-1) 310,307,307
      307 WRITE(6,9001)XAM,YAM,ZAM,SIGR,SIGX,SIGY,SIGZ
      310 CONTINUE
      300 CONTINUE
          ALLOWANCE FOR VARIABLE PRINTOUT FORMATTING
          ISIGX=4
          ISIGY=4
          ISIGZ=4
```

```
      IF(SIGMAXX.LT.9.9995)ISGX=3
      IF(SIGMAXY.LT.9.9995)ISGY=3
      IF(SIGMAXZ.LT.9.9995)ISGZ=3
      IF(SIGMAXX.LT.99.995)ISIGX=2
      IF(SIGMAXY.LT.99.995)ISIGY=2
      IF(SIGMAXZ.LT.99.995)ISIGZ=2
      IF(SIGMAXX.LT.999.95)ISIGX=1
      IF(SIGMAXY.LT.999.95)ISIGY=1
      IF(SIGMAXZ.LT.999.95)ISIGZ=1
      AVX=SUMX/361.
      AVY=SUMY/361.
      AVZ=SUMZ/361.
      AVR=SUMR/361.
      --*--*--*--*--*--*--*--*--*--*--*--*--
      PRINT OUT

WRITE(6,9002)
  109 WRITE(6,9003)ZALT,AVR,AVX,AVY,AVZ,SIGMAX,SIGMAXX,SIGMAXY,SIGMAXZ
      WRITE(6,6000) KTOT,KMAX
      WRITE(6,6001) DRAMIN,DRAMAX
      WRITE(6,9988)
      WRITE(6,9987) ZASAVE
      WRITE(6,9986)STEPWM,STEPW,STEPW,STEPW,STEPW
      DO 260 KZ=1,19
      WRITE(6,9989)(ZSTORE(KZ,LZ),LZ=1,19)
      GO TO (511,512,513,534),ISIGZ
  511 WRITE(7,5254)IDENT(1),IDENT(2),ZASAVE,KZ,(ZSTORE(KZ,LZ),LZ=1,9)
      WRITE(7,5254)IDENT(1),IDENT(2),ZASAVE,KZ,(ZSTORE(KZ,LZ),LZ=10,19)
      GO TO 520
  512 WRITE(7,5257)IDENT(1),IDENT(2),ZASAVE,KZ,(ZSTORE(KZ,LZ),LZ=1,9)
      WRITE(7,5257)IDENT(1),IDENT(2),ZASAVE,KZ,(ZSTORE(KZ,LZ),LZ=10,19)
      GO TO 520
  513 WRITE(7,5260)IDENT(1),IDENT(2),ZASAVE,KZ,(ZSTORE(KZ,LZ),LZ=1,9)
      WRITE(7,5260)IDENT(1),IDENT(2),ZASAVE,KZ,(ZSTORE(KZ,LZ),LZ=10,19)
      GO TO 520
  534 WRITE(7,5263)IDENT(1),IDENT(2),ZASAVE,KZ,(ZSTORE(KZ,LZ),LZ=1,9)
      WRITE(7,5263)IDENT(1),IDENT(2),ZASAVE,KZ,(ZSTORE(KZ,LZ),LZ=10,19)
  520 CONTINUE
  260 CONTINUE
      WRITE(6,9985)STEPWM,STEPWM,STEPWM,STEPW,STEPWM
      WRITE(6,9984)
      WRITE(6,9987) ZASAVE
      WRITE(6,9986)STEPWM,STEPW,STEPW,STEPW,STEPW
      DO 270 KZ=1,19
      WRITE(6,9989)(XSTORE(KZ,LZ),LZ=1,19)
      GO TO (514,515,516,537),ISIGX
  514 WRITE(7,5252)IDENT(1),IDENT(2),ZASAVE,KZ,(XSTORE(KZ,LZ),LZ=1,9)
      WRITE(7,5252)IDENT(1),IDENT(2),ZASAVE,KZ,(XSTORE(KZ,LZ),LZ=10,19)
      GO TO 521
  515 WRITE(7,5255)IDENT(1),IDENT(2),ZASAVE,KZ,(XSTORE(KZ,LZ),LZ=1,9)
      WRITE(7,5255)IDENT(1),IDENT(2),ZASAVE,KZ,(XSTORE(KZ,LZ),LZ=10,19)
      GO TO 521
  516 WRITE(7,5258)IDENT(1),IDENT(2),ZASAVE,KZ,(XSTORE(KZ,LZ),LZ=1,9)
      WRITE(7,5258)IDENT(1),IDENT(2),ZASAVE,KZ,(XSTORE(KZ,LZ),LZ=10,19)
      GO TO 521
  537 WRITE(7,5261)IDENT(1),IDENT(2),ZASAVE,KZ,(XSTORE(KZ,LZ),LZ=1,9)
      WRITE(7,5261)IDENT(1),IDENT(2),ZASAVE,KZ,(XSTORE(KZ,LZ),LZ=10,19)
  521 CONTINUE
  270 CONTINUE
      WRITE(6,9985)STEPWM,STEPWM,STEPWM,STEPW,STEPWM
      WRITE(6,9983)
      WRITE(6,9987) ZASAVE
      WRITE(6,9986)STEPWM,STEPW,STEPW,STEPW,STEPW
      DO 280 KZ=1,19
      WRITE(6,9989)(YSTORE(KZ,LZ),LZ=1,19)
      GO TO (517,518,519,536),ISIGY
  517 WRITE(7,5253)IDENT(1),IDENT(2),ZASAVE,KZ,(YSTORE(KZ,LZ),LZ=1,9)
      WRITE(7,5253)IDENT(1),IDENT(2),ZASAVE,KZ,(YSTORE(KZ,LZ),LZ=10,19)
      GO TO 522
  518 WRITE(7,5256)IDENT(1),IDENT(2),ZASAVE,KZ,(YSTORE(KZ,LZ),LZ=1,9)
      WRITE(7,5256)IDENT(1),IDENT(2),ZASAVE,KZ,(YSTORE(KZ,LZ),LZ=10,19)
      GO TO 522
  519 WRITE(7,5259)IDENT(1),IDENT(2),ZASAVE,KZ,(YSTORE(KZ,LZ),LZ=1,9)
      WRITE(7,5259)IDENT(1),IDENT(2),ZASAVE,KZ,(YSTORE(KZ,LZ),LZ=10,19)
```

```
      GO TO 522
  536 WRITE(7,5262)IDENT(1),IDENT(2),ZASAVE,KZ,(YSTORE(KZ,LZ),LZ=1,9)
      WRITE(7,5262)IDENT(1),IDENT(2),ZASAVE,KZ,(YSTORE(KZ,LZ),LZ=10,19)
  522 CONTINUE
  280 CONTINUE
      WRITE(6,9985)STEPWM,STEPWM,STEPWM,STEPW,STEPWM
      IF(MM.EQ.1) GO TO 200
      WRITE(6,9992)
      WRITE(6,9987) ZASAVE
  200 CONTINUE
C     CALL EXIT INSERTED HERE TO BYPASS SHADING PRINTOUT
      CALL EXIT
C     PRINT OUT OF TERRAIN FEATURE(IF USED)
      DO 814 IP=1,NT
      WRITE(6,6050)IP,STEPM,ZASAVE
      WRITE(6,6051)(IJ,IJ=1,19)
      DO 813 IJ=1,19
      DO 812 JI=1,19
      ISHTEM  =ISHPO(IJ,JI).AND.ISHVEC(IP)
      ISHPT(JI)=300000B
      IF(ISHTEM)892,812,892
  892 ISHPT(JI)=0
  812 CONTINUE
      WRITE(6,6052)IJ,(ISHPT(JI),JI=1,19),IJ
  813 CONTINUE
      WRITE(6,6051)(IJ,IJ=1,19)
  814 CONTINUE
      CALL EXIT
      END
      SUBROUTINE MULT(A,B,NAR,NAC,NBR,NBC,NARMAX,NBRMAX,NABRMAX,AB)
C
C     THIS SUBROUTINE FORMS THE PRODUCT OF TWO MATRICES
C
      DIMENSION A(NARMAX,NAC),B(NBRMAX,NBC),AB(NABRMAX,NBC)
      DO 100 I=1,NAR
      DO 101 J=1,NBC
      AB(I,J)=0.
      DO 102 K=1,NAC
      AB(I,J)=AB(I,J)+A(I,K)*B(K,J)
  102 CONTINUE
  101 CONTINUE
  100 CONTINUE
      RETURN
      END

SUBROUTINE TRPOSE(A,NR,NC,NRMAX,NCMAX,AT)
C
C     THIS SUBROUTINE FORMS THE TRANSPOSE OF A MATRIX
C
      DIMENSION A(NRMAX,NCMAX),AT(NCMAX,NRMAX)
      DO 4 I=1,NR
      DO 4 J=1,NC
      AT(J,I)=A(I,J)
    4 CONTINUE
      RETURN
      END

SUBROUTINE MATWR(A,NR,NC,NRMAX)
C
C     THIS SUBROUTINE PRINTS OUT A VARIABLE SIZED MATRIX
C
      DIMENSION A(NRMAX,NC)
 2004 FORMAT(1X,/)
 1234 FORMAT(1X,11E11.3)
      DO 100 I=1,NR
      WRITE(6,1234)(A(I,J),J=1,NC)
  100 CONTINUE
      WRITE(6,2004)
      RETURN
      END
```

```
      SUBROUTINE LNSYS3(A,X,B)
C
C     THIS MATRIX SOLVES THE SYSTEM OF 3*3 LINEAR EQUATIONS, AX=B
C     BY SUCCESSIVE ELIMINATION OF VARIABLES
C
      DIMENSION A(3,3),X(3),B(3)
      A11 = A(1,1)
      A12 = A(1,2)
      A13 = A(1,3)
      A21 = A(2,1)
      A22 = A(2,2)
      A23 = A(2,3)
      A31 = A(3,1)
      A32 = A(3,2)
      A33 = A(3,3)
      IF(A11) 50,10,50
   10 WRITE(6,100)
  100 FORMAT(1H0,*WARNING ZERO ELEMENT FOUND AS PIVOT *)
      RETURN
   50 A12 = A12/A11
      A13 = A13/A11
      X(1) = B(1)/A11
      A22 = A22 - A12*A21
      A23 = A23 - A13*A21
      X(2) = B(2) - X(1)*A21
      A32 = A32 - A12*A31
      A33 = A33 - A13*A31
      X(3) = B(3) - X(1)*A31
      IF(A22) 75,10,75
   75 A23 = A23/A22
      X(2) = X(2)/A22
      A33 = A33 - A32*A23
      X(3) = X(3) - A32*X(2)
      IF(A33) 80,10,80
   80 X(3) = X(3)/A33
      X(2) = X(2) - A23*X(3)
      X(1) = X(1) - A12*X(2) - A13*X(3)
      RETURN
      END

SUBROUTINE NONL1(DI,XCA,YAC,ZAC,J)
C
C     THIS SUBROUTINE SOLVES THE NONLINEAR TIME DIFFERENCE EQUATIONS
C     BY SUCCESSIVE ITERATIONS USING LINEARIZED EQUATIONS
C
      DIMENSION BA(3),CK(3,3),WS(3,3),CB(3)
      DIMENSION RH(30),DI(30)
      DIMENSION PSQ(30),X(30),Y(30),Z(30)
      DIMENSION CONN(30)
      DIMENSION WT(30)
      COMMON PSQ,N,X,Y,Z
      COMMON/NO 2/ ICOMMON,DET
      COMMON/NONL/ KTOT,KMAX,INDEX,WT
   20 FORMAT(1X,*CK*)
   30 FORMAT(1X,*BA*)
   40 FORMAT(1X,*CB*)
   50 FORMAT(1X,*9 ITERATIONS LEAVE FOLLOWING EXCESS INCREMENTS*)
   60 FORMAT(3F13.5)
  101 FORMAT(1X,*WS*)
 1001 FORMAT(1H-,*CK TIMES CB  =   BA*//)
 1002 FORMAT(9X,*(*,3F18.6,* ) X (*,F18.6, * ) = (*,F18.6,*)*)
 2002 FORMAT(1H0,*DELAY DIFFERENCES* ,13F9.1)
      K=0
    5 CONTINUE
      XAO=XCA
      YAO=YAC
      ZAO=ZAC
      RHJ=SQRT((XAO-X(J))**2+(YAO-Y(J))**2+(ZAO-Z(J))**2)
```

```
      XJ=(XAO-X(J))/RHJ
      YJ=(YAO-Y(J))/RHJ
      ZJ=(ZAO-Z(J))/RHJ
      YZJ=(YJ**2+ZJ**2)/RHJ
      ZXJ=(XJ**2+ZJ**2)/RHJ
      XYJ=(XJ**2+YJ**2)/RHJ
      XYM=XJ*YJ/RHJ
      YZM=YJ*ZJ/RHJ
      ZXM=ZJ*XJ/RHJ
      BA(1)=0.
      BA(2)=0.
      BA(3)=0.
      CK(1,1)=0.
      CK(2,2)=0.
      CK(3,3)=0.
      CK(1,2)=0.
      CK(1,3)=0.
      CK(2,3)=0.
      DO 10 I=1,N
      IF(I.EQ.J) GO TO 10
      RH(I)=SQRT((XAO-X(I))**2+(YAO-Y(I))**2+(ZAO-Z(I))**2)
      XI=(XAO-X(I))/RH(I)
      YI=(YAO-Y(I))/RH(I)
      ZI=(ZAO-Z(I))/RH(I)
      GO TO (600,200,300,400,500), INDEX
C     INDEX DETERMINES THE WEIGHTING TO BE USED
  200 WT(I)=ZI
      GO TO 600
  300 WT(I)=ZI*ZI
      GO TO 600
  400 WT(I)=ZI**3
      GO TO 600
  500 WT(I)=ZI**4
      GO TO 600
  600 CONTINUE
      YZI=(YI**2+ZI**2)/RH(I)
      ZXI=(XI**2+ZI**2)/RH(I)
      XYI=(XI**2+YI**2)/RH(I)
      XYN=XI*YI/RH(I)
      YZN=YI*ZI/RH(I)
      ZXN=ZI*XI/RH(I)
      CON=    RH(I)-RHJ-2.*DI(I)
      CONN(I) = CON
      BA(1)=-CON*(XI-XJ)*WT(I) +BA(1)
      BA(2)=-CON*(YI-YJ)*WT(I) +BA(2)
      BA(3)=-CON*(ZI-ZJ)*WT(I) +BA(3)
      CK(1,1)=(CON*(YZI-YZJ)+(XI-XJ)**2)*WT(I) +CK(1,1)
      CK(2,2)=(CON*(ZXI-ZXJ)+(YI-YJ)**2)*WT(I) +CK(2,2)
      CK(3,3)=(CON*(XYI-XYJ)+(ZI-ZJ)**2)*WT(I) +CK(3,3)
      CK(1,2)=(-CON*(XYN-XYM)+(XI-XJ)*(YI-YJ))*WT(I)+CK(1,2)
      CK(1,3)=(-CON*(ZXN-ZXM)+(XI-XJ)*(ZI-ZJ))*WT(I)+CK(1,3)
      CK(2,3)=(-CON*(YZN-YZM)+(YI-YJ)*(ZI-ZJ))*WT(I)+CK(2,3)
      CK(2,1)=CK(1,2)
      CK(3,1)=CK(1,3)
      CK(3,2)=CK(2,3)
   10 CONTINUE
      CALL LNSYS3(CK,CB,BA)
      IF(ICOMMON.NE.1) GO TO 69
      WRITE(6,2002)(CONN(JK),JK=1,N)
      WRITE(6,1001)
      DO 700 I=1,3
  700 WRITE(6,1002) (CK(I,JK),JK=1,3),CB(I),BA(I)
   69 CONTINUE
      XAC=XAO+CB(1)
      YAC=YAO+CB(2)
      ZAC=ZAO+CB(3)
      K=K+1
      KTOT=KTOT+1
      KMAX=MAX0(KMAX,K)
   99 SUM=ABS(CB(1))+ABS(CB(2))+ABS(CB(3))
C     CHECK SUM OF ABSOLUTE VALUES OF THE PREVIOUS X,Y,Z INCREMENTS.  IF LESS
```

```
C     THAN 0.1,SOLUTION IS GOOD ENOUGH. IF NOT,REPEAT METHOD.
      IF(SUM.LE..1) GO TO 100
      IF(K.LT.9) GO TO 5
      WRITE(6,50)
      WRITE(6,60)(CB(ID),ID=1,3)
  100 RETURN
      END

SUBROUTINE SHADE(XAM,YAM,ZAM,I,IANS)
C
C     THIS SUBROUTINE SIMULATES NON-LEVEL TERRAIN TO ASCERTAIN IF, FOR
C     A GIVEN A/C POSITION, THE A/C CAN BE SEEN BY THE PRESCRIBED GROUND
C     STATION.
C
      DIMENSION ZC(60,60)
      DIMENSION XM(30),YM(30),ZM(30)
      COMMON/SHAD/XM,YM,ZM
  100 FORMAT(20X,20F3.0)
C     --*--*--*--*--*--*--*--*--*--*--*--*--
C     THIS NORMAL ENTRY POINT IS USED TO READ IN TERRAIN HEIGHTS FOR THE
C     GEOGRAPHIC AREA OF INTEREST
C
      DO 10 II=1,60
      READ(5,100)(ZC(II,J),J= 1,20)
      READ(5,100)(ZC(II,J),J=21,40)
      READ(5,100)(ZC(II,J),J=41,60)
   10 CONTINUE
      RED=8.*3443.96
      DO 20 II=1,60
      DO 20 J=1,60
      YJ=J-30
      XII=II-30
      RANGE2=XII*XII+YJ*YJ
      ZC(II,J)=ZC(II,J)/60.8-RANGE2/RED
   20 CONTINUE
      XINC=.5
      YINC=XINC
      RETURN
      ENTRY SHADOW
C     --*--*--*--*--*--*--*--*--*--*--*--*--
C     THIS ALTERNATE ENTRY POINT DETERMINES WHETHER A CLEAR LINE OF SIGHT
C     PATH EXISTS FROM THE A/C TO THE * I * GROUND STATION
C
C     THIS SUBROUTINE DOES NOT CHECK THE ALT. BOXES CONTAINING THE STATIONS.
C     IF IANS=0 THE STATION IS SHADED,IF IANS=1 IT IS NOT SHADED.
      IANS=1
      LOCY=(YM(I)+15.)/YINC+1.
      LOCX=(XM(I)+15.)/XINC+1.
C     THE STATION POSITION IS FORCED INTO THE CENTER OF THE ALT. BOX FOR
C     THE PURPOSE OF DETERMINING THE LINE OF SIGHT PATH.
      XLOC=LOCX-30
      YLOC=LOCY-30
      YMT=YINC*YLOC-.25
      XMT=XINC*XLOC-.25
      YMAX=AMAX1(YAM,YM(I))
      YMIN=AMIN1(YAM,YM(I))
      XMAX=AMAX1(XAM,XM(I))
      XMIN=AMIN1(XAM,XM(I))
      MAXX=(XMAX+15.)/XINC+1.
      MINX=(XMIN+15.)/XINC+1.
      MAXY=(YMAX+15.)/YINC+1.
      MINY=(YMIN+15.)/YINC+1.
      IF(MAXX.GT.60)MAXX=60
      IF(MINX.LT.1)MINX=1
      IF(MAXY.GT.60)MAXY=60
      IF(MINY.LT.1)MINY=1
      XDIF=XAM-XMT
      BXY=(YMT*XAM-XMT*YAM)/XDIF
      SXY=(YAM-YMT)/XDIF
      BXZ=(XAM*ZM(I)-XMT*ZAM)/XDIF
```

```
      SXZ=(ZAM-ZM(I))/XDIF
      YDIF=YAM-YMT
      BYZ=(YAM*ZM(I)-YMT*ZAM)/YDIF
      SYZ=(ZAM-ZM(I))/YDIF
      IF(YDIF.EQ.0.)GO TO 80
      IF(XDIF.EQ.0.)GO TO 70
      IF(ABS(SXY).GT.1.)GO TO 50
C     IN THIS LOOP X CHANGES FASTER THAN Y.
      DO 30 KX=MINX,MAXX
      XK=KX-30
C        CHECK TO SEE IF THE TRAILING EDGE OF THE BOX BLOCKS LINE OF SIGHT.
      XL1=XK*XINC-.499999
      YL1=XL1*SXY+BXY
      KY1=(YL1+15.)/YINC+1.
C        CHECK TO SEE IF THE LEADING EDGE OF THE BOX IS BLOCKING LINE OF SIGHT.
      XL2=XK*XINC-.000001
      YL2=XL2*SXY+BXY
      KY2=(YL2+15.)/YINC+1.
      IF(LOCY.EQ.KY1.AND.LOCX.EQ.KX) GO TO 24
      IF(KY1.GT.MAXY.OR.KY1.LT.MINY)GO TO 24
      IF(KY1.GT.60)KY1=60
      IF(KY2.GT.60)KY2=60
      IF(KY2.LT.1)KY2=1
      IF(KY1.LT.1)KY1=1
      ZL1=XL1*SXZ+BXZ
      IF(ZL1.LE.ZC(KY1,KX))IANS=0
   24 CONTINUE
      IF(KY1.EQ.KY2)GO TO 30
C     THE PATH OF THE LINE OF SIGHT CROSSES TWO KY ALT. BOXES FOR THIS ONE KX.
      IF(LOCY.EQ.KY2.AND.LOCX.EQ.KX) GO TO 26
      IF(KY2.GT.MAXY.OR.KY2.LT.MINY)GO TO 26
      ZL2=XL2*SXZ+BXZ
      IF(ZL2.LE.ZC(KY2,KX))IANS=0
   26 CONTINUE
   30 CONTINUE
      RETURN
   50 CONTINUE
C     IN THIS LOOP Y CHANGES FASTER THAN X.
      DO 60 KY=MINY,MAXY
      YK=KY-30
      YL1=YK*YINC-.499999
      XL1=(YL1-BXY)/SXY
      KX1=(XL1+15.)/XINC+1.
      YL2=YK*YINC-.000001
      XL2=(YL2-BXY)/SXY
      KX2=(XL2+15.)/XINC+1.
      IF(LOCY.EQ.KY.AND.LOCX.EQ.KX1)GO TO 54
      IF(KX1.GT.MAXX.OR.KX1.LT.MINX)GO TO 54
      IF(KX1.GT.60)KX1=60
      IF(KX2.GT.60)KX2=60
      IF(KX1.LT.1)KX1=1
      IF(KX2.LT.1)KX2=1
      ZL1=XL1*SXZ+BXZ
      IF(ZL1.LE.ZC(KY,KX1))IANS=0
   54 CONTINUE
      IF(KX2.EQ.KX1)GO TO 60
C     THE PATH OF THE LINE OF SIGHT CROSSES 2 KX ALT. BOXES FOR THIS ONE KY.
      IF(LOCY.EQ.KY.AND.LOCX.EQ.KX2)GO TO 56
      IF(KX2.GT.MAXX.OR.KX2.LT.MINX)GO TO 56
      ZL2=XL2*SXZ+BXZ
      IF(ZL2.LE.ZC(KY,KX2))IANS=0
   56 CONTINUE
   60 CONTINUE
      RETURN
   70 CONTINUE
C     SPECIAL CASE OF XDIF=0.
      KX=(XAM+15.)/XINC+1.
      IF(KX.GT.60)KX=60
      DO 79 KY=MINY,MAXY
      YK=KY-30
      IF(KY.EQ.LOCY)GO TO 79
      YL=YK*YINC-.499999
```

```
      ZL=YL*SYZ+BYZ
      IF(ZL.LE.ZC(KY,KX))IANS=0
      YL=YK*YINC-.000001
      ZL=YL*SYZ+BYZ
      IF(ZL.LE.ZC(KY,KX))IANS=0
 79   CONTINUE
      RETURN
 80   CONTINUE
      IF(XDIF.EQ.0.)GO TO 90
C     SPECIAL CASE OF YDIF=0.
      KY=(YAM+15.)/YINC+1.
      IF(KY.GT.60)KY=60
      DO 89 KX=MINX,MAXX
      XK=KX-30
      IF(KX.EQ.LOCX)GO TO 89
      XL=XK*XINC-.499999
      ZL=XL*SXZ+BXZ
      IF(ZL.LE.ZC(KY,KX))IANS=0
      XL=XK*XINC-.000001
      ZL=XL*SXZ+BXZ
      IF(ZL.LE.ZC(KY,KX))IANS=0
 89   CONTINUE
      RETURN
 90   CONTINUE
C     SPECIAL CASE OF XDIF=0,YDIF=0.
C     THIS IS THE CASE OF THE AIRCRAFT DIRECTLY OVER THE STATION.
      RETURN
      KX=(XAM+15.)/XINC+1.
      IF(XK.GT.60)KX=60
      KY=(YAM+15.)/YINC+1.
      IF(KY.GT.60)KY=60
      IF(ZAM.LE.ZC(KY,KX))IANS=0
      END

SUBROUTINE CLOSEST(XA,YA,ZA,X,Y,Z,NT,RESULT,XS,YS,ZS,NS,MASTER)
C     THIS SUBROUTINE HAS BEEN ALTERED SO AS TO CHECK THE SHADOW SUBROUTINE.
      DIMENSION RS(30) ,M(30),RESULT(NS)
      DIMENSION X(NT),Y(NT),Z(NT),XS(NS),YS(NS),ZS(NS)
      DIMENSION MSHADE(30)
      COMMON/CLOSE/MSHADE
 100  FORMAT(1X,*XAM=*,F6.2,2X,*YAM=*,F6.2,2X,*ZAM=*,F6.2,2X,*CLOSEST  S
     1TATIONS*,2X, 8(I2,2X))
 200  FORMAT(1H0,*$$$$$$$$$  NO SOLUTION. LESS THAN 3 VISIBLE STATIONS*)
 300  FORMAT(1X,*SHADED STATION ARRAY*,2X,37I3)
      NSTART=0
C     THE MASTER *MUST* BE INITIALLY SET TO 5.
      MASTER=5
C     IF MS=1,PROGRAM SELECTS UP TO NS = 8 CLOSEST STATIONS WITH THE CLOSEST
C     AVAILABLE STATION AS MASTER
C     IF MS = 5,PROGRAM SELECTS UP TO 4 CORNER STATIONS AND UP TO NS-4 CLOSEST
C     STATIONS OF THOSE THAT REMAIN. THE MASTER STATION IS SELECTED AS
C     THE CLOSEST AVAILABLE STATION
C     IF MS=7,PROGRAM SELECTS UP TO 4 CORNER STATIONS AND UP TO NS-4
C     CLOSEST STATIONS OF THOSE THAT REMAIN. THE MASTER STATION IS
C     SELECTED AS CORNER STATION OF THE QUADRANT THE AIRCRAFT IS IN.
C     IF THAT STATION IS NOT AVAIBLE THE CLOSEST AVAILABLE IS SELECTED
C     AS MASTER
      MS=5
      IQUAD=1
      IF (XA.LT.0.) IQUAD=2
      IF (YA.LT.0.) IQUAD=5-IQUAD
      XM=XA/6080.
      YM=YA/6080.
      ZM=ZA/6080.
      DO 10 I=1,NS
      M(I)=I
 10   CONTINUE
      DO 20 I=1,NT
      RS(I)=(XA-X(I))**2+(YA-Y(I))**2+(ZA-Z(I))**2
      GO TO 20
```

```
C       THE *GO TO 20* CARD IS INSERTED TO BYPASS THE SHADING SUBROUTINE
  222   CONTINUE
        CALL SHADOW(XM,YM,ZM,I,IANS)
        MSHADE(I)=IANS
C       SUBROUTINE SHADOW SIMULATES THE TERRAIN AND YIELDS IANS WITH A
C       VALUE OF 1  IF GROUND STATION CAN SEE THE A/C. VALUE OF 0 IF NOT.
C       THIS VALUE IS STORED IN THE MSHADE VECTOR.
   20   CONTINUE
        IF(MS.EQ.1) GO TO 16
C       CHECK TO SEE IF THE CORNER STATIONS ARE SHADED.IF ANYONE IS,SUBSTITUTE
C       A CLOSEST STATION FOR IT.
        DO 15 LI = 8,17,3
        LIP2=LI+2
        DO 151 I=LI,LIP2
        IF(MSHADE(I).EQ.0)GO TO 151
        NSTART=NSTART+1
C       STORE THE INDEX OF THE SELECTED CORNER STATION IN THE VECTOR M
        M(NSTART)=I
        IF(MS.NE.7)GO TO 15
        LIQ=(LI-5)/3
        IF(LIQ.EQ.IQUAD)MASTER=NSTART
        GO TO 15
  151   CONTINUE
   15   CONTINUE
   16   CONTINUE
        NSTAR=NSTART+1
C       NOW SELECT THE CLOSEST STATION OF THOSE THAT REMAIN AND ARE IN
C       LINE OF SIGHT
        DO 40 I=NSTAR,NS
        NSTART=NSTART+1
        RMIN=25.0E50
        DO 30 J= 1,NT
        IF(I.EQ.1)GO TO 32
        IM=I-1
        DO 31 IG=1,IM
   31   IF(J.EQ.M(IG)) GO TO 30
   32   CONTINUE
C       THE SQUARED RANGE TO EACH GROUND STATION IS STORED IN RS(J).
C       IN PRACTICE THIS WOULD BE PRECALCULATED ON THE BASIS OF ESTIMATED
C       A/C LOC.
        IF(RS(J).GE.RMIN)GO TO 30
C       CHECK TO SEE IF ANY OF THE CLOSEST STATIONS ARE SHADED.
        IF(MSHADE(J).EQ.0)GO TO 30
        M(NSTART)=J
        RMIN=RS(J)
   30   CONTINUE
        IF(RMIN.GE.25.0E40)GO TO 41
        IF(I.EQ.NSTART.AND.MASTER.EQ.5)MASTER=NSTART
   40   CONTINUE
        GO TO 42
   41   NSTART=NSTART-1
   42   CONTINUE
        NS=NSTART
  120   FORMAT(1X,*NS=*,I3)
        WRITE(6,120) NS
C       IF AT LEAST 4 STATIONS CAN BE FOUND CONTINUE OTHERWISE INDICATE NODATA.
        IF(NS.GE.3) GO TO 51
        WRITE(6,200)
        GO TO 55
   51   DO 50 I=1,NS
        J=M(I)
        XS(I)=X(J)
        YS(I)=Y(J)
        ZS(I)=Z(J)
        RESULT(I)=SQRT(RS(J))
   50   CONTINUE
   55   CONTINUE
        WRITE(6,100) XM,YM,ZM,(M(I),I=1,NS)
        WRITE(6,300)(MSHADE(L),L=1,NT)
   60   RETURN
        END
```

```
1A    0  0  0  0  0  0  0  0  0  0  0  0  0  0  0  0  0  0  0
1B    0 10 10 10 11 12 14 12 12 12 12 14 12 13 12 12 12 12 12
1C   10 10 10 10  9  9  9  9  9  9 10 10 11 18 21 16 12 10
2A    0  0  0  0  0  0  0  0  0  0  0  0  0  0  0  0  0  0  0
2B   10 10 11 11 11 11 12 12 12 12 12 14 12 13 14 14 14 18 14 12
2C   11 11 10 10  9  9  9  9  9  9 10 10 10 11 14 18 22 12 10
3A    0  0  0  0  0  0  0  0  0  0  0  0  0  0  0  0  0 10 10
3B   10 10 10 12 12 12 14 12 12 12 16 18 12 16 16 14 20 16 20 14
3C   16 16 12 12 10  9  9  9  9  9 10 10 10 11 12 20 28 20 12 10
4A    0  0  0  0  0  0  0  0  0  0  0  0  0  0  0 10 10 10 10
4B   10 10 10 11 11 12 12 12 12 12 12 14 12 14 14 14 18 14 12
4C   14 12 11 10 10  9  9  9  9  9 10 10 10 11 14 18 11 10  9
5A    0  0  0  0  0  0  0  0  0  0  0  0  0  0 10 10 10 10 10
5B   10 10 11 12 12 20 14 18 16 18 16 18 18 18 14 16 14 16 14 16
5C   14 14 12 10  9  9  9  9  9 10 10 11 12 14 14 14 14 12 10 11
6A    0  0  0  0  0  0  0  0  0  0  0  0 12 10 10 10 10 10 10
6B   10 10 10 11 12 16 12 12 18 14 14 14 16 12 12 12 14 12 12 14
6C   12 12 12 10  9  9  9  9  9 10 10 11 12 14 12 11 10  9  9
7A    0  0  0  0  0  0  0  0  0  0 14 12 12 10 10 10 10 10 10
7B   10 10 12 12 28 20 14 18 20 16 20 24 19 14 16 14 14 16 16
7C   14 12 12 10 10  9  9  9 10 10 14 16 14 18 16 10  9  9
8A    0  0  0  0  0  0  0  0  0 11 12  9  9  9  9 10 10 10 10
8B   10 11 12 12 12 12 12 14 14 14 20 20 18 14 14 16 12 12 11 11
8C   11 11 11 10  9  9  9  9  9 10 10 12 14 10 11 10  9  9  9
9A    0  0  0  0  0  0  0 20 20 12 11 10  9  9 10 10 10 10 10
9B   10 11 12 12 16 12 16 16 18 14 20 22 22 18 18 16 14 12 12 11
9C   12 10 10 10  9  9  9  9  9 10 10 12 12 16 14 10  9  9  9
10A   0  0  0  0  0  0  0 20 18 12 11 10 10  9  9 10 10 10 10
10B  10 11 12 12 12 12 14 14 14 14 14 18 20 14 14 13 12 12 12 11
10C  10 10 10 10  9  9  9  9  9 10 10 10 11 20 11  9  9  9  9
11A   0  0  0  0  0 12 16 28 22 20 11 11 11 10 10 10 10 10 10
11B  10 12 12 12 12 13 14 14 14 24 24 18 18 18 16 14 14 12 12 12
11C  11 11 10 10  9  9  9  9  9  9 10 14 23 18 12  9  9  9  8
12A   0  0  0  9  9 11 14 20 20 18 11 11 10 10 10 10 10 10 10
12B  10 11 12 12 12 12 18 14 14 18 16 18 14 14 12 12 11 12 10
12C  10 10 10  9  9  9  9  9  9 10 16 20 11 11  9  9  8  7  7
13A   0  0  9 10 14 20 18 18 18 12 11 11 10 10 10 10 10 10 10
13B  10 10 12 12 12 16 16 22 24 26 20 20 14 16 14 12 11 11 14
13C  11 10 10  9  9  9  9  9  9 12 16 18 10 10  9  8  7  7  7
14A   8  8  8  9  9 10 16 18 16 12 11 11 10 10 10 10 10 10 10
14B  10 10 12 12 12 12 12 14 22 14 22 16 22 12 18 13 11 10 10 10
14C  10 10  9  9  9  9  9  9  9 11 11  9  9  8  8  7  7  7  7
15A   8  8  9  9 10 16 18 22 20 12 11 11 11 10 10 10 10 10 10
15B  10 14 14 14 14 12 14 16 18 26 26 29 24 16 13 12 12 12 11 10
15C  10 10  9  9  9  9  9  9  9 12 18 10  9  8  8  7  7  7  7
16A   8  8  9  9 14 10 12 16 16 11 11 10 10 10  9 10 10 10 10
16B  10 10 11 12 12 14 14 14 16 14 14 20 12 20 12 11 11 12 10 10
16C  10  9  9  9  9  9  9  9  9  9 10  9  8  8  7  7  7  6  6
17A   8  9  9  9 14 18 16 12 11 11 11 11 10 10 10  9 10 10 10
17B  10 10 10 12 12 12 12 14 18 20 22 20 18 18 14 16 12 14 10 10
17C  10  9  9  9  9  9  9  9  9 10 12 12  8  8  7  6  6  6
18A   8  9  9  9 10 16 16 12 11 11 10 10 10 10  9  9 10 10 10
18B  10 10 10 20 12 12 12 12 12 12 16 12 20 14 16 12 12 10  9  9
18C   9  9 10  9  9  8  8  8  8  9  8  7  7  7  6  6  6  6
19A   9  9  9 12 14 18 12 14 11 11 10 10 10 10  9  9 10 10 10
19B  10 12 18 20 18 16 16 12 14 14 12 16 16 20 16 12 12 16 10  9
19C   9  9  9  9  8  8  8  8 12 12  7  7  7  6  6  6  6
20A   8  9  9 10 11 14 12 12 10 10 11  9  9  9  9  9 10 10 10
20B  10 10 11 22 24 22 20 14 12 11 14 11 11 11 12  9  9  9  9  9
20C   9  8  8  8  8  8  8  7  7  7  7  6  6  6  6  6  6
21A   9  9 10 14 18 20 20 20 10 10 10  9  9  9  9  9  9 10 10
21B  10 11 22 22 14 22 24 18 14 11 11 11 11 10 10  9  9  9 10
21C   9  9  9  9  8  8  7  7  7  7  7  6  6  6  6  6  6  6
22A   9  9 11 12 18 24 18 12 11 10  9  9  9  9  9  9  9  9  9
22B  10 10 12 20 12 16 14 12 11 11 10 10 10  9  9  9  9  9  9
22C   8  8  8  8  7  7  7  7  7  7  7  6  6  6  6  6  6  6
23A   9 10 16 22 20 22 16 11 10 10  9  9  9  9  9  9  9  9  9
23B  10 10 18 22 11 12 12 12 11 10 10 10 10 10  9  9  9  9  9
23C   9  9  8  8  8  7  7  7  7  7  7  7  6  6  6  6  6  6
24A   9 10 12 18 14 11 11 10 10  9  9  9  9  9  9  9  9  9  9
24B   9 10 10 12 11 10 10 10 10 10 10 10 10  9  9  9  8  8  8
24C   8  8  7  7  7  7  7  7  7  7  7  6  6  6  6  6  6  6
25A   9 20 26 26 24 18 11 10 10  9  9  9  9  9  9  9  9  9  9
```

| | | | | | | | | | | | | | | | | | | | |
|---|---|---|---|---|---|---|---|---|---|---|---|---|---|---|---|---|---|---|---|
| 25B | | 9 | 10 | 10 | 12 | 11 | 10 | 10 | 10 | 10 | 10 | 10 | 9 | 9 | 9 | 8 | 8 | 8 | 8 | 8 |
| 25C | | 8 | 7 | 7 | 7 | 7 | 7 | 7 | 7 | 7 | 7 | 7 | 7 | 6 | 6 | 6 | 6 | 6 | 6 | 6 |
| 26A | | 9 | 14 | 18 | 18 | 11 | 10 | 10 | 9 | 9 | 9 | 9 | 9 | 9 | 9 | 9 | 9 | 9 | 9 | 9 |
| 26B | | 9 | 10 | 10 | 10 | 10 | 10 | 10 | 9 | 9 | 9 | 9 | 8 | 8 | 8 | 8 | 8 | 7 | 7 | 7 |
| 26C | | 7 | 7 | 7 | 7 | 7 | 7 | 7 | 7 | 7 | 7 | 7 | 7 | 6 | 6 | 6 | 6 | 6 | 6 | 6 |
| 27A | | 9 | 16 | 18 | 18 | 16 | 16 | 10 | 9 | 9 | 9 | 9 | 9 | 9 | 9 | 9 | 9 | 9 | 9 | 9 |
| 27B | | 10 | 9 | 9 | 9 | 10 | 10 | 10 | 12 | 9 | 9 | 9 | 9 | 8 | 8 | 8 | 8 | 8 | 7 | 7 |
| 27C | | 7 | 7 | 7 | 7 | 7 | 7 | 7 | 7 | 7 | 7 | 7 | 6 | 6 | 6 | 6 | 6 | 6 | 6 | 6 |
| 28A | | 9 | 16 | 12 | 14 | 10 | 10 | 9 | 9 | 9 | 9 | 9 | 9 | 9 | 9 | 9 | 9 | 9 | 9 | 9 |
| 28B | | 9 | 9 | 9 | 9 | 9 | 9 | 9 | 10 | 9 | 9 | 8 | 8 | 8 | 7 | 7 | 7 | 7 | 7 | 7 |
| 28C | | 7 | 7 | 7 | 7 | 6 | 6 | 6 | 6 | 6 | 6 | 6 | 6 | 6 | 6 | 6 | 6 | 6 | 6 | 6 |
| 29A | | 9 | 10 | 11 | 10 | 9 | 9 | 9 | 9 | 9 | 8 | 8 | 8 | 8 | 8 | 8 | 8 | 9 | 9 | 10 |
| 29B | | 10 | 9 | 9 | 9 | 8 | 9 | 9 | 9 | 8 | 8 | 8 | 8 | 7 | 7 | 7 | 7 | 7 | 7 | 7 |
| 29C | | 7 | 7 | 7 | 6 | 6 | 6 | 6 | 6 | 6 | 5 | 6 | 6 | 6 | 6 | 6 | 6 | 6 | 6 | 6 |
| 30A | | 9 | 12 | 14 | 12 | 10 | 9 | 9 | 8 | 8 | 8 | 8 | 8 | 7 | 8 | 8 | 8 | 8 | 10 | 14 |
| 30B | | 12 | 10 | 9 | 9 | 9 | 8 | 10 | 8 | 8 | 8 | 8 | 7 | 7 | 7 | 7 | 7 | 7 | 7 | 7 |
| 30C | | 6 | 6 | 6 | 6 | 6 | 6 | 6 | 6 | 6 | 6 | 6 | 6 | 6 | 6 | 6 | 6 | 6 | 6 | 6 |
| 31A | | 12 | 12 | 12 | 10 | 9 | 9 | 8 | 8 | 8 | 8 | 8 | 7 | 7 | 8 | 8 | 8 | 9 | 10 | 12 | 14 |
| 31B | | 12 | 10 | 10 | 9 | 9 | 8 | 9 | 8 | 8 | 8 | 7 | 7 | 7 | 7 | 7 | 7 | 6 | 6 | 6 |
| 31C | | 6 | 6 | 6 | 6 | 6 | 6 | 6 | 6 | 6 | 6 | 6 | 6 | 6 | 6 | 6 | 6 | 6 | 10 | 12 |
| 32A | | 11 | 14 | 9 | 9 | 8 | 8 | 8 | 7 | 7 | 7 | 7 | 7 | 7 | 7 | 7 | 8 | 8 | 9 | 10 | 14 | 20 |
| 32B | | 12 | 10 | 9 | 9 | 9 | 8 | 8 | 8 | 7 | 7 | 7 | 7 | 7 | 7 | 7 | 6 | 6 | 6 | 6 |
| 32C | | 6 | 6 | 6 | 6 | 6 | 6 | 6 | 6 | 5 | 5 | 5 | 6 | 6 | 6 | 6 | 7 | 12 | 8 |
| 33A | | 18 | 14 | 14 | 10 | 9 | 8 | 8 | 7 | 7 | 7 | 7 | 7 | 8 | 8 | 9 | 10 | 20 | 18 |
| 33B | | 20 | 18 | 12 | 9 | 9 | 8 | 8 | 8 | 7 | 7 | 7 | 7 | 6 | 6 | 6 | 6 | 6 |
| 33C | | 6 | 6 | 6 | 6 | 6 | 6 | 6 | 5 | 5 | 6 | 6 | 6 | 6 | 6 | 10 | 16 | 16 |
| 34A | | 26 | 12 | 9 | 9 | 8 | 7 | 7 | 7 | 6 | 7 | 7 | 8 | 8 | 8 | 9 | 10 | 16 | 22 |
| 34B | | 24 | 18 | 10 | 9 | 9 | 8 | 8 | 7 | 7 | 7 | 7 | 6 | 6 | 6 | 6 | 6 | 6 |
| 34C | | 6 | 5 | 5 | 6 | 5 | 5 | 5 | 5 | 5 | 6 | 5 | 5 | 6 | 6 | 7 | 10 | 16 | 9 |
| 35A | | 16 | 10 | 9 | 8 | 8 | 7 | 7 | 7 | 7 | 7 | 7 | 7 | 8 | 8 | 9 | 10 | 20 | 20 | 16 |
| 35B | | 16 | 20 | 14 | 9 | 9 | 8 | 8 | 7 | 7 | 7 | 7 | 7 | 6 | 6 | 6 | 6 | 6 | 6 |
| 35C | | 5 | 5 | 5 | 5 | 5 | 5 | 5 | 6 | 6 | 6 | 6 | 6 | 6 | 6 | 7 | 12 | 10 | 12 | 10 |
| 36A | | 16 | 12 | 8 | 8 | 8 | 7 | 7 | 7 | 7 | 7 | 7 | 7 | 8 | 10 | 14 | 20 | 26 | 26 |
| 36B | | 16 | 16 | 14 | 8 | 8 | 8 | 7 | 7 | 7 | 7 | 7 | 6 | 6 | 6 | 6 | 6 | 6 | 5 |
| 36C | | 5 | 5 | 5 | 5 | 5 | 5 | 5 | 6 | 6 | 6 | 6 | 6 | 6 | 8 | 16 | 14 | 12 | 7 |
| 37A | | 11 | 9 | 9 | 8 | 8 | 7 | 7 | 7 | 7 | 7 | 7 | 7 | 8 | 9 | 10 | 18 | 24 | 14 |
| 37B | | 18 | 11 | 9 | 9 | 8 | 8 | 8 | 7 | 7 | 7 | 6 | 6 | 6 | 6 | 6 | 6 | 6 | 5 |
| 37C | | 5 | 5 | 5 | 5 | 5 | 5 | 5 | 6 | 6 | 5 | 5 | 6 | 7 | 10 | 12 | 16 | 10 | 10 |
| 38A | | 10 | 9 | 9 | 8 | 7 | 6 | 6 | 6 | 6 | 5 | 5 | 6 | 7 | 10 | 12 | 16 | 10 | 10 |
| 38B | | 12 | 11 | 9 | 9 | 8 | 8 | 7 | 7 | 7 | 6 | 6 | 6 | 7 | 7 | 8 | 12 | 14 | 24 | 28 | 16 |
| 38C | | 5 | 5 | 5 | 5 | 5 | 5 | 5 | 6 | 6 | 5 | 6 | 6 | 6 | 6 | 6 | 5 | 5 | 5 |
| 39A | | 9 | 9 | 9 | 8 | 7 | 7 | 7 | 7 | 7 | 7 | 7 | 7 | 6 | 12 | 18 | 14 | 12 | 10 | 9 |
| 39B | | 14 | 12 | 10 | 9 | 8 | 8 | 7 | 7 | 7 | 6 | 6 | 6 | 6 | 7 | 8 | 16 | 20 | 18 | 14 |
| 39C | | 5 | 5 | 5 | 5 | 5 | 5 | 6 | 6 | 5 | 5 | 6 | 6 | 6 | 6 | 5 | 5 | 5 | 5 |
| 40A | | 12 | 9 | 8 | 8 | 7 | 7 | 7 | 7 | 7 | 7 | 7 | 7 | 6 | 8 | 18 | 29 | 20 | 14 | 8 | 8 |
| 40B | | 14 | 14 | 10 | 14 | 10 | 8 | 8 | 7 | 7 | 6 | 6 | 6 | 6 | 7 | 8 | 10 | 14 | 14 | 14 |
| 40C | | 5 | 5 | 5 | 5 | 5 | 5 | 6 | 6 | 5 | 5 | 6 | 6 | 5 | 5 | 5 | 5 | 5 |
| 41A | | 9 | 8 | 8 | 7 | 7 | 7 | 7 | 6 | 6 | 5 | 5 | 6 | 8 | 16 | 24 | 18 | 12 | 10 | 8 |
| 41B | | 8 | 8 | 12 | 12 | 7 | 7 | 6 | 6 | 6 | 6 | 7 | 7 | 7 | 7 | 7 | 8 | 8 | 8 |
| 41C | | 5 | 5 | 5 | 5 | 5 | 5 | 6 | 6 | 6 | 6 | 6 | 5 | 5 | 5 | 5 | 5 | 5 | 5 |
| 42A | | 10 | 8 | 8 | 7 | 7 | 7 | 6 | 6 | 5 | 5 | 5 | 6 | 24 | 12 | 8 | 8 | 8 | 7 | 6 |
| 42B | | 7 | 7 | 7 | 10 | 7 | 7 | 6 | 6 | 6 | 6 | 6 | 5 | 5 | 5 | 5 | 6 | 7 | 8 | 8 | 8 |
| 42C | | 5 | 5 | 5 | 5 | 5 | 5 | 6 | 6 | 5 | 5 | 5 | 8 | 22 | 24 | 12 | 8 | 10 | 6 | 6 |
| 43A | | 10 | 8 | 8 | 7 | 7 | 7 | 6 | 6 | 5 | 5 | 6 | 6 | 6 | 6 | 6 | 8 | 8 | 8 | 7 |
| 43B | | 7 | 7 | 7 | 10 | 7 | 7 | 6 | 6 | 6 | 6 | 6 | 5 | 5 | 5 | 5 | 5 | 5 | 5 |
| 43C | | 5 | 5 | 5 | 5 | 6 | 6 | 6 | 6 | 5 | 5 | 6 | 8 | 22 | 24 | 12 | 8 | 8 | 6 | 6 |
| 44A | | 12 | 8 | 7 | 7 | 8 | 8 | 7 | 6 | 6 | 5 | 5 | 6 | 6 | 6 | 6 | 6 | 6 | 8 | 8 |
| 44B | | 7 | 7 | 7 | 8 | 6 | 6 | 6 | 6 | 6 | 6 | 5 | 5 | 5 | 5 | 5 | 5 | 5 | 4 |
| 44C | | 4 | 4 | 4 | 4 | 5 | 6 | 6 | 6 | 5 | 5 | 6 | 8 | 22 | 20 | 10 | 6 | 6 | 6 | 5 |
| 45A | | 10 | 7 | 7 | 7 | 6 | 10 | 6 | 6 | 6 | 5 | 5 | 5 | 5 | 5 | 5 | 5 | 6 | 7 | 10 |
| 45B | | 7 | 7 | 6 | 8 | 6 | 6 | 6 | 6 | 6 | 5 | 5 | 5 | 5 | 5 | 5 | 5 | 5 | 4 | 4 |
| 45C | | 4 | 4 | 4 | 4 | 5 | 6 | 6 | 5 | 5 | 5 | 6 | 10 | 22 | 20 | 10 | 6 | 6 | 5 | 5 |
| 46A | | 8 | 7 | 7 | 6 | 6 | 6 | 6 | 5 | 5 | 5 | 6 | 6 | 5 | 5 | 5 | 6 | 6 | 7 | 7 |
| 46B | | 8 | 7 | 7 | 8 | 6 | 6 | 6 | 6 | 5 | 5 | 5 | 5 | 5 | 5 | 5 | 4 | 4 | 4 |
| 46C | | 4 | 4 | 4 | 5 | 5 | 6 | 5 | 5 | 5 | 5 | 6 | 20 | 12 | 7 | 6 | 5 | 5 | 5 |
| 47A | | 10 | 8 | 7 | 6 | 6 | 6 | 10 | 6 | 5 | 5 | 5 | 6 | 5 | 5 | 5 | 5 | 5 | 6 | 8 |
| 47B | | 8 | 8 | 7 | 7 | 6 | 7 | 6 | 5 | 5 | 5 | 5 | 5 | 5 | 5 | 4 | 4 | 4 | 4 |
| 47C | | 4 | 4 | 4 | 4 | 5 | 6 | 5 | 5 | 5 | 5 | 10 | 16 | 20 | 12 | 6 | 6 | 5 | 5 | 5 |
| 48A | | 9 | 7 | 7 | 7 | 5 | 7 | 12 | 11 | 6 | 6 | 6 | 6 | 6 | 6 | 6 | 6 | 6 | 6 | 9 |
| 48B | | 10 | 7 | 7 | 7 | 5 | 5 | 5 | 5 | 5 | 5 | 5 | 5 | 4 | 4 | 4 | 4 | 4 | 4 |
| 48C | | 4 | 4 | 4 | 4 | 7 | 7 | 6 | 5 | 5 | 5 | 10 | 17 | 19 | 20 | 11 | 7 | 5 | 5 | 5 | 5 |
| 49A | | 7 | 7 | 7 | 6 | 6 | 11 | 7 | 9 | 5 | 5 | 5 | 7 | 5 | 6 | 6 | 6 | 6 | 6 | 6 |

```
49B      8  7  7  5  5  5  5  5  5  5  5  5  5  5  4  4  4  4  4  4
49C      4  4  4  5  5  7  7  6  6  6  7 11 21 13  7  6  5  5  5  5
50A      5  5  5  5  9 11  5  5  5  5  5  3  5  6  6  5  5  5  5  5
50B      7  7  6  6  5  5  5  5  5  5  5  5  5  4  4  4  4  4  4  4
50C      4  4  4  4  7  7  5  5  5  5  7 17 21 11  7  7  5  5  5  5
51A      5  5  5  5  5  5  5  5  5  5  5  5  5  5  5  5  5  5  5  5
51B      5  5  6  6  5  5  5  5  4  4  4  4  4  4  4  4  4  4  4  4
51C      3  4  4  4  5  6  5  4  5  5  9 17 17  8  6  5  5  5  5  5
52A      5  5  5  5  5  4  4  4  5  4  4  4  4  4  4  4  4  4  5  5
52B      5  6 12  8  5  5  5  4  4  4  4  4  4  4  4  4  4  4  3  3
52C      3  4  4  4  5  5  5  4  4  6 18 20 12  6  5  5  5  5  5  5
53A      5  5  5  5  5  4  4  4  4  4  4  4  4  4  4  4  4  4  4  5
53B      8 12 12  6  5  4  4  4  4  4  4  4  4  4  4  3  3  3  3  3
53C      3  4  4  4  5  5  4  6  6 20 20 10  5  5  5  4  4  4  4  3
54A      4  4  4  4  4  4  4  3  4  3  4  4  3  3  4  4  4  4  4  4
54B      5  8  8  5  4  4  4  4  4  4  4  4  4  4  3  3  3  3  3  3
54C      3  4  4  4  5  5  4  5  6 10 24 12  6  5  5  4  4  4  4  3
55A      4  4  4  4  3  3  3  3  3  3  3  3  3  3  3  3  4  4  4
55B      4  4  4  4  4  4  4  4  4  4  3  3  3  3  3  3  3  3  3
55C      3  4  4  4  4  4  4  8  5 12 16 10  5  5  4  4  4  4  3  3
56A      4  3  3  3  3  3  3  3  3  3  3  3  3  3  3  3  3  4  4
56B      4  4  4  4  4  4  4  4  4  4  3  3  3  3  3  3  3  3  3  3
56C      3  4  4  4  4  4  4  5  5 12 14  5  4  4  4  4  4  3  3  3
57A      3  3  3  3  3  3  3  3  3  3  3  3  3  3  3  3  3  3  3  3
57B      3  4  4  4  4  4  4  4  3  3  3  3  3  3  3  3  3  3  3  3
57C      4  4  4  4  4  4  5  5  5 11 10  5  5  5  5  5  3  3  3  3
58A      3  3  3  3  3  3  3  3  3  3  3  3  3  3  3  3  3  3  3  3
58B      3  3  3  3  3  3  3  3  3  3  3  3  3  3  3  3  3  3  3  3
58C      3  3  4  4  4  4  5  5  7  7  7  5  5  5  3  3  3  3  3  3
59A      3  3  3  3  3  3  3  3  2  2  2  2  2  3  3  3  3  3  3  3
59B      3  3  3  3  3  3  3  3  3  3  3  3  3  3  3  3  3  3  3  3
59C      3  3  4  4  4  4  5  5  6 12  6  4  4  3  3  3  3  3  3  3
60A      2  2  2  2  2  2  2  2  3  3  3  3  3  2  2  3  3  3  3  3
60B      3  3  8  3  3  3  3  3  3  3  3  3  3  3  3  3  3  3  3  3
60C      3  3  3  3  4  4  5  6 18 16  4  4  3  3  3  3  3  3  3  3
```

|      |       |       |         |                                  |       |
|------|-------|-------|---------|----------------------------------|-------|
|   1  |  0.00 |  0.00 |  810.00 | 19 STATION SUPERHEX ACMR5 D      |       |
|   2  |  3.70 | -0.30 |  700.00 | 19 STATION SUPERHEX ACMR5 D      |       |
|   3  |  2.20 |  3.00 |  600.00 | 19 STATION SUPERHEX ACMR5 D      |       |
|   4  | -1.60 |  3.30 |  800.00 | 19 STATION SUPERHEX ACMR5 D      |       |
|   5  | -3.70 |  0.30 | 1600.00 | 19 STATION SUPERHEX ACMR5 D      |       |
|   6  | -2.00 | -3.00 | 1200.00 | 19 STATION SUPERHEX ACMR5 D      |       |
|   7  |  1.60 | -3.20 | 1000.00 | 19 STATION SUPERHEX ACMR5 D      |       |
|   8  |  4.30 |  6.10 |  470.00 | 19 STATION SUPERHEX ACMR5 D      |  ( 9) |
|   9  |  5.90 |  2.80 |  600.00 | 19 STATION SUPERHEX ACMR5 D      |  ( 8) |
|  10  |  0.60 |  6.40 |  500.00 | 19 STATION SUPERHEX ACMR5 D      | (12)  |
|  11  | -5.20 |  3.70 |  880.00 | 19 STATION SUPERHEX ACMR5 D      | (12)  |
|  12  | -3.20 |  6.70 |  700.00 | 19 STATION SUPERHEX ACMR5 D      | (11)  |
|  13  | -7.30 |  0.60 |  790.00 | 19 STATION SUPERHEX ACMR5 D      |       |
|  14  | -4.20 | -6.10 | 1150.00 | 19 STATION SUPERHEX ACMR5 D      | (15)  |
|  15  | -5.80 | -3.70 |  950.00 | 19 STATION SUPERHEX ACMR5 D      | (14)  |
|  16  | -0.50 | -6.80 | 2100.00 | 19 STATION SUPERHEX ACMR5 D      |       |
|  17  |  5.30 | -3.80 |  850.00 | 19 STATION SUPERHEX ACMR5 D      | (18)  |
|  18  |  3.20 | -6.60 | 1200.00 | 19 STATION SUPERHEX ACMR5 D      | (17)  |
| STOP 19 |  7.40 | -0.60 |  630.00 | 19 STATION SUPERHEX ACMR5 D   |       |

NON-LINEAR HYPERBOLIC SOLUTION

Assuming that either as a result of an initial acquisition step or as a result of a prior computation recently performed the initial approximate coordinates of an aircraft's position $(x_a, y_a, z_a)$ are available; then an improved value of the position can be obtained by the following iterative method.

The expression for the ranges $R_i$ from the estimated position of the aircraft with respect to $(n-1)$ of the selected ground stations, and $R_j$ to the reference ground station, are given respectively by:

$$R_i^2 = (x_a - x_i)^2 + (y_a - y_i)^2 + (z_a - z_i)^2, \; i=1, \ldots, n-1$$

and $$R_j^2 = (x_a - x_j)^2 + (y_a - y_j)^2 + (z_a - z_j)^2, \quad (17)$$

where $x_a, y_a, z_a$ are the coordinates of an aircraft position.

If the reference ($j^{th}$) ground station is fixed and if arrival-time delay information is collected between a set of n ground station, then $(n-1)$ independent delay measurements are available. The measured range delay $D_{ij}$ is defined as:

$$R_i^{(m)} R_j^{(m)} = 2 D_{ij}, \quad (18)$$

where $R_i^{(m)}$ and $R_j^{(m)}$ correspond to the measured ranges from the selected ground stations to the aircraft.

It is convenient to replace $x_a$ with $x_{a_o} + \xi$, $y_a$ with $y_{a_o} + \eta$, $z_a$ with $z_{a_o} + \zeta$, each of which represents an initially available aircraft coordinate plus a positional increment to improve the initial coordinate. The ground-to-air ranges $R_i, R_j$ are then expanded in a Taylor series, and the corresponding expression for the mean squared error as a function of the aircraft coordinates is derived. A tractable error expression can be obtained from the several Taylor series where the terms of order higher than second are neglected. If weighting coefficients $q_i$ are employed, the weighted mean squared error expression is given by $$-\epsilon_j(\xi,\eta,\zeta) = \sum_{\substack{i=1 \\ i\neq j}}^{n} q_i^2 (R_{i_0} - R_{j_0} - 2D_{ij}$$
$$+ e_{11}^{(i)}\xi + e_{12}^{(i)}\eta + e_{13}^{(i)}\zeta$$
$$+ g_{11}^{(i)}\xi^2 + g_{12}^{(i)}\xi\eta + g_{13}^{(i)}\xi\zeta + g_{21}^{(i)}\xi\eta$$
$$+ g_{22}^{(i)}\eta + g_{23}^{(i)}\eta\zeta$$
$$+ g_{31}^{(i)}\xi\zeta + g_{32}^{(i)}\eta\zeta + g_{33}^{(i)}\zeta^2)^2 \quad (19)$$

The mean squared error expression can be minimized by differentiating it with respect to $\xi$, $\eta$ and $\zeta$, respectively. The resulting system of three linear equations in three unknowns (with terms of order higher than first neglected) is given by:

$$\sum_{\substack{i=1 \\ i\neq j}}^{n} q_i^2 (A_{0k}^{(i)} + A_{1k}^{(i)}\xi + A_{2k}^{(i)}\eta + A_{3k}^{(i)}\zeta) = 0 \quad (20)$$

where the coefficients $A_{0k}$, $A_{1k}$, $A_{2k}$, and $A_{3k}$ ($k=1, 2, 3$) are conveniently defined.

Minimizing $\epsilon_j(\xi, \eta, \zeta)$ yields the following equations:

$$D = \frac{1}{2}\frac{\partial \epsilon_j}{\partial \xi} = \sum_{\substack{i=1 \\ i\neq j}}^{n} [R_{i_0} - R_{j_0} - 2D_{ij} + (\delta R_i R_j) + (\delta^2 R_i - \delta^2 R_j)]$$
$$\cdot \left[\frac{x_{a_0} - x_i}{R_{i_0}} - \frac{x_{a_0} - x_j}{R_{j_0}} + XI - XJ\right] q_i^2$$
$$= \sum_{\substack{i=1 \\ i\neq j}}^{n} [\text{first term}]\cdot[\text{second term}]\cdot q_i^2 \quad (21)$$

$$D = \frac{1}{2}\frac{\delta \epsilon_j}{\delta \eta} = \sum_{\substack{i=1 \\ i\neq j}}^{n} [R_{i_0} - R_{j_0} - 2D_{ij} + (\delta R_i - \delta R_j)$$
$$+ (\delta^2 R_i - \delta^2 R_j)] \cdot \left[\frac{y_{a_0} - y_i}{R_{i_0}} - \frac{y_{a_j} - y_i}{R_{j_0}} + YI - YJ\right] \cdot q_i^2$$
$$= \sum_{\substack{i=1 \\ i\neq j}}^{n} [\text{first term}]\cdot[\text{second term}]\cdot q_i^2 \quad (22)$$

$$D = \frac{1}{2}\frac{\delta \epsilon_j}{\delta \zeta} = \sum_{\substack{i=1 \\ i\neq j}}^{n} [R_{i_0} - R_{j_0} - 2D_{ij} + (\delta R_i - \delta R_j)$$
$$+ (\delta^2 R_i - \delta^2 R_j)] \cdot \left[\frac{z_{a_0} - z_i}{R_{i_0}} - \frac{z_{a_0} - z_j}{R_{j_0}} + ZI - ZJ\right] \cdot q_i^2$$
$$= \sum_{\substack{i=1 \\ i\neq j}}^{n} [\text{first term}]\cdot[\text{second term}]\cdot q_i^2 \quad (23)$$

$$XI = \frac{\delta(\delta^2 R_i)}{\delta \xi} = \frac{1}{R_{i_0}^3} \{[(y_{a_0} - y_i)^2 + (z_{a_0} - z_i)^2]\cdot \xi$$
$$- [(x_{a_0} - x_i)(y_{a_0} - y_i)]\eta - [(z_{a_0} - z_i)(x_{a_0} - x_i)]\zeta\}$$

$$YI = \frac{\delta(\delta^2 R_i)}{\delta \eta} = \frac{1}{R_{i_0}^3} \{[(x_{a_0} - x_i)^2 + (z_{a_0} - z_i)^2]\cdot \eta$$
$$- [(x_{a_0} - x_i)(y_{a_0} - y_i)]\xi - [(y_{a_0} - y_i)(z_{a_0} - z_i)]\zeta\}$$

$$ZI = \frac{\delta(\delta^2 R_i)}{\delta \zeta} = \frac{1}{R_{i_0}^3} \{[(x_{a_0} - x_i)^2 + (y_{a_0} - y_i)^2]\cdot \zeta$$
$$- [(y_{a_0} - y_i)(z_{a_0} - z_i)]\eta - [(z_{a_0} - z_i)(x_{a_0} - x_i)]\xi\}$$

$$XJ = \frac{\partial(\delta^2 R_j)}{\partial \xi} = \frac{1}{R_{j_0}^3} \{[(y_{a_0} - y_j)^2 + (z_{a_0} - z_j)^2]\cdot \xi$$
$$- [(x_{a_0} - x_j)(y_{a_0} - y_j)]\eta - [(z_{a_0} - z_j)(x_{a_0} - x_j)]\zeta\}$$

$$YJ = \frac{\partial(\delta^2 R_j)}{\partial \eta} = \frac{1}{R_{j_0}^3} \{[(x_{a_0} - x_j)^2 + (z_{a_0} - z_j)^2]\cdot \eta$$
$$- [(x_{a_0} - x_j)(y_{a_0} - y_j)]\xi - [(y_{a_0} - y_j)(z_{a_0} - z_j)]\zeta\}$$

$$ZJ = \frac{\partial(\delta^2 R_j)}{\partial \zeta} = \frac{1}{R_{j_0}^3} \{[(x_{a_0} - x_j)^2 + (y_{a_0} - y_j)^2]\cdot \zeta$$
$$- [(y_{a_0} - y_j)(z_{a_0} - z_j)]\eta - [(z_{a_0} - z_j)(x_{a_0} - x_j)]\xi\}$$

The first terms of (21) (22) (23) are given by:
$(R_{i_0} - R_{j_0} - 2D_{ij})$ $$+ \xi \cdot \left[\frac{1}{R_{i_0}}(x_{a_0} - x_i) - \frac{1}{R_{j_0}}(x_{a_0} - x_j)\right]$$
$$+ \eta \cdot \left[\frac{1}{R_{i_0}}(y_{a_0} - y_i) - \frac{1}{R_{j_0}}(y_{a_0} - y_j)\right]$$
$$+ \zeta \cdot \left[\frac{1}{R_{i_0}}(z_{a_0} - z_i) - \frac{1}{R_{j_0}}(z_{a_0} - z_j)\right]$$
$$+ \ldots$$

The second term of (21) is given by:

$$\left\{\frac{x_{a_0} - x_i}{R_{i_0}} - \frac{x_{a_0} - x_j}{R_{j_0}}\right\}$$
$$+ \xi \cdot \left\{\frac{(y_{a_0} - y_i)^2 + (z_{a_0} - z_i)^2}{R_{i_0}^3} - \frac{(y_{a_0} - y_j)^2 + (z_{a_0} - z_j)^2}{R_{j_0}^3}\right\}$$
$$+ \eta \cdot \left\{-\left[\frac{(x_{a_0} - x_i)(y_{a_0} - y_i)}{R_{i_0}^3} - \frac{(x_{a_0} - x_j)(y_{a_0} - y_j)}{R_{j_0}^3}\right]\right\}$$
$$+ \zeta \cdot \left\{-\left[\frac{(z_{a_0} - z_i)(x_{a_0} - x_i)}{R_{i_0}^3} - \frac{(z_{a_0} - z_j)(x_{a_0} - x_j)}{R_{j_0}^3}\right]\right\}$$
$$+ \ldots$$

The second terms of (22) is given by:

$$\left\{\frac{y_{a_0} - y_i}{R_{i_0}} - \frac{y_{a_0} - y_j}{R_{j_0}}\right\}$$
$$+ \xi \cdot \left\{-\left[\frac{(x_{a_0} - x_i)(y_{a_0} - y_i)}{R_{i_0}^3} - \frac{(x_{a_0} - x_j)(y_{a_0} - y_j)}{R_{j_0}^3}\right]\right\}$$
$$+ \eta \cdot \left\{\frac{(x_{a_0} - x_i)^2 + (z_{a_0} - z_i)^2}{R_{i_0}^3} - \frac{(x_{a_0} - x_j)^2 + (z_{a_0} - z_j)^2}{R_{j_0}^3}\right\}$$
$$+ \zeta \cdot \left\{-\left[\frac{(y_{a_0} - y_i)(z_{a_0} - z_i)}{R_{i_0}^3} - \frac{(y_{a_0} - y_j)(z_{a_0} - z_j)}{R_{j_0}^3}\right]\right\}$$
$$+ \ldots$$

The second term (23) is given by:

$$\left\{\frac{z_{a_0}-z_i}{R_{i_0}}-\frac{z_{a_0}-z_j}{R_{j_0}}\right\}$$

$$+\xi\cdot\left\{-\left[\frac{(z_{a_0}-z_i)(x_{a_0}-x_i)}{R_{i_0}^3}-\frac{(z_{a_0}-z_i)(x_{a_0}-x_j)}{R_{j_0}^3}\right]\right\}$$

$$+\eta\cdot\left\{-\left[\frac{(y_{a_0}-y_i)(z_{a_0}-z_i)}{R_{i_0}^3}-\frac{(y_{a_0}-y_j)(z_{a_0}-z_j)}{R_{j_0}^3}\right]\right\}$$

$$+\zeta\cdot\left\{\frac{(x_{a_0}-x_i)^2+(y_{a_0}-y_i)^2}{R_{i_0}^3}-\frac{(x_{a_0}-x_j)^2+(y_{a_0}-y_j)^2}{R_{j_0}^3}\right\}$$

$$+\ldots$$

The terms of order higher than the second are neglected in (21) and Equation (21) becomes $$0=\sum_{\substack{i=1\\i\neq j}}^{n}\left\{[R_{i_0}-R_{j_0}-2D_{ij}]\left[\frac{(x_{a_0}-x_i)}{R_{i_0}}-\frac{(x_{a_0}-x_j)}{R_{j_0}}\right]\right\}q_i^2$$

$$+\xi\cdot\sum_{\substack{i=1\\i\neq j}}^{n}\left\{[R_{i_0}-R_{j_0}-2D_{ij}]\cdot\left[\frac{(y_{a_0}-y_i)^2+(z_{a_0}-z_i)^2}{R_{i_0}^3}\right.\right.$$

$$\left.\left.-\frac{(y_{a_0}-y_j)^2+(z_{a_0}-z_j)^2}{R_{j_0}^3}\right]+\left[\frac{(x_{a_0}-x_i)}{R_{i_0}}-\frac{(x_{a_0}-x_j)}{R_{j_0}}\right]^2\right\}q_i^2$$

$$+\eta\cdot\sum_{\substack{i=1\\i\neq j}}^{n}\left\{-[R_{i_0}-R_{j_0}-2D_{ij}]\right.$$

$$\left[\frac{(x_{a_0}-x_i)(y_{a_0}-y_i)}{R_{i_0}^3}-\frac{(x_{a_0}-x_j)(y_{a_0}-y_j)}{R_{j_0}^3}\right]$$

$$\left.+\left[\frac{(x_{a_0}-x_i)}{R_{i_0}}-\frac{(x_{a_0}-x_j)}{R_{j_0}}\right]\left[\frac{(y_{a_0}-y_i)}{R_{i_0}}-\frac{(y_{a_0}-y_j)}{R_{j_0}}\right]\right\}q_i^2$$

$$+\zeta\cdot\sum_{\substack{i=1\\i\neq j}}^{n}\left\{-[R_{i_0}-R_{j_0}-2D_{ij}]\right.$$

$$\left[\frac{(z_{a_0}-z_i)(x_{a_0}-x_i)}{R_{i_0}^3}-\frac{(z_{a_0}-z_j)(x_{a_0}-x_j)}{R_{j_0}^3}\right]$$

$$\left.+\left[\frac{(x_{a_0}-x_i)}{R_{i_0}}-\frac{(x_{a_0}-x_j)}{R_{j_0}}\right]\left[\frac{(z_{a_0}-z_i)}{R_{i_0}}-\frac{(z_{a_0}-z_j)}{R_{j_0}}\right]\right\}q_i^2$$

(24)

Similarly the terms of order higher than the second are neglected in (22) and Equation (22) becomes $$0=\sum_{\substack{i=1\\i\neq j}}^{n}\left\{[R_{i_0}-R_{j_0}-2D_{ij}]\left[\frac{(y_{a_0}-y_i)}{R_{i_0}}-\frac{(y_{a_0}-y_j)}{R_{j_0}}\right]\right\}q_i^2$$

$$+\xi\cdot\sum_{\substack{i=1\\i\neq j}}^{n}\left\{-[R_{i_0}-R_{j_0}-2D_{ij}]\right.$$

$$\left[\frac{(x_{a_0}-x_i)(y_{a_0}-y_i)}{R_{i_0}^3}-\frac{(x_{a_0}-x_j)(y_{a_0}-y_j)}{R_{j_0}^3}\right]$$

$$\left.+\left[\frac{(x_{a_0}-x_i)}{R_{i_0}}-\frac{(x_{a_0}-x_j)}{R_{j_0}}\right]\left[\frac{(y_{a_0}-y_i)}{R_{i_0}}-\frac{(y_{a_0}-y_j)}{R_{j_0}}\right]\right\}q_i^2$$

$$+\eta\cdot\sum_{\substack{i=1\\j\neq i}}^{n}\left\{[R_{i_0}-R_{j_0}-2D_{ij}]\right.$$

$$\left[\frac{(x_{a_0}-x_i)^2+(z_{a_0}-z_i)^2}{R_{i_0}^3}-\frac{(x_{a_0}-x_j)^2+(z_{a_0}-z_j)^2}{R_{j_0}^3}\right]$$

$$\left.+\left[\frac{(y_{a_0}-y_i)}{R_{i_0}}-\frac{(y_{a_0}-y_j)}{R_{j_0}}\right]^2\right\}q_i^2$$

$$+\zeta\cdot\sum_{\substack{i=1\\i\neq j}}^{n}\left\{-[R_{i_0}-R_{j_0}-2D_{ij}]\right.$$

$$\left[\frac{(y_{a_0}-y_i)(z_{a_0}-z_i)}{R_{i_0}^3}-\frac{(y_{a_0}-y_j)(z_{a_0}-z_j)}{R_{j_0}^3}\right]$$

$$\left.+\left[\frac{y_{a_0}-y_i}{R_{i_0}}-\frac{(y_{a_0}-y_j)}{R_{j_0}}\right]\cdot\left[\frac{(z_{a_0}-z_i)}{R_{i_0}}-\frac{(z_{a_0}-z_j)}{R_{j_0}}\right]\right\}q_i^2$$

(25)

In like manner, the terms of order higher than the second are neglected in (23) and Equation (23) becomes $$0=\sum_{\substack{i=1\\i\neq j}}^{n}\left\{[R_{i_0}-R_{j_0}-2D_{ij}]\left[\frac{(z_{a_0}-z_i)}{R_{i_0}}-\frac{(z_{a_0}-z_j)}{R_{j_0}}\right]\right\}q_i^2$$

$$+\xi\sum_{\substack{i=1\\i\neq j}}^{n}\left\{-[R_{i_0}-R_{j_0}-2D_{ij}]\left[\frac{(z_{a_0}-z_i)(x_{a_0}-x_i)}{R_{i_0}^3}\right.\right.$$

$$\left.-\frac{(z_{a_0}-z_j)(x_{a_0}-x_j)}{R_{j_0}^3}\right]+\left[\frac{(x_{a_0}-x_i)}{R_{i_0}}-\frac{(x_{a_0}-x_j)}{R_{j_0}}\right]$$

$$\left.\cdot\left[\frac{(z_{a_0}-z_i)}{R_{i_0}}-\frac{(z_{a_0}-z_j)}{R_{j_0}}\right]\right\}q_i^2$$

$$+\eta\sum_{\substack{i=1\\i\neq j}}^{n}\left\{-[R_{i_0}-R_{j_0}-2D_{ij}]\left[\frac{(y_{a_0}-y_i)(z_{a_0}-z_i)}{R_{i_0}^3}\right.\right.$$

$$\left.-\frac{(y_{a_0}-y_j)(z_{a_0}-z_j)}{R_{j_0}^3}\right]+\left[\frac{(y_{a_0}-y_i)}{R_{i_0}}-\frac{(y_{a_0}-y_j)}{R_{j_0}}\right]$$

$$\left.\cdot\left[\frac{(z_{a_0}-z_i)}{R_{i_0}}-\frac{(z_{a_0}-z_j)}{R_{j_0}}\right]\right\}q_i^2$$

$$+\zeta\sum_{\substack{i=1\\i\neq j}}^{n}\left\{[R_{i_0}-R_{j_0}-2D_{ij}]\left[\frac{(x_{a_0}-x_i)^2+(y_{a_0}-y_i)^2}{R_{i_0}^3}\right.\right.$$

$$\left.-\frac{(x_{a_0}-x_j)^2+(y_{a_0}-y_j)^2}{R_{j_0}^3}\right]+\left[\frac{(z_{a_0}-z_i)}{R_{i_0}}\right.$$

$$\left.\left.-\frac{(z_{a_0}-z_j)}{R_{j_0}}\right]^2\right\}q_i^2$$

(26)

Equations (24), (25), and (26) constitute a set of equations which may be solved for the perturbations $\xi$, $\eta$ and $\zeta$. The repeated application of these equations results in a series of position estimates which converges to the true aircraft position.

NON-LINEAR MULTILATERATION

This method is another way to determine the aircraft's position coordinates $x_a$, $y_a$, $z_a$ from a group of range measurements. Assume that the distances $R_i$, $i=1,\ldots,n$, between the aircraft and a fixed number $n$ of ground stations are estimated from initial measurements. It is assumed that the several measurements include small errors and therefore the method of solution must attempt to minimize the effect of these errors.

Let $P_i$ represent the range from the $i^{th}$ ground station to an assumed location of the aircraft, then $$P_i^2=(x_a-x_i)^2+(y_a-y_i)^2+(z_a-z_i)^2, i=1,\ldots,n.$$

Let $R_i$, $i=1,\ldots,n$ be the measured approximate value of $P_i$. We write $$x_a=x_{a_0}+\xi, y_a=y_{a_0}+\eta, z_a=z_{a_0}+\zeta \quad (27)$$

where $x_{a_0}$, $y_{a_0}$ and $z_{a_0}$ are initial approximations to $x_a$, $y_a$, and $z_a$, respectively, while $\xi$, $\eta$, and $\zeta$ are the associated increments in these values that yield an improved estimate.

The problem is to minimize the error expression:

$$\epsilon(\xi, \eta, \zeta) = \sum_{i=1}^{n} q_i^2 (P_i - R_i)^2 \qquad (28)$$

where $q_i$ is a selected weighting of the various component errors.

The solution of this system of equations provides the desired increments $\xi, \eta, \zeta$ to the approximate aircraft coordinates, and gives rise to a convergent iteration process.

Least-squares techniques can be employed in obtaining the solution. The expression for $P_i$ is expanded in a Taylor series, and the terms of order higher than second are neglected since it is assumed that these terms will be negligible. An optimum estimate is obtained by differentiating $\epsilon(\xi, \eta, \zeta)$ partially with respect to $\xi, \eta$, and $\zeta$ respectively, and setting the resulting expressions equal to 0. This yields a system of three linear equations in the three unknowns $(\xi, \eta, \zeta)$ if the terms of order higher than the first are neglected. The solution $(\xi, \eta, \zeta)$ when added to $x_a$, $y_a$, $z_a$ gives the improved values $x_a$, $y_a$, and $z_a$.

In particular, we may write
$$P_i = P_{i_0} + \delta P_i + \delta^2 P_i,$$
where
$$\delta P_i = \frac{\partial P_i}{\partial x_a}\xi + \frac{\partial P_i}{\partial y_a}\eta + \frac{\partial P_i}{\partial z_a}\zeta$$
and
$$\delta^2 P_i = \frac{\partial^2 P_i}{\partial x_a^2}\frac{\xi^2}{2} + \frac{\partial^2 P_i}{\partial x_a \partial y_a}\xi\eta + \frac{\partial^2 P_i}{\partial x_a \partial z_a}\xi\zeta$$
$$+ \frac{\partial^2 P_i}{\partial y_a^2}\frac{\eta^2}{2} + \frac{\partial^2 P_i}{\partial y_a \partial z_a}\eta\zeta + \frac{\partial^2 P_i}{\partial z_a^2}\frac{\zeta^2}{2}$$

where all the partial derivatives are evaluated at
$$\begin{pmatrix} x_a \\ y_a \\ z_a \end{pmatrix} = \begin{pmatrix} x_{a_0} \\ y_{a_0} \\ z_{a_0} \end{pmatrix}$$

Differentiating with respect to $\xi, \eta$, and $\zeta$ yields:

$$0 = \frac{1}{2}\frac{\partial \epsilon}{\partial \xi} = \sum_{i=1}^{n} q_i^2 (P_{i_0} - R_i + \delta P_i + \delta^2 P_i)$$
$$\frac{\partial}{\partial \xi}(P_{i_0} - R_i + \delta P_i + \delta^2 P_i) = \sum_{i=1}^{n} q_i^2 [(P_{i_0} - R_i)$$
$$+ \delta P_i + \delta^2 P_i] \left[\frac{x_{a_0} - x_i}{P_{i_0}} + XI\right] \qquad (29)$$

$$0 = \frac{1}{2}\frac{\partial \epsilon}{\partial \eta} = \sum_{i=1}^{n} q_i^2 (P_{i_0} - R_i + \delta P_i + \delta^2 P_i)\frac{\partial}{\partial \eta}(P_{i_0} - R_i$$
$$+ \delta P_i + \delta^2 P_i) = \sum_{i=1}^{n} q_i^2 [(P_{i_0} - R_i) + \delta P_i + \delta^2 P_i]$$
$$\left[\frac{y_{a_0} - y_i}{P_{i_0}} + YI\right] \qquad (30)$$

$$0 = \frac{1}{2}\frac{\partial \epsilon}{\partial \zeta} = \sum_{i=1}^{n} q_i^2 (P_{i_0} - R_i + \delta P_i + \delta^2 P_i)\frac{\partial}{\partial \zeta}(P_{i_0} - R_i + \delta P_i$$
$$+ \delta^2 P_i) = \sum_{i=1}^{n} q_i^2 [(P_{i_0} - R_i) + \delta P_i + \delta^2 P_i]$$
$$\left[\frac{z_{i_0} - z_i}{P_{i_0}} + ZI\right] \qquad (31)$$

Where
$$XI = \frac{\partial(\delta^2 P_i)}{\partial \xi} = \frac{1}{P_{i_0}^3}\{[(y_{a_0} - y_i)^2 + (z_{a_0} - z_i)^2]\xi$$
$$- [(x_{a_0} - x_i)(y_{a_0} - y_i)]\eta - [(z_{a_0} - z_i)(x_{a_0} - x_i)]\zeta\}$$

$$YI = \frac{\partial(\delta^2 P_i)}{\partial \eta} = \frac{1}{P_{i_0}^3}\{[(x_{a_0} - x_i)^2 + (z_{a_0} - z_i)^2]\eta$$
$$- [(x_{a_0} - x_i)(y_{a_0} - y_i)]\xi - [(y_{a_0} - y_i)(z_{a_0} - z_i)]\zeta\}$$

$$ZI = \frac{\partial(\delta^2 P_i)}{\partial \zeta} = \frac{1}{P_{i_0}^3}\{[(x_{a_0} - x_i)^2 + (y_{a_0} - y_i)^2]\zeta$$
$$- [(y_{a_0} - y_i)(z_{a_0} - z_i)]\eta - [(z_{a_0} - z_i)(x_{a_0} - x_i)]\xi\}$$

All remaining items of order higher than the first are now neglected, and Equations (29), (30), and (31) yield:

$$0 = \sum_{i=1}^{n} q_i^2 (P_{i_0} - R_i)\left(\frac{x_{a_0} - x_i}{P_{i_0}}\right)$$
$$+ \xi \sum_{i=1}^{n} q_i^2 \left\{(P_{i_0} - R_i)\left[\frac{(y_{a_0} - y_i)^2 + (z_{a_0} - z_i)^2}{P_{i_0}^3}\right]\right.$$
$$\left. + \left[\frac{x_{a_0} - x_i}{P_{i_0}}\right]^2\right\} + \eta \sum_{i=1}^{n} q_i^2 \left\{-(P_{i_0} - R_i)\right.$$
$$\left[\frac{(x_{a_0} - x_i)(y_{a_0} - y_i)}{P_{i_0}^3}\right] + \left(\frac{x_{a_0} - x_i}{P_{i_0}}\right)\left(\frac{y_{a_0} - y_i}{P_{i_0}}\right)\right\}$$
$$+ \zeta \sum_{i=1}^{n} q_i^2 \left\{-(P_{i_0} - R_i)\left[\frac{(z_{a_0} - z_i)(x_{a_0} - x_i)}{P_{i_0}^3}\right]\right.$$
$$\left. + \left(\frac{x_{a_0} - x_i}{P_{i_0}}\right)\left(\frac{z_{a_0} - z_i}{P_{i_0}}\right)\right\} \qquad (32)$$

$$0 = \sum_{i=1}^{n} q_i^2 (P_{i_0} - R_i)\left(\frac{y_{a_0} - y_i}{P_{i_0}}\right)$$
$$+ \xi \sum_{i=1}^{n} q_i^2 \left\{(P_{i_0} - R_i)\left[\frac{(x_{a_0} - x_i)(y_{a_0} - y_i)}{P_{i_0}^3}\right]\right.$$
$$\left. + \left(\frac{x_{a_0} - x_i}{P_{i_0}}\right)\left(\frac{y_{a_0} - y_i}{P_{i_0}}\right)\right\} + \eta \sum_{i=1}^{n} q_i^2 \left\{(P_{i_0} - R_i)\right.$$
$$\left[\frac{(x_{a_0} - x_i)^2(z_{a_0} - z_i)^2}{P_{i_0}}\right] + \left(\frac{y_{a_0} - y_i}{P_{i_0}}\right)^2\right\}$$
$$+ \zeta \sum_{i=0}^{n} q_i^2 \left\{-(P_{i_0} - R_i)\left[\frac{(y_{a_0} - y_i)(z_{a_0} - z_i)}{P_{i_0}^3}\right]\right.$$
$$\left. + \left(\frac{y_{a_0} - y_i}{P_{i_0}}\right)\left(\frac{z_{a_0} - z_i}{P_{i_0}}\right)\right\} \qquad (33)$$

$$0 = \sum_{i=1}^{n} q_i^2 (P_{i_0} - R_i)\left(\frac{z_{a_0} - z_i}{P_{i_0}}\right)$$
$$+ \xi \sum_{i=1}^{n} q_i^2 \left\{-(P_{i_0} - R_i)\left[\frac{(z_{a_0} - z_i)(x_{a_0} - x_i)}{P_{i_0}^3}\right]\right.$$
$$\left. + \left(\frac{x_{a_0} - x_i}{P_{i_0}}\right)\left(\frac{z_{a_0} - z_i}{P_{i_0}}\right)\right\}$$
$$+ \eta \sum_{i=1}^{n} q_i^2 \left\{-(P_{i_0} - R_i)\left[\frac{(y_{a_0} - y_i)(z_{a_0} - z_i)}{P_{i_0}^3}\right]\right.$$
$$\left. + \left(\frac{y_{a_0} - y_i}{P_{i_0}}\right)\left(\frac{z_{a_0} - z_i}{P_{i_0}}\right)\right\}$$
$$+ \zeta \sum_{i=1}^{n} q_i^2 \left\{(P_{i_0} - R_i)\left[\frac{x_{a_0} - x_i)^2 + (y_{a_0} - y_i)^2}{P_{i_0}^3}\right]\right.$$
$$\left. + \left(\frac{z_{a_0} - z_i}{P_{i_0}}\right)^2\right\} \qquad (34)$$

Each successive approximation can be used as the start of another calculation yielding a convenient linear iterative approach.

This method was employed to estimate the error in extracting aircraft position over a region of Arizona desert. Eleven ground stations were selected and system error was determined for different weight function $q_i^2$. The method was also applied with a selection of seventeen ground stations. Weighting functions of the form $$q_i = \left(\frac{z_a - z_i}{R_i}\right)^k$$

were employed with $k=0, 1, 2, 3, \ldots$

The invention having been described and illustrated in connection with several exemplary techniques for obtaining the position of a transmitting object while employing weighting techniques to optimize the finally determined position, we now make the following claims.

What is claimed is:

1. The method of determining successive positions in a system of multiple coordinates of one or more objects each emitting pulse signals receivable at a multiplicity of $m$ pulse-signal receiving points whose coordinate positions in a fixed pattern are known, the coordinates of each object being defined by the times of arrival of said pulse signals at at least some of said $m$ receiving points and the coordinates of each previously determined position being known, the method including the steps of:
    a. receiving said emitted pulse signals at said receiving points and converting them to electrical data representing the times of reception of the signals thereat;
    b. automatically selecting for processing the data available at a number $n$ of receiving points, where $n$ is less than $m$, the selection of which points is based upon the known coordinate positions of the respective points and upon said previously determined object positions; and
    c. automatically processing said data from said $n$ selected points and computing a new position of each object by solving simultaneous equations for its coordinates.

2. The method as set forth in claim 1, including the steps of automatically repeating said receiving and selecting and processing steps, basing repeated selections of data to be processed upon each new coordinate position determined.

3. The method as set forth in claim 1, including in said selecting step the step of selecting for processing the data from a first receiving point which is closest to the known previous position of each object and then selecting the data from at least three other receiving points which are near said first point.

4. The method as set forth in claim 1, including the steps of storing data simulating topographical features in the vicinity of the pattern of receiving points, automatically computing a straight line between each selected point and the known previous position of the object, automatically determining whether each line will intersect a topographical feature and selecting receiving points where it will not.

5. The method as set forth in claim 4, including the steps of storing data representing calculated error profiles of the receiving points for various possible positions of the object, and said selecting step including the selecting of data from minimum-error receiving points based on the known previous position of the object.

6. The method as set forth in claim 1, including for the purpose of said selecting, the step of selecting data from an arbitrary first group of at least $n$ receiving points in the absence of prior information as to the location of an object, and said processing step including automatically computing from the data from these points an initial approximation of position of the object.

7. The method as set forth in claim 1, including the step of selecting more than $n$ receiving points, automatically determining a coefficient for each such point based on the strength of the signals respectively received thereat, and automatically processing the data from selected points having the best signal-strength coefficients.

8. The method as set forth in claim 1, including the step of selecting more than $n$ receiving points, automatically testing data from said points to determine when any two such points yield data representing simultaneous reception of pulse signals thereat, and in response to such determination automatically selecting different receiving points.

9. The method as set forth in claim 1, including in the selecting step the step of selecting at least $n$ receiving points based upon the condition that the points selected include points which are most nearly mutually orthogonally disposed with respect to the position of the object to be located.

10. The method set forth in claim 1, where one object to be located is an aircraft flying in said coordinate system over an $x, y$ plane at an altitude $z$, said selecting step including selecting at least three receiving points such that at least two of them are widely spaced from the projection of the aircraft position onto the $x, y$ plane to provide good $x, y$ position data, and selecting at least one other receiving point located nearly beneath the aircraft to provide good $z$-position data.

11. The method as set forth in claim 10, including selecting plural points substantially beneath the aircraft, automatically computing the elevation angles therefrom to the known previous position of the aircraft; and automatically weighting the data from those points according to a weighting coefficient proportional to the sine of the respective elevation angles when computing $z$-coordinate position.

12. The method as set forth in claim 1, wherein at least one object emits its pulse signals at a constant repetition rate, including the further steps of automatically determining from said data the repetition rate of said signals, automatically determining from said data and from said rate anticipated moments when further signals will be received, and automatically receiving further signals only during brief guardband intervals around said anticipated moments.

13. The method as set forth in claim 1, wherein plural objects emit pulse signals, including the step of automatically computing said anticipated moments with respect to signals emitted by one of the plural objects; and automatically identifying data related to signals received from said one object based upon the moment during which it is received.

14. The method as set forth in claim 1, wherein plural objects emit their pulse signals at substantially constant but mutually unsynchronized repetition rates, including the further steps of automatically determining from received data the repetition rates of the various objects' signals, automatically determining from data related to each of the objects' signals the anticipated moments when further signals should be received from the respective objects, automatically receiving further signals with respect to each of the emitting objects only during brief guardband intervals encompassing said anticipated moments, and automatically identifying the various objects on the basis of the anticipated moments and the actual moments of reception of their signals.

15. The method of determining from prior known positions a succession of new positions in a system of three-dimensional coordinates of one or more pulse signal emitting aircraft flying over receiving points located on the ground, the method being operative for aircraft flying at altitudes not exceeding a predetermined maximum altitude, the method including the steps of:
    a. deploying a multiplicity of $m$ of said receiving points in fixed ground positions to form an extensive grid thereof in which the spacings between adjacent points are no greater than twice said maximum altitude and storing the coordinates of said receiving points;
    b. receiving pulse signals from each aircraft to be located with respect to said receiving points and automatically converting said signals into electrical data representative of the times of reception of said signals thereat;
    c. automatically selecting for processing the data which becomes available at a selected number $n$, where $n$ is less than $m$, of said multiplicity of receiving points based upon the prior known aircraft position and upon the stored coordinates of the respective receiving points; and d. automatically processing said selected station data including computing a new position for each of said aircraft by solving simultaneous mathematical expressions for its coordinates.

16. The method as set forth in claim 15, said selecting step including selecting on the basis of a prior known position of an aircraft to be located and on the basis of the stored coordinates of the receiving points a first receiving point located substantially below the aircraft and at least three other receiving points located near thereto.

17. The method as set forth in claim 15, based upon an arbitrary subdivision of the airspace above the ground grid into subvolumes defined in terms of coordinates of said system; automatically computing and identifying groups of n receiving points having coordinates such that they are favorably located respectively to provide optimum electrical data based upon emitted pulse signals from an aircraft flying in each of said subvolumes and automatically storing a tabulation of the coordinates of said subvolumes together with the coordinates of said corresponding groups of points; automatically determining which subvolume an aircraft occupies by comparing the coordinates of its prior known position with the coordinates of said subvolumes; and said selecting step automatically selecting the corresponding group of receiving points to receive the next emitted signals from that aircraft and furnish data related thereto.

18. The method as set forth in claim 17, including automatically identifying at least one alternate group of receiving points for each computed group; automatically determining whether signals received at said group are of strength exceeding a predetermined level, and if not, automatically selecting an alternate group to receive the next emitted pulse signals from the aircraft.

19. The method as set forth in claim 15, including the steps of storing in coordinate form a topographical representation of the ground contour in the vicinity of the grid of receiving points; automatically making a determination based upon the said prior known position of the aircraft whether an imaginary line extending from the aircraft to each selected receiving point would intersect a topographical feature, and automatically selecting receiving points free of such intersections.

20. The method as set forth in claim 19, including automatically computing and storing data identifying alternate receiving points corresponding with other selectible receiving points; automatically determining whether signals received by selected receiving points are of strength, exceeding a predetermined level, and if not, automatically selecting alternate points to receive the next emitted pulse signals from the aircraft.

21. The method as set forth in claim 15, including the steps of automatically introducing error perturbations of known magnitude into said step of processing by computing a new aircraft coordinate position to determine the sensitivity of the computation to error in each of the individual coordinates; automatically computing weighting coefficients based on the effects of said introduced perturbations and operative to optimize the accuracy of future new positions solved for.

22. The method as set forth in claim 21, including the step of automatically including in said simultaneous expressions said weighting coefficients to reduce the ultimate residual positional error when the expressions are solved.

23. The method as set forth in claim 22, including the step of automatically including in said expressions weighting coefficients which are constant for the respective $x$, $y$ and $z$ coordinates and which weight most heavily the $z$-coordinate errors.

24. The method as set forth in claim 22, based upon the arbitrary subdivision of the airspace above the grid according to different altitude levels, the steps of automatically calculating and storing data representing for each of these levels separate optimum $z$-coordinate weighting coefficients; and automatically selecting a $z$-coordinate weighting coefficient for a present computed solution on the basis of the last-determined aircraft $z$-coordinate.

25. The method as set forth in claim 24, including the steps of automatically determining weighting coefficients for each aircraft position solution using as the basis previously determined coordinate positions; automatically determining the residual altitude error; and automatically selecting for subsequent solutions coefficients which are proportional to a power of the residual altitude error.

26. The method as set forth in claim 22, including automatically selecting coefficients which are proportional to the square or to a higher power of non-altitude residual errors.

27. The method as set forth in claim 15, including automatically determining weighting coefficients for each aircraft position solution of said expressions using previously computed aircraft position to determine altitude, range, and elevation angle from each selected receiving point; and automatically calculating coefficients which are proportional to the square of the sine of the aircraft's elevation angle for each such station.

28. The method as set forth in claim 15, including the steps of automatically selecting at least two receiving points widely spaced from a projection of the aircraft position onto the ground to provide good $x$, $y$ position coordinates, and automatically selecting at least one other point on the basis of the computed $x$, $y$ coordinates such that the latter point is located nearly beneath the aircraft to provide good $z$-position coordinates.

29. The method as set forth in claim 15, including the steps of automatically determining a position of the aircraft by automatically solving simultaneous mathematical expressions obtained by equating the square of the ranges to the aircraft position from the receiving points to the sum of the square of expressions relating coordinates of the aircraft position and signal receiving point locations plus error terms, and automatically solving these expressions for coordinates of an aircraft position which will minimize the error terms.

30. The method as set forth in claim 29, including the step of automatically determining weighting coefficients for said error terms and including them in the expressions solved to obtain said coordinates which minimize the weighted error terms.

31. The method as set forth in claim 29, including the steps of automatically solving said expressions equated to error terms which are equated to zero where the expressions also include increments added to said aircraft coordinates to yield error components diminishing after each solution of the expressions to provide an iterative process yielding convergent solutions.

32. A system for determining a series of space coordinate positions for one or more periodic pulse-signal emitting aircraft flying over a grid of fixed ground stations deployed in the same coordinates and having means to receive said signals, and the stations being coupled with central data processing equipment including a computer programmed to select optimumly located stations to yield data for computing each new aircraft position and further including memory means, said system comprising:

a. means in the central processing equipment coupled to said computer and operative for accepting demodulated signals resulting from reception of said pulse signals from an aircraft in at least some selected stations;

b. means in the central processing equipment for receiving said demodulated signals and operative for determining from the latter whether a sufficient number $n$ of demodulated signals have been received from said stations to permit computing a new aircraft position, for so indicating to the computer;

c. means in the central processing equipment responsive to said demodulated signals from said stations and operative to generate data representing the relative times of reception of each of the pulse signals at said selected stations, and store the data temporarily in said memory means; and d. means in the central processing equipment responsive to said data representing the times of reception to generate guardband gating signals anticipating the times of reception of the next periodic aircraft signals and operative to inhibit said means for accepting signals from passing further signals to the central processing equipment except during those times.

33. The system set forth in claim 32, including a pulse-emitting test beacon fixed in a known position in the grid relative to said ground stations, and operative when actuated to emit pulse signals receivable by the stations for testing said ground stations and the accuracy of the system in computing the position of the coordinates of the test beacon.

34. The system as set forth in claim 32, including data link means providing two-way communication between each station and the central processing equipment, and including means responsive to selection by the latter of preferred stations to control the operative condition of the various stations.

35. The system as set forth in claim 32, including means at each station operative when enabled for transmitting to the central processing equipment signals indicating the time of arrival at that station of the aircraft pulse signal and for transmitting information indicating its signal strength; said means in the central processing equipment further comprising means responsive to these transmissions from a station for determining whether all selected stations have received pulse signals of strength exceeding a predetermined minimum and whether these stations have received $n$ separately distinguishable pulse signals within a predetermined span of time representing the maximum difference in time of reception of a pulse signal received at any two stations which might be selected at the same time, and means responsive to both determinations in the affirmative to so inform the computer.

36. The system as set forth in claim 35, wherein the computer is programmed to select another group of stations which are alternate with respect to the selected group, means in the system responsive to failure of any of the latter determinations to so inform the computer and thereby actuate it to select an alternate group.

37. The system as set forth in claim 32, means at wherein each station operative when enabled for transmitting to the central processing equipment signals indicating the moment of reception at that station of the aircraft pulse signal; said means to count out the relative times of pulse signal reception comprising $n-1$ register counters at the central processing equipment; a source of clock pulses; means responsive to reception of said signals at the central equipment to gate pulses into said counters to accumulate counts therein proportional to the differences in times of arrival of the same aircraft pulse signal at the selected stations; and means responsive to reception of $n$ signals from the stations to set these counts into said memory means in the computer for use in computer-determining said new position coordinates.

38. The system as set forth in claim 37, wherein each aircraft periodically transmits its pulse signals at a constant repetition rate; said means in the central processing equipment to generate guardband gating signals including means responding to the first pulse signal received by any selected station as a result of each aircraft transmission and further including means responsive to the periodic occurrence of such first pulse-signals to accurately determine the pulse repetition rate of that aircraft's transmissions; means responsive to these first pulse signals and to said counts of the counters representing the differences in times of reception of the same aircraft pulse signals at the other selected stations for generating groups of guardband gating signals which are each wider than said pulse signals and which have the same spacings as those pulse signals; means for offsetting these guardband gating signals to occur earlier in real time by one-half of a guardband gating signal width, and means for gating signals from the selected stations into the central equipment only during said guardbands.

39. The system as set forth in claim 38, including means operative during initial acquisition of pulse signals from an aircraft whose position is unknown for gating signals from stations into the central equipment in the absence of generated guardband signals.

40. The system as set forth in claim 38, wherein plural, aircraft are flying over said grid emitting pulse signals at constant repetition rates which are mutually unsynchronized; multiple means for generating separate groups of guardband gating signals corresponding respectively with said multiple aircraft, each group anticipating the arrival of pulse signals from different aircraft.

* * * * *